United States Patent
Kimura

(10) Patent No.: US 8,559,088 B2
(45) Date of Patent: Oct. 15, 2013

(54) ADJUSTMENT APPARATUS FOR LIGHT SOURCE UNIT AND ADJUSTMENT METHOD THEREFOR

(75) Inventor: Kazumi Kimura, Toda (JP)

(73) Assignee: Canon Kabushiki Kaisha (JP)

( * ) Notice: Subject to any disclaimer, the term of this patent is extended or adjusted under 35 U.S.C. 154(b) by 133 days.

(21) Appl. No.: 13/274,409

(22) Filed: Oct. 17, 2011

(65) Prior Publication Data

US 2012/0092740 A1 Apr. 19, 2012

(30) Foreign Application Priority Data

Oct. 19, 2010 (JP) .................................. 2010-234667
Sep. 16, 2011 (JP) .................................. 2011-202920

(51) Int. Cl.
*G02B 26/08* (2006.01)
(52) U.S. Cl.
USPC ....................................................... 359/204.1
(58) Field of Classification Search
USPC .............................. 359/204.1, 205.1; 347/233
See application file for complete search history.

(56) References Cited

U.S. PATENT DOCUMENTS 6,999,218 B2 * 2/2006 Kashimura ................ 359/216.1

FOREIGN PATENT DOCUMENTS

JP 8136781 A 5/1996
JP 11064755 A 3/1999

* cited by examiner

*Primary Examiner* — Euncha Cherry
(74) *Attorney, Agent, or Firm* — Rossi, Kimms & McDowell LLP

(57) ABSTRACT

An adjustment apparatus for a light source unit installed on an optical scanning apparatus including a deflector, the light source unit including a laser light source and a condensing optical element, and leading the condensed light beam to the deflector, the adjustment apparatus including: a dividing element for dividing the light beam into a plurality of light beams in at least one of a main scanning direction and a sub-scanning direction; an imaging optical element for imaging the plurality of light beams on a light receiving element; and an adjustment mechanism for adjusting a relative position ΔX between the condensing optical element and the laser light source in a direction of an optical axis of the condensing optical element, and relative positions ΔY and ΔZ between the condensing optical element and the laser light source in directions orthogonal to the optical axis of the condensing optical element.

10 Claims, 31 Drawing Sheets

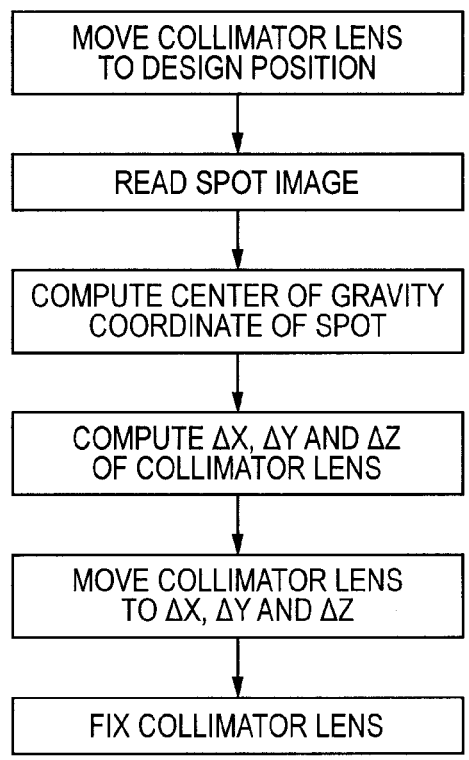
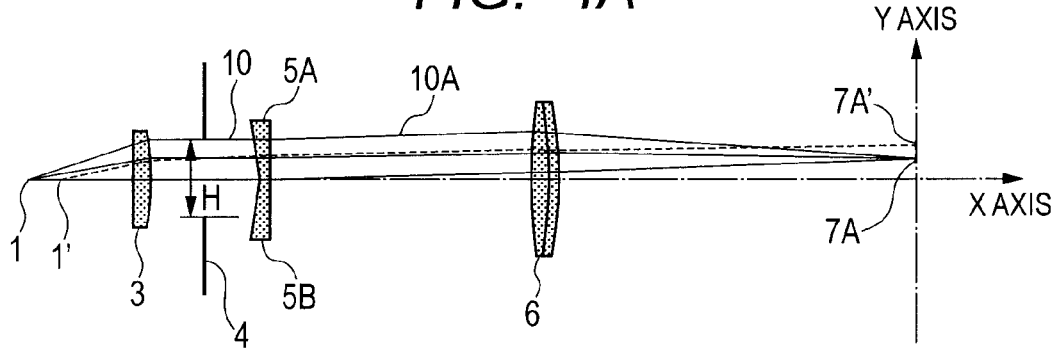

DETECTION OF Z DIRECTION SHIFT

RELATIVE POSITION SHIFT IN X DIRECTION AND SPOT POSITION ON SENSOR

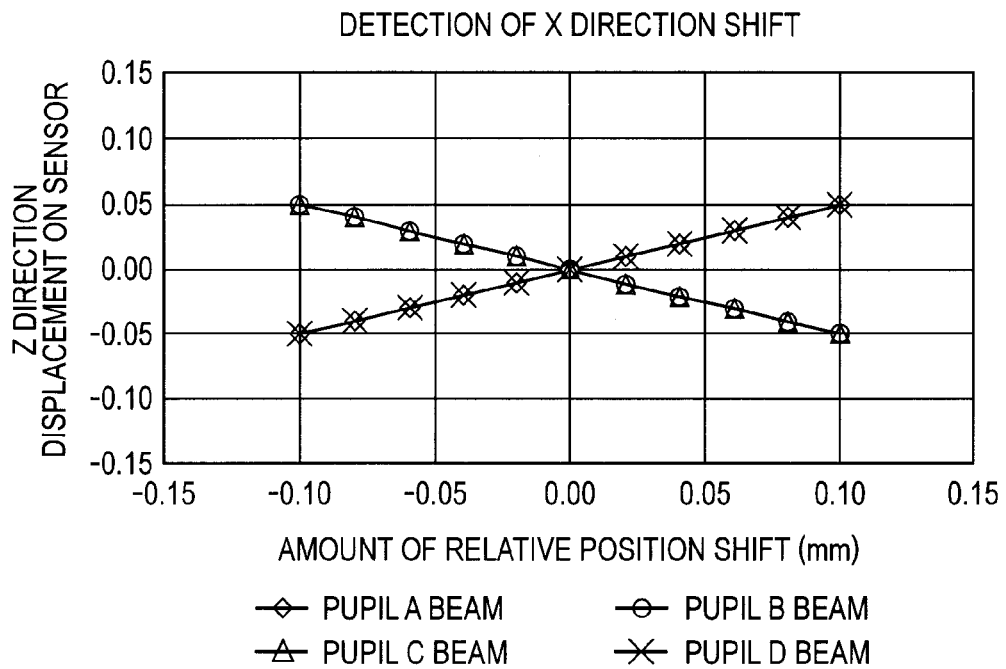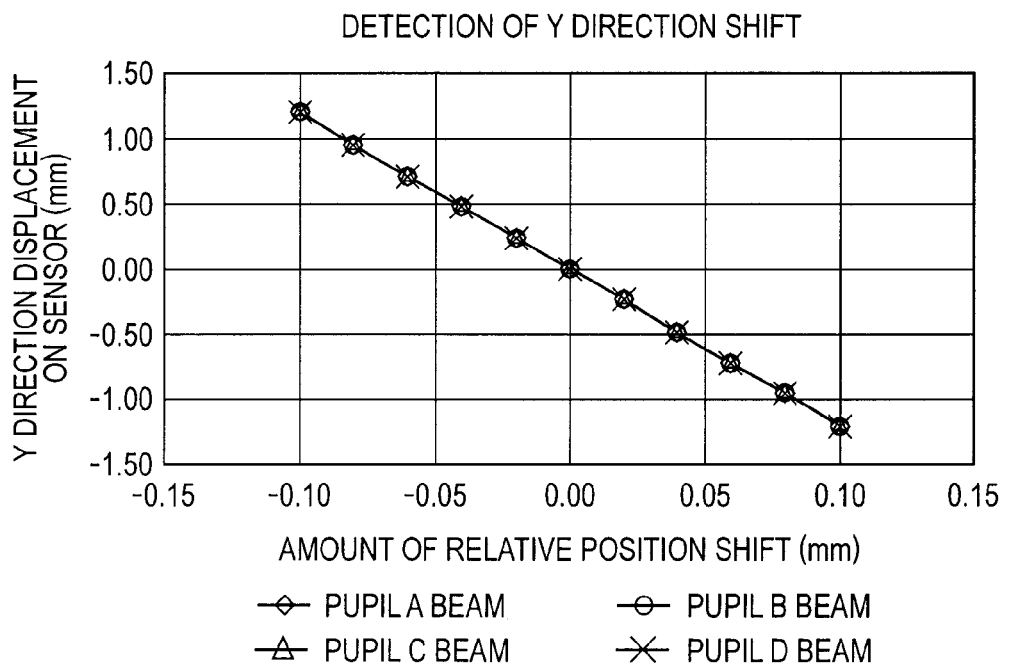

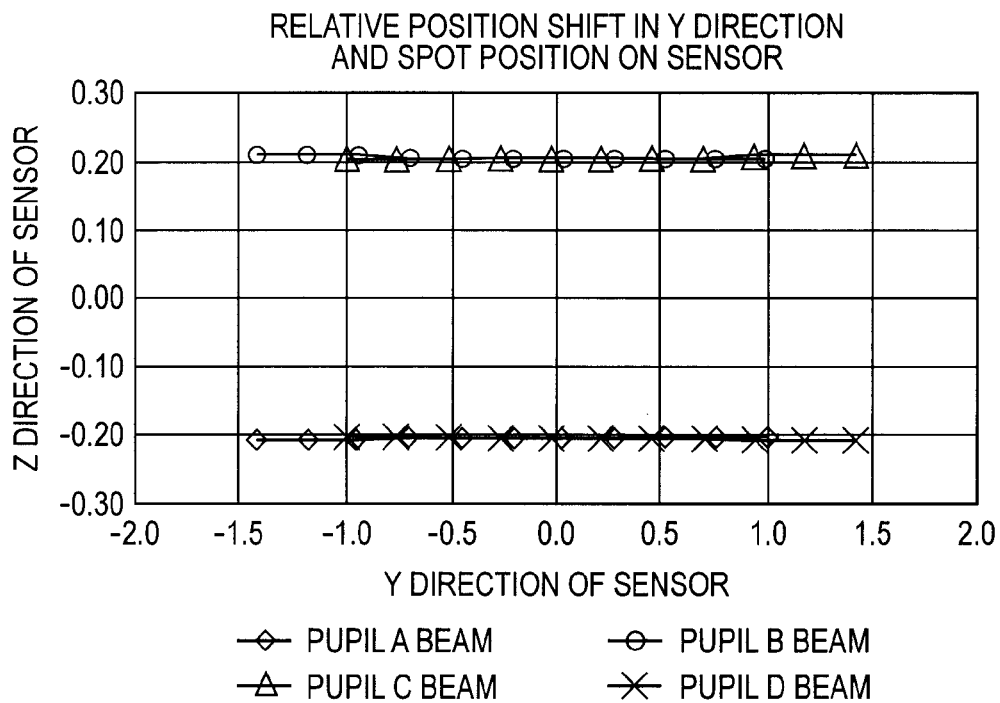
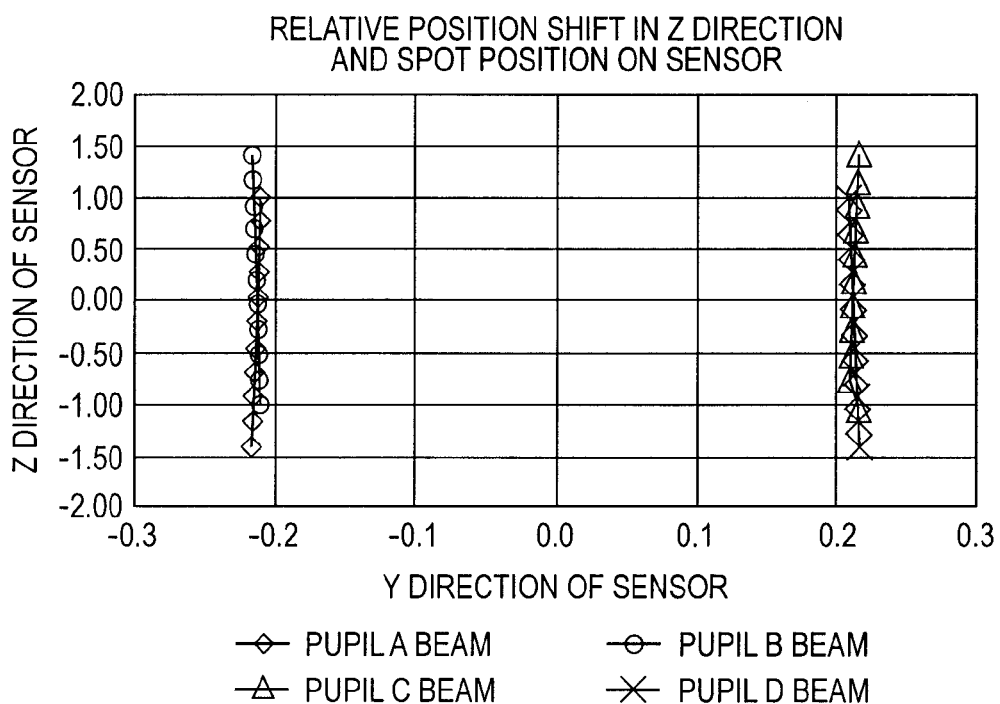

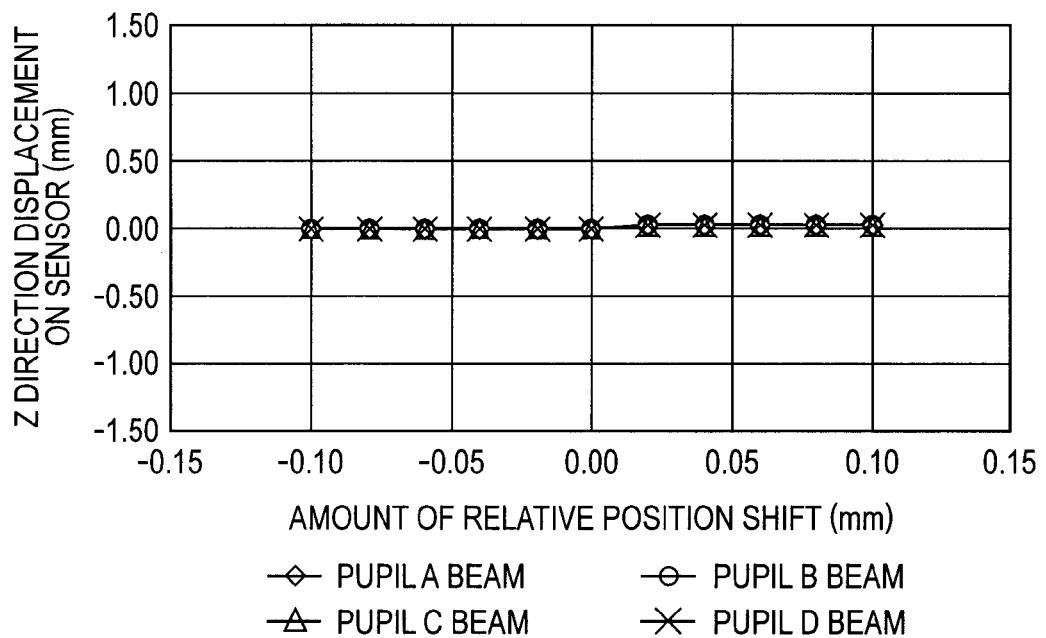
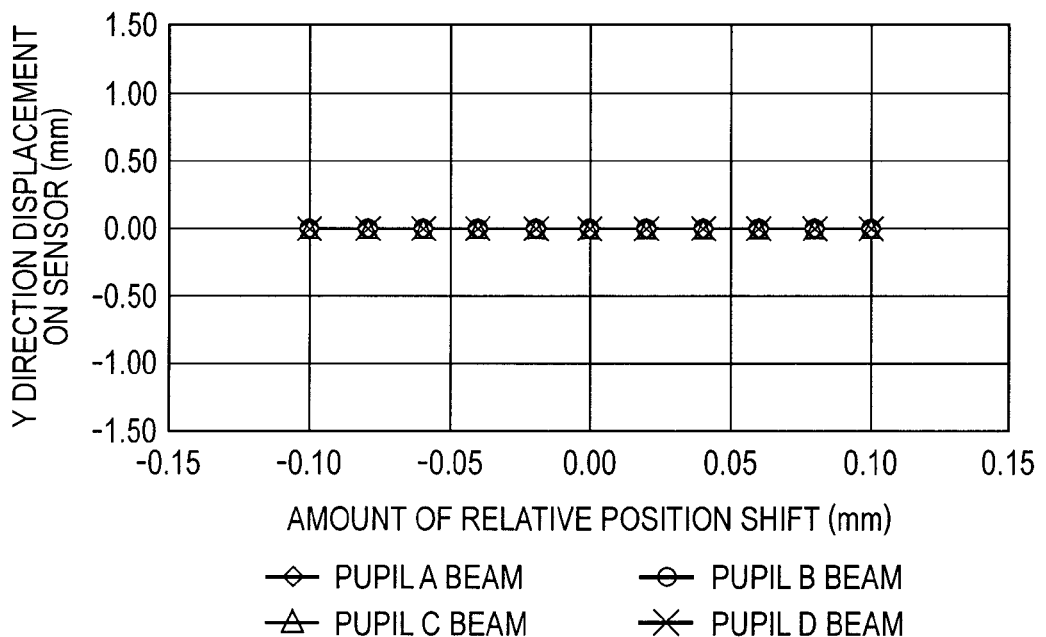

ADJUSTMENT APPARATUS FOR LIGHT SOURCE UNIT AND ADJUSTMENT METHOD THEREFOR

BACKGROUND OF THE INVENTION

1. Field of the Invention

The present invention relates to an adjustment apparatus for a laser light source and a condensing optical element in a light source unit to be installed on an optical scanning apparatus including a deflector, and to an adjustment method for the adjustment apparatus. The present invention more particularly relates to an adjustment apparatus for and an adjustment method of adjusting a relative position between a laser light source and a condensing optical element of a light source unit. The light source unit includes at least the laser light source and the condensing optical element for condensing a light beam emitted from the laser light source and leading the light beam to a deflector, and the light beam emitted from the light source unit is restricted for use by a stop provided between the laser light source and the deflector in an optical scanning apparatus so that a beam width in a main scanning direction and a beam width in a sub-scanning direction are different from each other.

2. Description of the Related Art

Conventionally, in manufacture of a light source unit including a laser light source and a condensing optical element of an optical scanning apparatus installed on a laser beam printer and a digital copying machine, a relative position between the laser light source and the condensing optical element is finely adjusted in an independent process. A scanning optical system on a stage subsequent to the light source unit is usually a magnifying optical system in the optical scanning apparatus, and it is necessary to strictly adjust the relative position of the laser light source with respect to the condensing optical system of the light source unit. If the strict adjustment is not carried out, a beam spot diameter increases on a surface to be scanned such as a photosensitive drum, or a beam cannot be imaged on a desired irradiated position, resulting in difficulty in high-definition printing and color registration alignment.

Some proposals have been made for an adjustment method and an adjustment apparatus for a relative position between the laser light source and the condensing optical element of the light source unit. According to an adjustment tool described in Japanese Patent Application Laid-Open No. H08-136781, light emitted from an attached light source unit is imaged as a spot by a tool lens. For the imaged beam spot, a detection system constructed by an objective lens, a magnifying optical system and a camera reads a profile of the beam spot, a beam diameter is computed by an image processing device, a center of focal depth giving the minimum beam spot diameter is computed, and it is determined whether or not the irradiated position on a cross section orthogonal to an optical axis is at an optimal position. A lens barrel holding a condensing optical system is three-dimensionally controlled and driven so that a focus and the irradiated position are optimal. FIG. 20 summarizes this adjustment method as an algorithm. In a flowchart illustrated in FIG. 20, a collimator lens is moved at a pitch of dX in a range of ±dX×N with respect to a design position Xo in the focus direction for 2×N+1 times, the profile of the beam spot is read at each position, thereby computing a defocus amount ΔX, and further computing irradiated position shifts ΔY and ΔZ (paragraphs [0034] to [0038] and FIGS. 4A to 8 and FIG. 14 in Japanese Patent Application Laid-Open No. H08-136781).

According to Japanese Patent Application Laid-Open No. H08-136781, a determination method for the focus determination based not on the beam spot diameter but on a peak value of the quantity of light of the laser beam is also described (paragraph [0049]).

Moreover, an optical scanning apparatus of multi-beam type such as monolithic multi-beam type including the vertical cavity surface emitting laser (VCSEL) is made into product as the optical scanning apparatus. It is also necessary to align perpendicularity of a row of light emitting points with respect to an optical axis of a condensing optical system as a result of the employment of the multi-beam configuration. If the perpendicularity is not aligned, a difference in focus among beams, namely a so-called asymmetric blur is generated. For example, Japanese Patent Application Laid-Open No. H11-064755 proposes a method involving, for two light emitting points, after focusing for a first light emitting point, repeating, for some times, rotational adjustment of a laser element and fine adjustment of a collimator lens while observing focusing for a second light emitting point (paragraph [0024], FIGS. 4A and 4B).

However, the conventional adjustment methods for the laser light source unit have a problem that a long adjustment time is necessary.

According to Japanese Patent Application Laid-Open No. H08-136781, it is necessary to repeat a process of changing the interval between the laser light source and the condensing optical element by a small amount dX (defocusing), reading the profile of the beam spot, and computing the spot diameter and the peak quantity of light for a predetermined number of times. The reading of the spot profile and the computing of the spot diameter are repeated for 2×N+1 times in FIG. 20. A best focus position is computed based on a change in the spot diameter and the peak quantity of light according to the defocusing, thereby adjusting the interval between the laser light source and the condensing optical element, which thus poses a problem that man-hours are required for the repeated operation.

It is further necessary to repeat a process of defocusing a detection optical system including a camera, reading the profile of the beam spot, and computing the spot diameter and the peak quantity of light for a predetermined number of times in order to confirm the focus position after the interval between the laser light source and the condensing optical element is determined and fixed. This confirmation process also takes an adjusting time.

Moreover, according to Japanese Patent Application Laid-Open No. H11-064755, the number of focus measurements for each of the light beams, which need to be carried out according to the number of beams, increases in order to carry out adjustment of defocus for each of light emitting elements of multiple beams, so-called asymmetric blur adjustment, resulting in an increase in the adjustment time.

If the laser light source and the condensing optical element are relatively shifted in a direction vertical to the optical axis, an error in accuracy of a print position is generated, resulting in difficulty in color registration alignment. If a strict adjustment of the light source is not made around the optical axis particularly in a multi-beam scanning system, a beam pitch is not achieved at a desired interval, resulting in image degradation. As a result, an adjustment time increases for repeating measurement and adjustment of the print position of each of the light beams. Therefore, the strict positioning of the laser light source and the condensing optical element is necessary in the direction orthogonal to the optical axis, which causes a long assembly/adjustment time.

SUMMARY OF THE INVENTION

The present invention therefore has an object to provide an adjustment apparatus for a light source unit which can reduce an adjustment time for adjusting a relative position between a laser light source and a condensing optical element of a light source unit to be installed on an optical scanning apparatus including a deflector.

An adjustment apparatus for a light source unit installed on an optical scanning apparatus including a deflector has the following configuration.

There is provided an adjustment apparatus for a light source unit installed on an optical scanning apparatus including a deflector, the light source unit including a laser light source and a condensing optical element for condensing a light beam emitted from the laser light source, and leading the condensed light beam to the deflector, the adjustment apparatus including: a dividing element for dividing the light beam emitted from the light source unit into a plurality of light beams in at least one of a main scanning direction and a sub-scanning direction; an imaging optical element for imaging the plurality of light beams divided by the dividing element on a light receiving element; and an adjustment mechanism for adjusting a relative position $\Delta X$ between the condensing optical element and the laser light source in a direction of an optical axis of the condensing optical element, and relative positions $\Delta Y$ and $\Delta Z$ between the condensing optical element and the laser light source in directions orthogonal to the optical axis of the condensing optical element based on a relative position between a plurality of images imaged on the light receiving element corresponding to the divided a plurality of light beams and positions of the plurality of images with respect to the optical axis.

Further, in the adjustment apparatus, the dividing element divides the light beam, which has passed through a first stop disposed at a position optically equivalent to a second stop provided between the laser light source and the deflector in the optical scanning apparatus, into a plurality of beams both in the main scanning direction and the sub-scanning direction.

Further, in the adjustment apparatus, the adjustment apparatus is adjustable for the relative position between the condensing optical element and the laser light source in the direction of the optical axis of the condensing optical element, a relative position between the condensing optical element and the laser light source in the main scanning direction, and a relative position between the condensing optical element and the laser light source in the sub-scanning direction.

Further, in the adjustment apparatus, the dividing element comprises a prism-array in which prisms are arranged so that either an incident surface or an exit surface is one flat surface, and another of the incident surface and the exit surface is constructed by a plurality of flat surfaces which are not parallel with each other, and are not parallel with the one flat surface.

Further, in the adjustment apparatus, an arrangement direction of the prisms of the prism-array coincides with a direction of a maximum diameter of a pupil of the light beam which enters the prism-array.

Further, in the adjustment, the following expression is satisfied: $P \times Fj + Sp > 2 \times Fj \times Xmax \times H/(4 \times F^2)$, where P (rad) is a relative angle between two light beams which is obtained if the light beam emitted from the light source unit having a design value is divided into the two light beams in a direction of the maximum diameter of the pupil by the prism-array serving as a pupil dividing element, and the two light beams are emitted from the exit surface of the prism-array, H is a width in the direction of the maximum diameter of the pupil of the light beam, F is a focal length of the condensing optical element, Fj is a focal length of the imaging optical element, Sp is a spot diameter of the light beam imaged on the light receiving element, and Xmax is an absolute value of a maximum shift amount in the direction of the optical axis between the laser light source and the condensing optical element.

Further, in the adjustment apparatus, the dividing element comprises a lens array in which at least either an incident surface or an exit surface is constructed by arranging a plurality of curved surfaces having the same curvature.

Further, in the adjustment apparatus, an arrangement direction of the lens array coincides at least with a direction of a maximum diameter of a pupil of the light beam which enters the lens array.

There is provided a light source unit, which has a relative position between a condensing optical element and a laser light source in a direction of an optical axis of the condensing optical element and relative positions between the condensing optical element and the laser light source in directions orthogonal to the optical axis of the condensing optical element, the relative positions being adjusted by the adjustment apparatus.

Further, in the light source unit in which the laser light source includes a plurality of light emitting points.

There is provided an optical scanning apparatus including the light source unit.

There is provided an adjustment method for a light source unit installed on an optical scanning apparatus including a deflector, the light source unit including a laser light source and a condensing optical element for condensing a light beam emitted from the laser light source, and leading the condensed light beam to the deflector, the adjustment method including: dividing the light beam emitted from the light source unit into a plurality of light beams in at least one of a main scanning direction and a sub-scanning direction; imaging the divided a plurality of light beams on a light receiving element; and adjusting a relative position $\Delta X$ between the condensing optical element and the laser light source in a direction of an optical axis of the condensing optical element, and relative positions $\Delta Y$ and $\Delta Z$ between the condensing optical element and the laser light source in directions orthogonal to the optical axis of the condensing optical element based on a relative position between a plurality of images imaged on the light receiving element corresponding to the divided a plurality of light beams and positions of the plurality of images with respect to the optical axis.

There is provided a manufacturing method for a light source unit installed on an optical scanning apparatus including a deflector, the light source unit including a laser light source and a condensing optical element for condensing a light beam emitted from the laser light source, and leading the condensed light beam to the deflector, the manufacturing method including: dividing the light beam emitted from the light source unit into a plurality of light beams in at least one of a main scanning direction and a sub-scanning direction; imaging the divided a plurality of light beams on a light receiving element; adjusting a relative position $\Delta X$ between the condensing optical element and the laser light source in a direction of an optical axis of the condensing optical element, and relative positions $\Delta Y$ and $\Delta Z$ between the condensing optical element and the laser light source in directions orthogonal to the optical axis of the condensing optical element based on a relative position between a plurality of images imaged on the light receiving element corresponding to the divided a plurality of light beams and positions of the plurality of images with respect to the optical axis; and then determining at least one of a position of the condensing optical element and a position of the laser light source.

It is possible to provide the adjustment apparatus for the light source unit which can reduce the assembling and adjustment time for adjusting the relative position between the laser light source and the condensing optical element, and to provide the adjustment method for the light source unit.

Further features of the present invention will become apparent from the following description of exemplary embodiments with reference to the attached drawings.

BRIEF DESCRIPTION OF THE DRAWINGS

FIG. 3 is a flowchart illustrating an adjustment method for a relative position between a laser light source and a condensing optical element according to the present invention.

FIG. 4A is a schematic configuration diagram of the adjustment apparatus according to the present invention.

FIG. 11B is a chart illustrating displacement amounts of the beam spots in the Z direction which are obtained if the laser light source is shifted in the X direction in Numerical Example 3-1 according to the third embodiment of the present invention.

FIG. 11C is a chart illustrating displacement amounts of the beam spots in the Y direction if the laser light source is shifted in the Y direction in Numerical Example 3-1 according to the third embodiment of the present invention.

FIG. 11H is a chart illustrating movement locus of the beam spots on the YZ plane which are obtained if the laser light source is displaced in the Y direction with the pitch of 0.02 mm by ±0.1 mm in Numerical Example 3-1 according to the third embodiment of the present invention.

FIG. 11I is a chart illustrating movement locus of the beam spots on the YZ plane which are obtained if the laser light source is displaced in the Z direction with the pitch of 0.02 mm by ±0.1 mm in Numerical Example 3-1 according to the third embodiment of the present invention.

FIG. 18D is a chart illustrating displacement amounts of the beam spots in the Z direction which are obtained if the laser light source is shifted in the Y direction in Numerical Example 4 according to the fourth embodiment of the present invention.

FIG. 18E is a chart illustrating displacement amounts of the beam spots in the Y direction which are obtained if the laser light source is shifted in the Z direction in Numerical Example 4 according to the fourth embodiment of the present invention.

DESCRIPTION OF THE EMBODIMENTS

Preferred embodiments of the present invention will now be described in detail in accordance with the accompanying drawings.

First Embodiment

Figure 1:
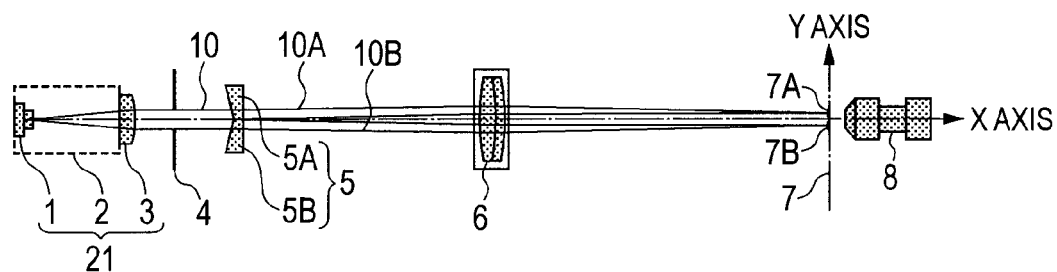
FIG. 1 is a cross sectional view illustrating an adjustment apparatus according to a first embodiment of the present invention.
Figure 2:
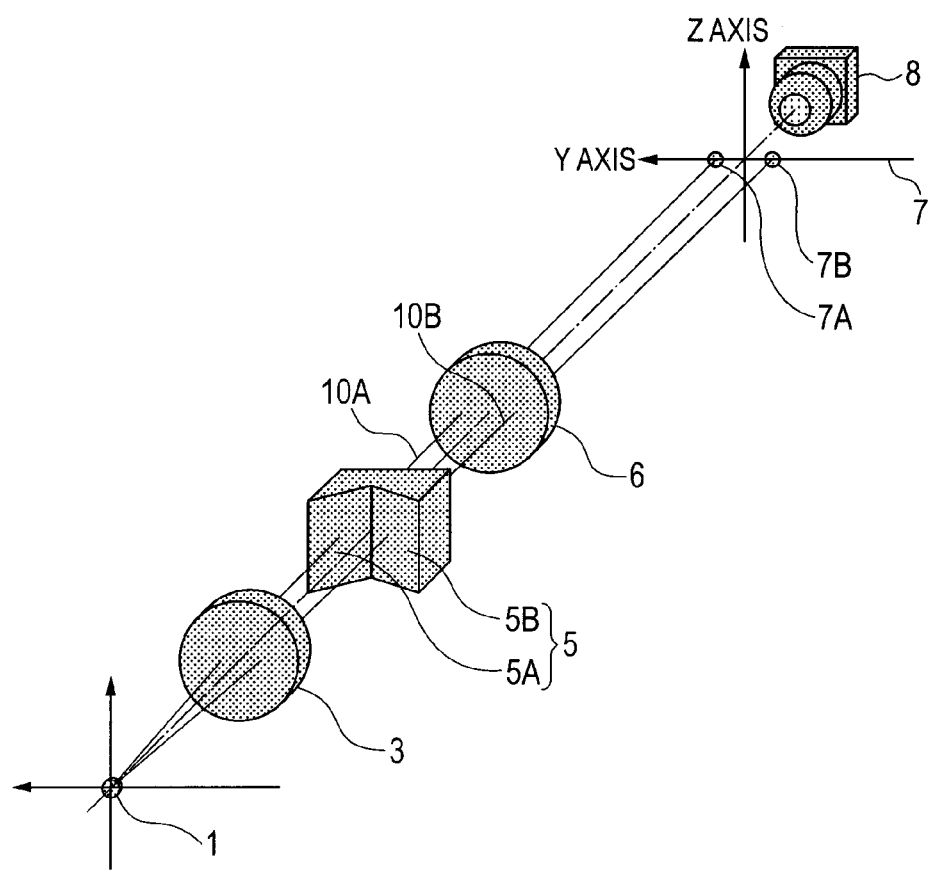
FIG. 2 is a perspective view illustrating the adjustment apparatus according to the first embodiment of the present invention.

FIG. 1 is a cross sectional view and FIG. 2 is a perspective view of an adjustment apparatus of a light source unit for a scanning optical system according to a first embodiment of the present invention.

The adjustment apparatus according to this embodiment is an adjustment apparatus for adjusting a relationship in relative position between a laser light source and a condensing optical element of a light source unit to be installed on an optical scanning apparatus including a deflector, and includes a mounting unit (not shown) for fixing a light source unit 21 to be adjusted including a laser light source 1 and a condensing lens 3 serving as the condensing optical element, a stop (second stop) 4, a pupil dividing element 5 and a tool lens 6 serving as an imaging optical element, and a two-dimensional CCD camera 8 serving as a light receiving sensor (light receiving element) as illustrated in FIGS. 1 and 2. A coordinate system is configured such that the optical axis is assigned to an X axis, and a Y axis and a Z axis are provided on a plane orthogonal to the X axis.

A description is now given of a configuration of the adjustment apparatus of this embodiment referring to FIGS. 1 and 2.

The laser light source 1 and the condensing lens 3 are held by a laser holder 2 serving as a holding member, and form the light source unit 21 for the scanning optical system. The light source unit 21 is detachable from the adjustment apparatus of this embodiment by means of the mounting unit (not shown). The condensing lens 3 is fixed to the laser holder 2, and the laser holder 2 is then mounted on the adjustment apparatus. The laser light source 1 is held by a tool hand (not shown), which is an adjustment mechanism, thereby providing a configuration three-dimensionally displaceable with respect to the laser holder 2 (condensing lens 3). After a position of the laser light source 1 is finely adjusted by means of an adjustment method of the present invention to be described later, thereby achieving a desired three-dimensional accuracy of the relative position of the laser light source 1 with respect to the condensing lens 3, the laser light source 1 is fixed to the laser holder 2. A method of fixing the laser light source 1 and the condensing lens 3 to the laser holder 2 is a known method such as screwing, fitting and adhering.

The stop 4 is a plate in which an elliptical hole having a major axis in the Y direction is bored. A light beam 10 is shaped into an ellipse by the stop 4 having the elliptical opening, and has the maximum diameter in the Y direction.

The pupil dividing element (dividing element) 5 is formed by a prism-array constructed by arranging a prism 5A and a prism 5B in the Y direction. The arranging direction of the prisms thus coincides with the maximum diameter direction of the light beam. The prism 5A and the prism 5B have shapes symmetrical with each other with respect to an XZ plane containing the optical axis. Incident surfaces are inclined with respect to a YZ plane and exit surfaces are formed by one plane parallel with the YZ plane in FIGS. 1 and 2. Though the slopes of the incident surfaces are inclined so that the thickness decreases toward the optical axis in FIGS. 1 and 2, the slopes may be inclined so that the thickness conversely increases toward the optical axis.

The tool lens 6 condenses incident beams onto an image plane 7 (on the light receiving element), thereby forming beam spots 7A and 7B. The beam spots formed on the image plane 7 are read as an image by the CCD camera 8 serving as the light receiving sensor. The CCD camera 8 is constructed by a CCD sensor in which objective lenses and light receiving pixels are two-dimensionally arranged. An image processing system (not shown) computes where the center of gravity of each of the beam spots read as the image by the CCD camera 8 is present on a YZ coordinate system of the image plane 7. The relative position between the laser light source 1 and the condensing optical element 3 is adjusted by driving and controlling the tool hand (not shown) holding the laser light source 1 based on the computed YZ coordinates of the beam spots.

A description is now given of a more specific operation referring to FIGS. 1 and 2. Only marginal beams of the light beams are illustrated in FIG. 1, and only principal rays of the light beams are illustrated in FIG. 2 for the sake of simple description.

If the light source unit 21 is attached to the adjustment apparatus according to the present invention by means of the mounting unit (not shown), and the laser light source 1 is turned on, the laser beam emitted from the laser light source 1 is condensed by the condensing lens 3. The laser beam is converted into a parallel light beam by making the front focus position of the condensing lens 3 coincide with the laser light source 1. It is necessary for attaining desired parallelism of the parallel light beam that a tolerance of the position shift between the front focus position of the condensing lens 3 and the laser light source 1 in the optical axis (X) direction be ±0.050 mm, more preferably ±0.020 mm or less. Similarly, if the laser light source 1 is largely shifted in the vertical direction (Y direction or Z direction) with respect to the optical axis of the condensing lens 3, the shift has influence on the accuracy of a print position of the optical scanning apparatus. It is thus necessary that the tolerance of the position shift in the Y direction and the Z direction be ±0.100 mm, more preferably ±0.030 mm or less.

However, when the light source unit 21 is assembled, it is generally difficult to provide an arrangement at such a desired accuracy in the optical axis (X) direction, the Y direction and the Z direction, and it is thus necessary to make fine adjustment after the assembly.

The light beam emitted from the condensing lens 3 is restricted (shaped) as the light beam 10 elliptical in the cross section orthogonal to the optical axis by the stop 4 having the elliptical opening, and is then used. The distance in the optical axis direction from the condensing lens 3 of the light source unit 21 to the stop 4 in the adjustment apparatus preferably coincides with the distance in the optical axis direction from the condensing lens 3 to a stop (first stop) in the optical scanning apparatus. Alternatively, the condensing lens 3 and the stop 4 may be arranged at positions optically equivalent thereto.

The light beam 10 which has passed through the stop 4 enters the prisms 5A and 5B constructing the pupil dividing element 5. The light beam 10 is divided into two portions, that is, a light beam 10A on a pupil plus side and a light beam 10B on a pupil minus side, in the Y direction as can be seen from FIG. 1. The light beam 10A on the pupil plus side is deflected by the prism 5A to the plus side in the Y direction, and the light beam 10B on the pupil minus side is deflected by the prism 5B to the minus side in the Y direction.

The light beams 10A and 10B that have entered the tool lens 6 undergo imaging effect of the tool lens 6, thereby respectively forming the beam spots 7A and 7B on the image plane 7 of the tool lens 6.

The beam spots 7A and 7B on the image plane 7 are read as an image by the CCD camera 8. The image processing system (not shown) computes where the center of gravity of each of the beam spots read as the image is present on the YZ coordinate system of the image plane 7.

If the laser light source 1 and the condensing lens 3 are arranged in an ideal state (at design positions), and the laser beam emitted from the condensing lens 3 is a parallel light beam having the desired parallelism, the beam spots 7A and 7B form images respectively at positions (+Yo,0) and (−Yo,0) on the Y axis of the image plane 7 where a point on the image plane 7 on the optical axis is represented as the origin (0,0) on the YZ plane. A description is now given of how the beam spots 7A and 7B are observed if the actual relative position between the laser light source 1 and the condensing lens 3 are shifted on this occasion.

First, if the distance in the X direction between the laser light source 1 and the condensing lens 3 is shorter by ΔX than that in the ideal state, the light beam emitted from the condensing lens 3 is a light beam tending to disperse. If the light beam 10 is a dispersed light beam, the light beam 10A divided by the pupil dividing element 5 departs further from the X axis, and is displaced toward the plus side in the Y direction as can be seen from FIG. 1. As a result, the light beam 10A that has entered the tool lens 6 departs further from the X axis, and is condensed while displaced toward the plus side in the Y direction, resulting in a displacement toward the plus side of the position of the beam spot 7A on the image plane 7. The beam spot 7A is observed as a beam spot at a position (+Yo+dY, 0) on the image plane 7 where dY is a displacement amount obtained in this case.

Similarly, if the light beam 10 is a dispersed light beam, the light beam 10B divided by the pupil dividing element 5 departs further from the X axis, and is displaced toward the minus side in the Y direction. As a result, the light beam 10B that has entered the tool lens 6 departs further from the X axis, and is condensed while displaced toward the minus side in the Y direction, resulting in a displacement toward the minus side of the position of the beam spot 7B on the image plane 7. The beam spot 7B is observed as a beam spot at a position (−Yo−dY, 0) on the image plane 7 where −dY is a displacement amount obtained in this case.

As a result, if the distance in the X direction between the laser light source 1 and the condensing lens 3 is shorter by ΔX than that in the ideal state, the interval between the beam spots 7A and 7B is observed as that increased by 2×dY.

Then, if the position of the laser light source 1 is moved in the Y direction by ΔY<0 from that in the ideal state with respect to the condensing lens 3 (moved toward the minus side in the Y axis direction), the light beam 10 emitted from the condensing lens 3 has an angle in the Y direction toward the plus side. If the light beam 10 has the angle in the Y direction toward the plus side, the light beam 10A divided by the pupil dividing element 5 also has an angle in the Y direction toward the plus side as can be seen from FIG. 1. As a result, the light beam 10A that has entered the tool lens 6 also proceeds at an angle in the Y direction toward the plus side, and the position of the beam spot 7A on the image plane 7 is thus displaced toward the plus side. The beam spot 7A is observed as a beam spot at a position (+Yo+dY, 0) where dY is a displacement amount obtained in this case.

Similarly, if the light beam 10 has an angle in the Y direction toward the plus side, the light beam 10B divided by the pupil dividing element 5 also has an angle in the Y direction toward the plus side. As a result, the light beam 10B that has entered the tool lens 6 also proceeds at an angle in the Y direction toward the plus side, and the position of the beam spot 7B on the image plane 7 is thus displaced toward the plus side. The beam spot 7B is observed as a beam spot at a position (−Yo+dY, 0) where dY is a displacement amount obtained in this case.

As a result, if the position of the laser light source 1 is moved in the Y direction by ΔY<0 from that in the ideal state with respect to the condensing lens 3, the interval between the beam spots 7A and 7B does not change, and both the beam spots 7A and 7B are observed as those displaced in the Y direction by dY.

If the position of the laser light source 1 is moved in the Z direction by ΔZ<0 from that in the ideal state with respect to the condensing lens 3 (moved toward the minus side in the Z axis direction), the light beam 10 emitted from the condensing lens 3 has an angle in the Z direction toward the plus side. If the light beam 10 has the angle in the Z direction toward the plus side, the light beam 10A divided by the pupil dividing element 5 also has an angle in the Z direction toward the plus side as can be seen from FIG. 2. As a result, the light beam 10A that has entered the tool lens 6 also proceeds at an angle in the Z direction toward the plus side, and the position of the beam spot 7A on the image plane 7 is thus displaced toward the plus side. The beam spot 7A is observed as a beam spot at a position (+Yo, dZ) where dZ is a displacement amount obtained in this case.

Similarly, if the light beam 10 has an angle in the Z direction toward the plus side, the light beam 10B divided by the pupil dividing element 5 also has an angle in the Z direction toward the plus side. As a result, the light beam 10B that has entered the tool lens 6 also proceeds at an angle in the Z direction toward the plus side, and the position of the beam spot 7B on the image plane 7 is thus displaced toward the plus side. The beam spot 7B is observed as a beam spot at a position (−Yo, dZ) where dZ is a displacement amount obtained in this case.

As a result, if the position of the laser light source 1 is moved in the Z direction by ΔZ<0 from that in the ideal state with respect to the condensing lens 3, the interval between the beam spots 7A and 7B does not change, and both the beam spots 7A and 7B are observed as those displaced in the Z direction by dZ.

The change amounts in the interval between the beam spots 7A and 7B (relative position between the images of the two beams) and in the positions thereof (position of each of the images of the two beams with respect to the optical axis) are proportional to the change amount in the relative position between the laser light source 1 and the condensing lens 3 as described in the following Numerical Examples. It is thus possible to compute how much the relative position between the laser light source 1 and the condensing lens 3 is shifted with respect to that in the ideal position by reading the coordinates of the beam spots 7A and 7B, and accurately measuring the change amounts of the interval and the positions.

The beam spots 7A and 7B on the image plane 7 are read as an image by the CCD camera 8 according to the present invention. The image processing system (not shown) computes where the center of gravity of each of the beam spots read as the image is present on the YZ coordinate system of the image plane 7. A method of computing the coordinates of the center of gravity of each of the spots on the two-dimensional CCD sensor may be a known method.

The computed coordinates of the beam spots 7A and 7B on the YZ plane are (YA, ZA) and (YB, ZB), respectively. Though if there is no production error in the apparatus, ZA=ZB holds true, there is actually a production error, and ZA≈ZB thus holds true. Moreover, the coordinates in the ideal state (design positions) are (+Yo, 0) and (−Yo, 0).

Moreover, coordinate displacement sensitivities of the beam spots 7A and 7B with respect to a relative position shift between the laser light source 1 and the condensing lens 3 are represented by the following expressions (1) to (3).

$$Ax = (\text{defocus(shift in } X \text{ direction)})/(\text{beam spot shift amount in } Y \text{ direction)} \quad (1)$$

$$Ay = (\text{shift in } Y \text{ direction})/(\text{beam spot shift amount in } Y \text{ direction)} \quad (2)$$

$$Az = (\text{shift in } Z \text{ direction})/(\text{beam spot shift amount in } Z \text{ direction)} \quad (3)$$

Those sensitivities may be computed by means of simulation or experimentally. Based on those coordinate displacement sensitivities, the amounts of relative position shift in the X, Y and Z directions ($\Delta X$, $\Delta Y$ and $\Delta Z$) between the laser light source 1 and the condensing lens 3 are respectively represented by the following expressions (4) to (6).

$$\Delta X = Ax \times ((YA - YB) - 2 \times Yo) \quad (4)$$

where $\Delta X$ is an amount of relative position shift in X direction between laser light source 1 and condensing lens 3.

$$\Delta Y = Ay \times (YA + YB)/2 \quad (5)$$

where $\Delta Y$ is an amount of relative position shift in Y direction between laser light source 1 and condensing lens 3.

$$\Delta Z = Az \times (ZA + ZB)/2 \quad (6)$$

where $\Delta Z$ is an amount of relative position shift in Z direction between laser light source 1 and condensing lens 3.

The amount $\Delta X$ of relative position shift in the X direction is computed by means of a difference in the distance between the beam spots 7A and 7B from the distance therebetween in the ideal state. The shift in the Y direction is computed by means of an average difference in the positions of the beam spots 7A and 7B in the Y direction from the positions thereof in the ideal state. The shift in the Z direction is computed by means of an average difference in the positions of the beam spots 7A and 7C in the Z direction from the positions thereof in the ideal state.

After the desired accuracy of the relative position between the laser light source 1 and the condensing lens 3 is achieved by, based on the computed $\Delta X$, $\Delta Y$ and $\Delta Z$, three-dimensionally driving and controlling the tool hand (not shown), which is holding the laser light source 1, the laser light source 1 is fixed to the laser holder 2. The method of fixing the laser light source 1 and the condensing lens 3 to the laser holder 2 is a known method such as screwing, fitting and adhering.

Figure 20:
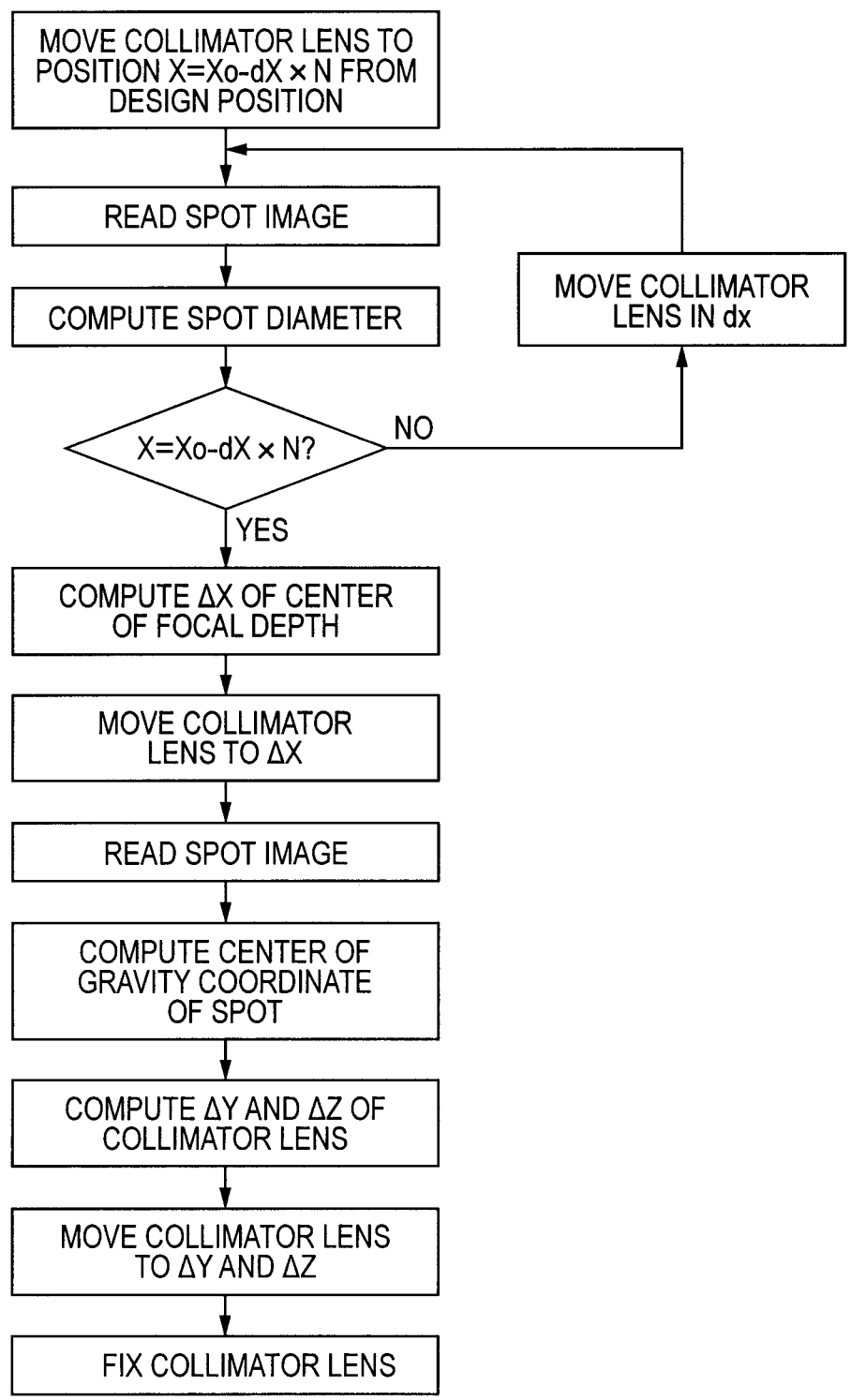
FIG. 20 is a flowchart illustrating the adjustment method for the relative position between the laser light source and the condensing optical element according to a conventional example.

FIG. 3 summarizes this adjustment method as an algorithm. The reading of the profile of each of the beam spots needs to be carried out only once as illustrated in FIG. 3, and the defocus amount $\Delta X$, and the irradiated position shifts $\Delta Y$ and $\Delta Z$ can be computed by means of the center of gravity coordinates computed from the profiles of the result of the measurement carried out only once. Therefore, it is not necessary for the present invention to repeat reading the profile of each of the beam spots under a plurality of position conditions while moving the positions of the lens and the laser light source, thereby computing spot diameters as illustrated in FIG. 20 exemplified as a comparative example.

The coordinate displacement sensitivities Ay and Az are determined by the focal length of the condensing lens 3 and the focal length of the tool lens 6, and the focal length of the tool lens 6 thus needs to be optimized according to the condensing lens 3 of the light source unit to be adjusted in order to obtain desired sensitivities. It is only necessary to increase the focal length of the tool lens 6 in order to increase the sensitivities, thereby increasing a detection accuracy.

The coordinate displacement sensitivity Ax is determined by the focal length of the condensing lens 3, the focal length of the tool lens 6 and the light beam width of the light beam 10. The light beam is preferably wider for increasing the sensitivity, thereby increasing the detection accuracy, and the arrangement direction of the prisms 5A and 5B constructing the pupil dividing element 5 is preferably aligned with the maximum diameter direction of the light beam 10.

Figure 4B:
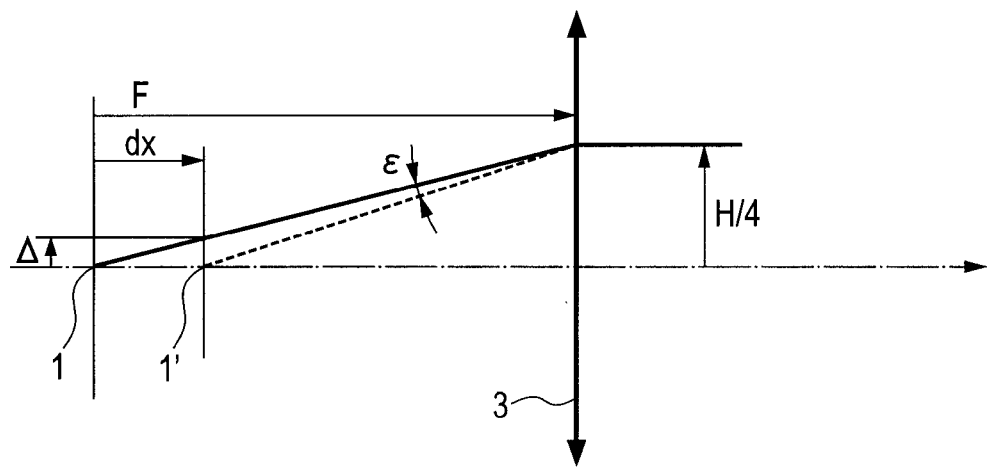
FIG. 4B is an enlarged view of the schematic configuration diagram of the adjustment apparatus of the present invention illustrated in FIG. 4A.

A reason for this is now described referring to FIGS. 4A and 4B.

FIG. 4A is an exaggerated version of FIG. 1. Reference symbols of FIG. 4A are the same as those illustrated in FIG. 1. An optical path is indicated by broken lines if the laser light source 1 approaches from the design position toward the condensing lens 3 to a laser light source 1' in FIGS. 4A and 4B. Moreover, the Y direction illustrated in FIGS. 4A and 4B is the direction of the maximum diameter of the pupil, and the light beam width in the maximum diameter direction of the pupil is H. Moreover, the pupil dividing elements 5A and 5B are arranged in the direction of the maximum diameter of the pupil. The light beam on the pupil dividing element 5B side is omitted for the sake of simplicity in FIG. 4A. The laser light source is closer to the condensing lens 3, and the light beam emitted from the condensing lens 3 thus tends to disperse slightly. As a result, the beam spot 7A on the image plane 7 corresponding to the light beam 10A which has passed through the pupil dividing element 5A is displaced to a beam spot 7A'.

FIG. 4B is an enlarged view of the laser light sources 1 and 1' and the condensing lens 3 of FIG. 4A, and illustrates details of this portion. FIG. 4B illustrates only the laser light sources 1 and 1', the condensing lens 3 and the center light beams (a solid line represents the center light beam for the laser light source 1, and a broken line represents that for the laser light source 1') of the light beam 10A. The laser light source 1 is disposed at the position (ideal position or design position) corresponding to a front focal length F of the condensing lens 3. The focal length of the tool lens 6 is Fj. It is assumed that the laser light source 1' is actually attached to a position shifted with respect to the laser light source 1 by dX along the optical axis. The distance between the center light beam and the optical axis is H/4 at the condensing lens 3. Moreover, a distance between the center light beam emitted from the laser light source 1 and the optical axis at the position of the laser light source 1' is defined as $\Delta$, and a relative angle between the two center light beams respectively emitted from the laser light source 1' and the laser light source 1 is $\epsilon$ as illustrated in FIG. 4B. The following relationship holds true on this occasion.

$$\Delta = (F - dX) \times \epsilon \approx f \times \epsilon \quad (7)$$

Moreover, the following relationship holds true according to a similarity in FIG. 4B.

$$(H/4)/F = \Delta/dX \quad (8)$$

Then, the following expression is obtained from the expressions (7) and (8).

$$\epsilon \approx \Delta/F = dX \times H/(4 \times F^2) \quad (9)$$

Further, the two center light beams enters the tool lens 6 at the mutual angle $\epsilon$, and the interval dY between the beam spots 7A and 7A' is thus represented by the following expression (10).

$$dY = Fj \times \epsilon \approx Fj \times dX \times H/(4 \times F^2) \quad (10)$$

According to this expression, dY is proportional to H, and dY changes largely, and the sensitivity increases as H increases, that is, as the pupil diameter of the light beam increases. The arrangement direction of the prisms 5A and 5B constructing the pupil dividing element 5 thus preferably coincides with the direction of the maximum diameter of the light beam 10.

Moreover, the expression (10) is transformed into the following expression (11).

$$dX \approx dY \times (4 \times F^2)/H/Fj \quad (11)$$

The coordinate displacement sensitivity Ax defined by the expression (1) can thus be approximated by the following expression (12).

$$Ax \approx (4 \times F^2)/H/Fj \quad (12)$$

A relative angle between the two light beams 10A and 10B divided by the pupil dividing element 5 is P (rad) for the arrangement exactly following the design values in FIG. 1. The relative distance 2Yo between the spots 7A and 7B on the image plane 7 on this occasion is represented by:

$$2Yo = P \times Fj \quad (13),$$

where Fj is the focal length of the tool lens 6.

On the other hand, the positions of the spots 7A and 7B respectively change by:

$$dY \approx \pm Fj \times Xmax \times H/(4 \times F^2) \quad (14),$$

where Xmax is an absolute value of the maximum shift amount in the optical axis direction between the laser light source and the condensing optical element generated by the assembly. It is thus estimated that the displacement in the relative distance between the spots 7A and 7B changes within the following expression (15).

$$\pm Fj \times Xmax \times H/(4 \times F^2) \times 2 \quad (15)$$

Therefore, if the relative distance between the spots 7A and 7B for the arrangement following the design values (expression (13)) and the displacement in the relative distance between the spots 7A and 7B generated by the assembly (expression (15)) are not correctly set, the sequence of the spots 7A and 7B is switched, resulting in difficulty in computing the shift amount in the optical axis direction. According to the present invention, the following expression (16) is thus provided.

$$2Yo = P \times Fj > Fj \times Xmax \times H/(4 \times F^2) \times 2 \quad (16)$$

The following expression (17) is further provided considering a spot diameter Sp of the spots 7A and 7B.

$$2Yo + Sp = P \times Fj + Sp > Fj \times Xmax \times H/(4 \times F^2) \times 2 \quad (17)$$

Though the condensing lens 3 is fixed first, and the laser light source 1 is then finely adjusted according to this embodiment, conversely, the laser light source 1 may be fixed first, and the position of the condensing lens 3 may then be finely adjusted.

The coordinates of the beam spots in the ideal arrangement may be computed by means of simulation, or coordinates of beam spots in a master light source unit produced according to actual objects may be used.

Though the CCD camera constructed by the objective lens and the two-dimensional CCD sensor is described as the light receiving sensor, the light receiving sensor is not limited to the CCD camera. A known method may be employed as long as the method can compute the center of gravity coordinates of the received beam spots. Various variations such as a light receiving surface of a sensor disposed directly on the image plane 7, a CMOS sensor, or a one-dimensional line sensor may be employed as the light receiving sensor. Moreover, if the interval between the beam spots 7A and 7B increases according to the setting of the angles of the prisms of the pupil dividing element 5, and one sensor cannot receive the spots, two light receiving sensors may be used, or one light receiving sensor may be mounted on a moving stage and then the images of the beam spots 7A and 7B may be sequentially read. Moreover, though it is assumed that the light source unit providing the parallel light beam by means of the condensing lens 3 is used according to this embodiment, the present invention is not limited to this light source unit, and may be applied to a light source unit providing a converged light beam or a dispersed light beam. Moreover, the optical system of the present invention such as the pupil dividing element and the tool lens may be applied to a case where the laser light source unit is built into a scanning optical system.

The power of the tool lens 6 may be reduced or the tool lens 6 itself may be omitted by forming at least either the incident surface or the exit surface of the prisms 5A and 5B into, instead of a plane, a lens array in which curved surfaces having the same curvature are arranged.

Further, according to this embodiment, the pupil dividing element 5 is described as the prism-array having the incident surfaces that are inclined with respect to the YZ plane, and the exit surfaces that are constructed by the one plane parallel with the YZ plane, but the present invention is not limited to this configuration. Even a prism-array having exit surfaces that are inclined with respect to the YZ plane and incident surfaces that are constructed by one plane parallel with the YZ plane can enjoy the effect of the present invention. In other words, even a prism-array in which either its incident surface or exit surface is inclined with respect to the YZ plane and the other thereof is constructed by one plane parallel with the YZ plane can enjoy the effect of the present invention.

Numerical Example 1

A description is now given of a Numerical Example of the adjustment apparatus according to the first embodiment illustrated in FIGS. 1 and 2.

The optical system is arranged as shown in Table 1. In Table 1, R denotes a curvature radius of a surface; d, interval between an n-th surface and an (n+1)th surface; and N, a refractive index.

TABLE 1

|  | Surface number | R | d | N |
|---|---|---|---|---|
| LD | 1 | 0.00 | 2.0 | 1.0000 |
| Cover glass | 2 | 0.00 | 0.3 | 1.5105 |
|  | 3 | 0.00 | 21.1 | 1.0000 |
| Subject lens | 4 | 0.00 | 3.0 | 1.7617 |
|  | 5 | −19.06 | 23.6 | 1.0000 |
| Stop | 6 | 0.00 | 5.0 | 1.0000 |
| Pupil dividing element | 7 | 0.00 | 2.0 | 1.5105 |
|  | 8 | 0.00 | 293.0 | 1.0000 |
| Tool lens G1 | 9 | 170.59 | 13.2 | 1.5105 |
| Tool lens G2 | 10 | −154.44 | 5.7 | 1.7851 |
|  | 11 | −369.90 | 292.4 | 1.0000 |
| Image plane | 13 | 0.00 |  |  |

Inclination angle of pupil dividing element: 0.1 degrees Stop: 5.00 (in Y direction)×2.60 (in Y direction)

FIGS. 5A to 5F illustrate how the coordinates of the beam spots 7A and 7B are displaced if a position shift of the laser light source 1 is generated with respect to the condensing lens 3 in Numerical Example 1.

Figure 5A:
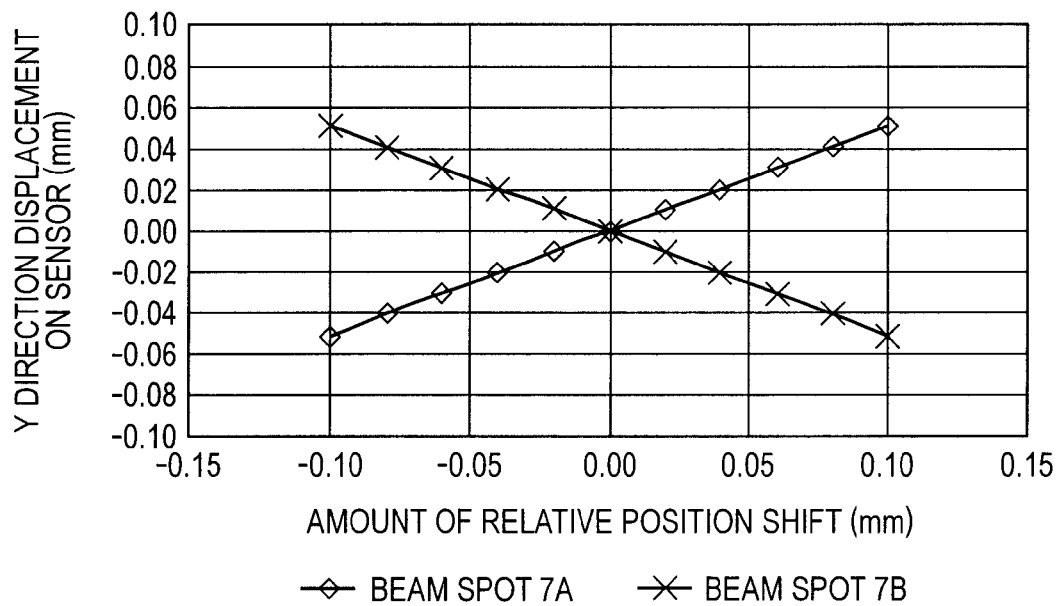
FIG. 5A is a chart illustrating displacement amounts of beam spots in a Y direction which are obtained if the laser light source is shifted in an X direction in Numerical Example 1 according to the first embodiment of the present invention.
Figure 5B:
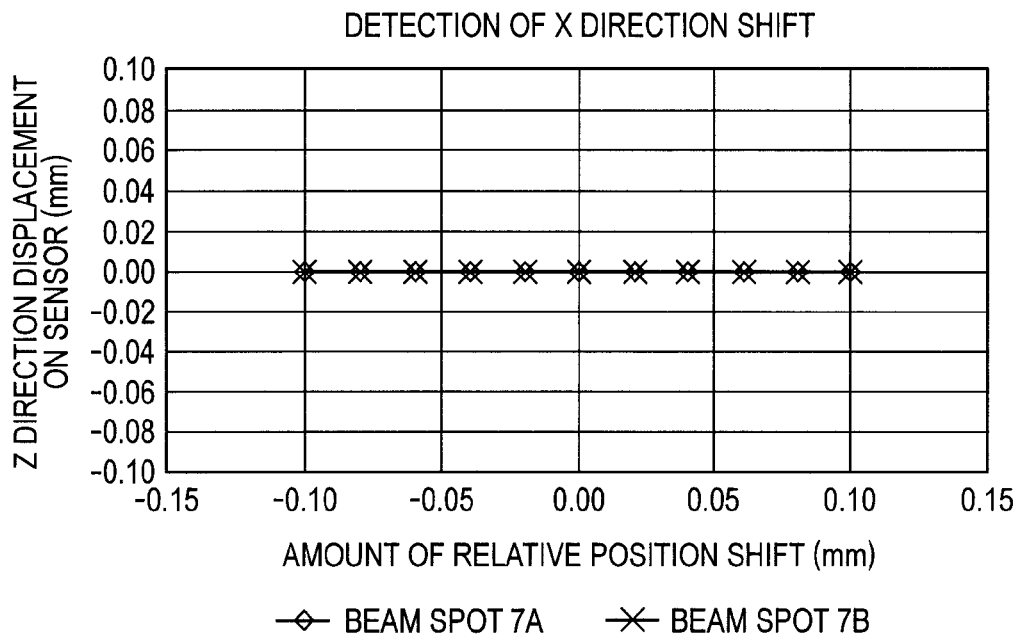
FIG. 5B is a chart illustrating displacement amounts of the beam spots in a Z direction which are obtained if the laser light source is shifted in the X direction in Numerical Example 1 according to the first embodiment of the present invention.

FIGS. 5A and 5B illustrate the displacement amounts of the Y coordinates and the Z coordinates of the beam spots 7A and 7B which are obtained if the laser light source 1 is shifted in the X direction with respect to the condensing lens 3. A negative relative position shift represents an increase in the interval between the condensing lens 3 and the laser light source 1. The beam spots 7A and 7B are displaced toward the sides opposite to each other in the Y direction if the interval between the condensing lens 3 and the laser light source 1 changes as can be seen from FIG. 5A. Moreover, the beam spots 7A and 7B are not displaced in the Z direction if the interval between the condensing lens 3 and the laser light source 1 changes as can be seen from FIG. 5B. Ax is equal to 0.1 mm/0.102 mm as can be seen from FIG. 5A.

Figure 5C:
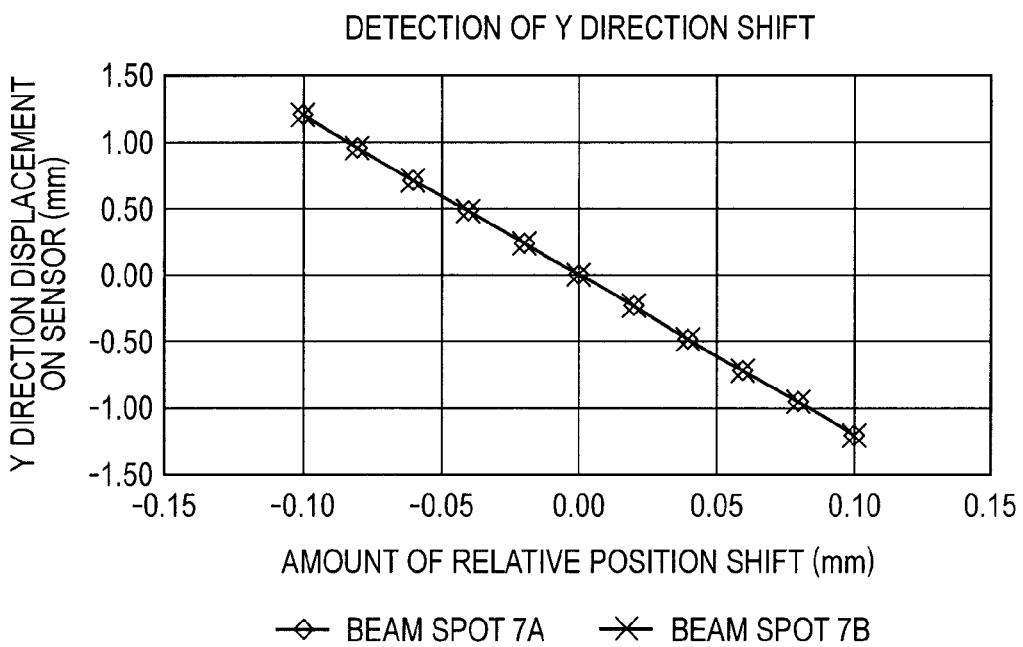
FIG. 5C is a chart illustrating displacement amounts of the beam spots in the Y direction which are obtained if the laser light source is shifted in the Y direction in Numerical Example 1 according to the first embodiment of the present invention.
Figure 5D:
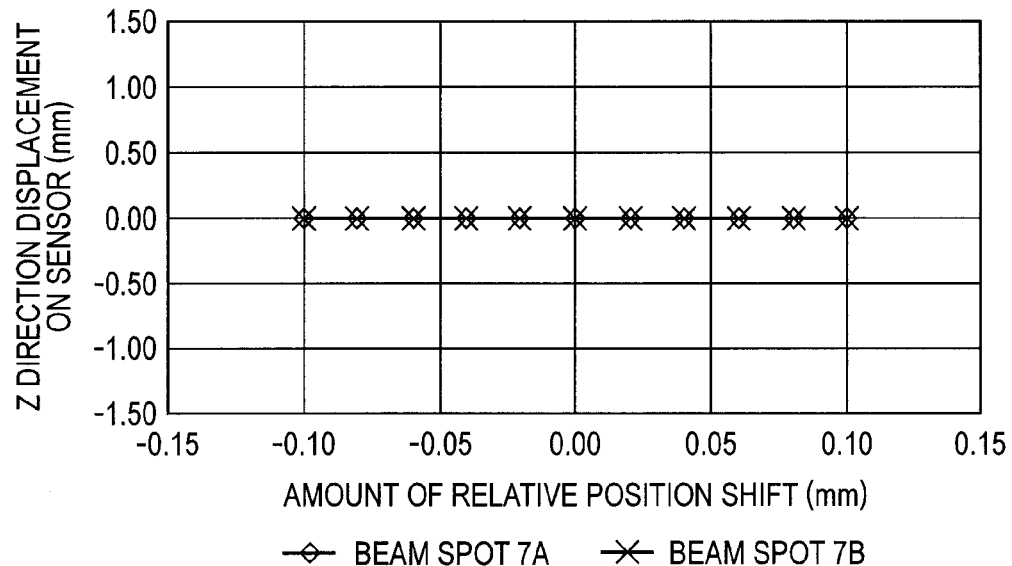
FIG. 5D is a chart illustrating displacement amounts of the beam spots in the Z direction which are obtained if the laser light source is shifted in the Y direction in Numerical Example 1 according to the first embodiment of the present invention.

FIGS. 5C and 5D illustrate the displacement amounts of the Y coordinates and the Z coordinates of the beam spots 7A and 7B which are obtained if the laser light source 1 is shifted in the Y direction with respect to the condensing lens 3. The beam spots 7A and 7B are displaced toward the same side in the Y direction if the condensing lens 3 and the laser light source 1 are shifted relatively in the Y direction as can be seen from FIG. 5C. Moreover, the beam spots 7A and 7B are not displaced in the Z direction if the condensing lens 3 and the laser light source 1 are shifted relatively in the Y direction as can be seen from FIG. 5D. Ay is equal to 0.1 mm/1.21 mm as can be seen from FIG. 5C.

Figure 5E:
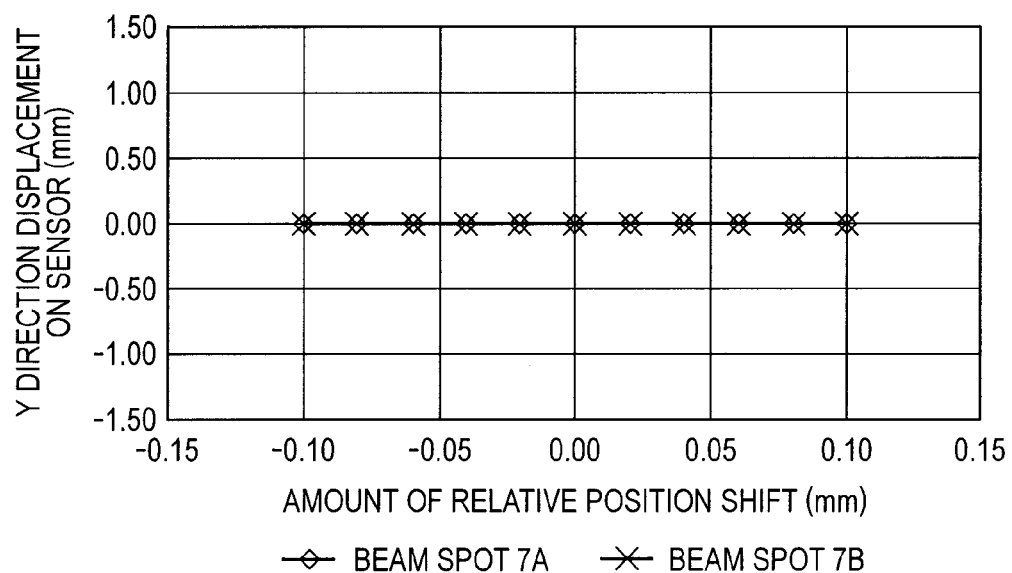
FIG. 5E is a chart illustrating displacement amounts of the beam spots in the Y direction which are obtained if the laser light source is shifted in the Z direction in Numerical Example 1 according to the first embodiment of the present invention.
Figure 5F:
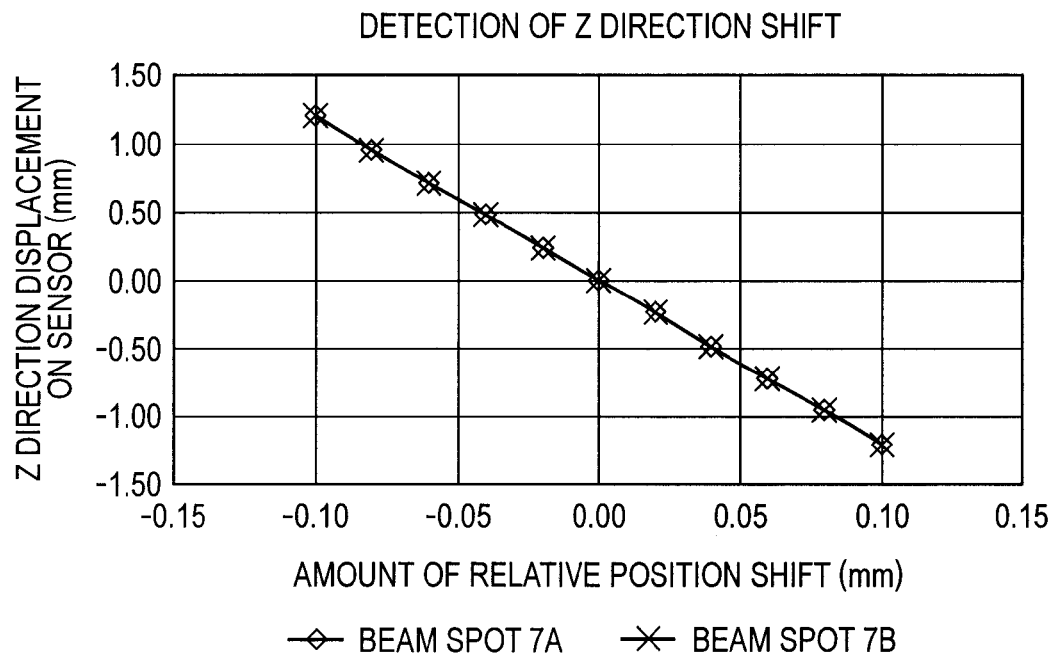
FIG. 5F is a chart illustrating displacement amounts of the beam spots in the Z direction which are obtained if the laser light source is shifted in the Z direction in Numerical Example 1 according to the first embodiment of the present invention.

FIGS. 5E and 5F illustrate the displacement amounts of the Y coordinates and the Z coordinates of the beam spots 7A and 7B which are obtained if the laser light source 1 is shifted in the Z direction with respect to the condensing lens 3. The beam spots 7A and 7B are not displaced in the Y direction if the condensing lens 3 and the laser light source 1 are shifted relatively in the Z direction as can be seen from FIG. 5E. Moreover, the beam spots 7A and 7B are displaced toward the same side in the Z direction if the condensing lens 3 and the laser light source 1 are shifted relatively in the Z direction as can be seen from FIG. 5F. Az is equal to 0.1 mm/1.21 mm as can be seen from FIG. 5F.

FIG. 5G to 5J plot loci of the beam spots 7A and 7B on the YZ plane of the image plane 7 according to the displacements illustrated in FIGS. 5A to 5F.

Figure 5G:
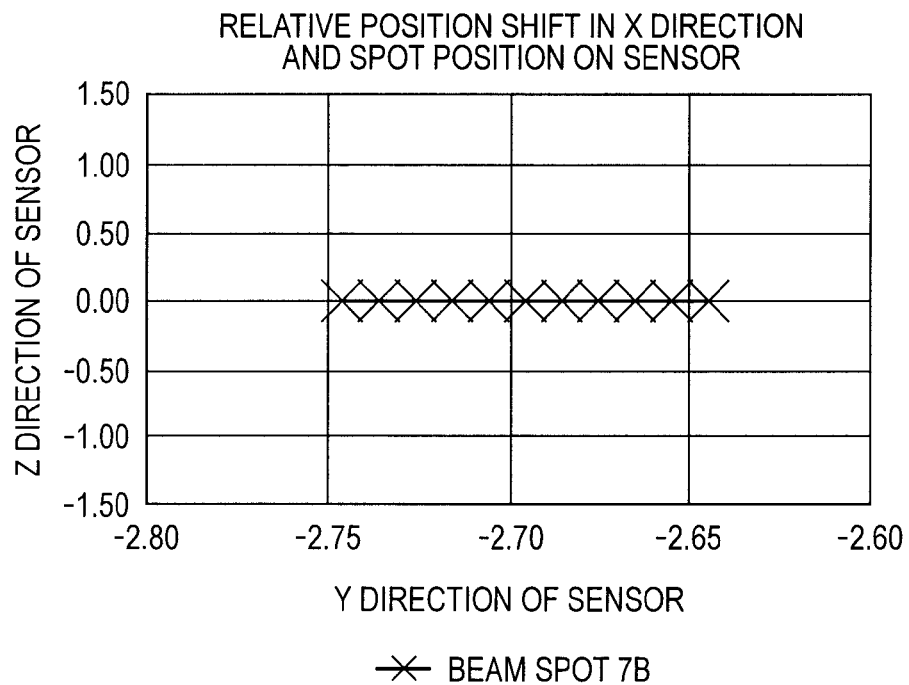
FIG. 5G is a chart illustrating movement locus of the beam spots on a YZ plane which are obtained if the laser light source is displaced in the X direction with a pitch of 0.02 mm by ±0.1 mm in Numerical Example 1 according to the first embodiment of the present invention.
Figure 5H:
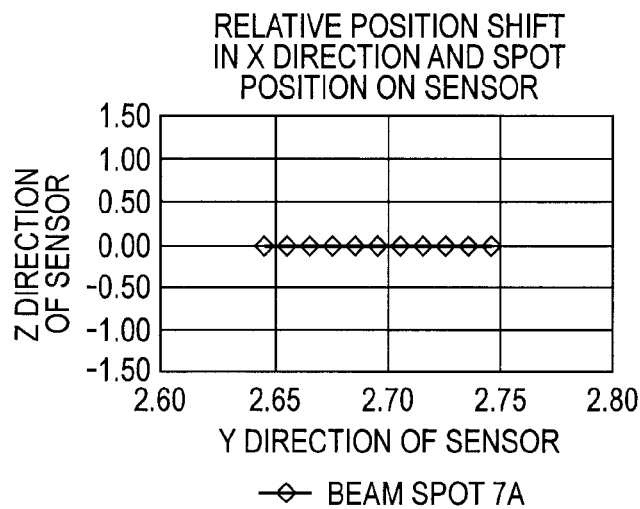
FIG. 5H is a chart illustrating movement locus of the beam spots on the YZ plane which are obtained if the laser light source is displaced in the X direction with the pitch of 0.02 mm by ±0.1 mm in Numerical Example 1 according to the first embodiment of the present invention.

FIGS. 5G and 5H illustrate loci of each of the spots on the YZ plane which is obtained if the laser light source 1 is shifted with respect to the condensing lens 3 in the X direction with a pitch of 0.02 mm by ±0.1 mm. On this occasion, the beam spots are displaced toward the sides opposite to each other in the Y direction on the YZ plane.

Figure 5I:
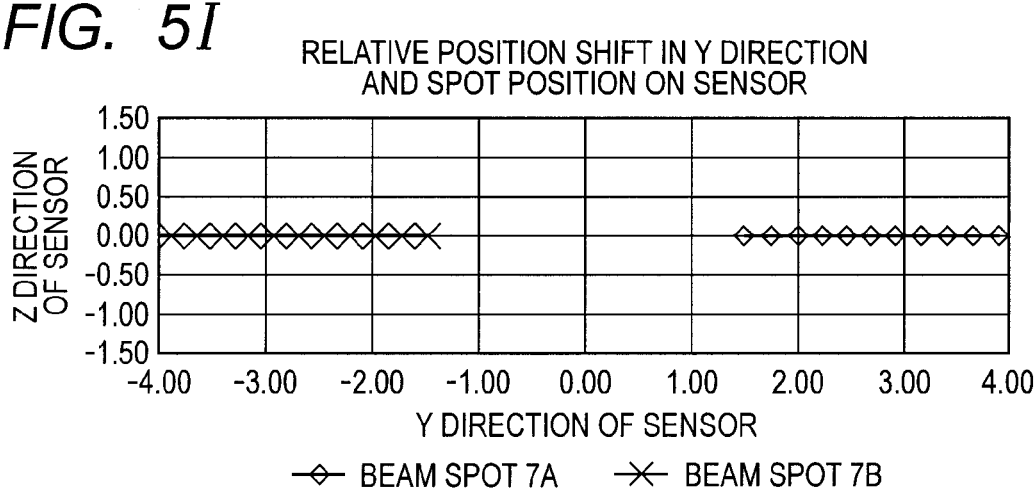
FIG. 5I is a chart illustrating movement locus of the beam spots on the YZ plane which are obtained if the laser light source is displaced in the Y direction with the pitch of 0.02 mm by ±0.1 mm in Numerical Example 1 according to the first embodiment of the present invention.

FIG. 5I illustrates loci of the spots on the YZ plane which are obtained if the laser light source 1 is shifted with respect to the condensing lens 3 in the Y direction with the pitch of 0.02 mm by ±0.1 mm. On this occasion, the beam spots are displaced toward the same side in the Y direction on the YZ plane.

Figure 5J:
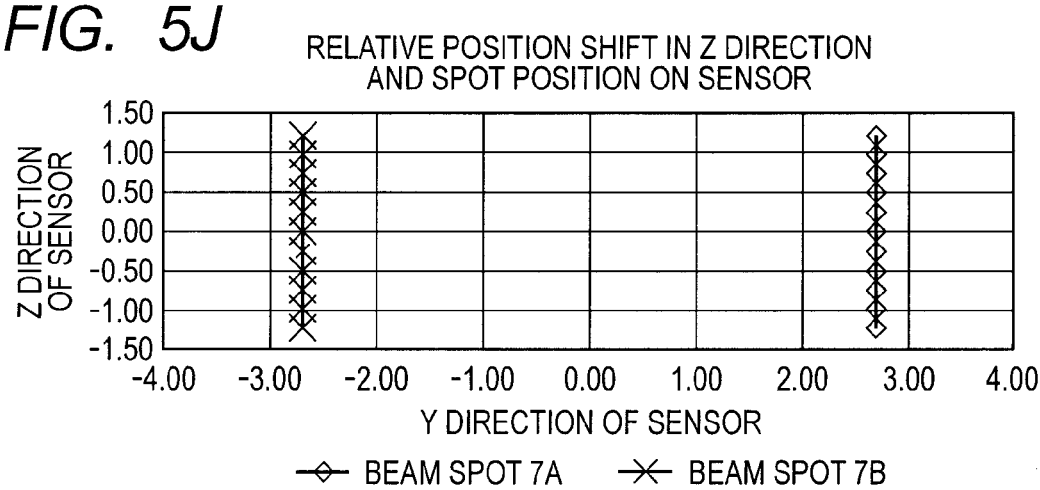
FIG. 5J is a chart illustrating movement locus of the beam spots on the YZ plane which are obtained if the laser light source is displaced in the Z direction with the pitch of 0.02 mm by ±0.1 mm in Numerical Example 1 according to the first embodiment of the present invention.

FIG. 5J illustrates loci of the spots on the YZ plane which are obtained if the laser light source 1 is shifted with respect to the condensing lens 3 in the Z direction with the pitch of 0.02 mm by ±0.1 mm. On this occasion, the beam spots are displaced toward the same side in the Z direction on the YZ plane.

As described above, the change amounts in the interval and the position of the beam spots 7A and 7B are proportional to the change amount in the relative position between the laser light source 1 and the condensing lens 3. It is thus possible to compute how much the relative position between the laser light source 1 and the condensing lens 3 is shifted with respect to that in the ideal position by reading the coordinates of the beam spots 7A and 7B, and accurately measuring the change amounts of the interval and the positions thereof.

The desired accuracy of the relative position between the laser light source 1 and the condensing lens 3 is achieved by, based on $\Delta X$, $\Delta Y$ and $\Delta Z$ which are computed according to the above-mentioned expressions (4) to (6), three-dimensionally driving and controlling the tool hand (not shown), which holds the laser light source 1. Then, the laser light source 1 is fixed. The method of fixing the laser light source 1 and the condensing lens 3 to the laser holder 2 is a known method such as screwing, fitting, and adhering. Needless to say, this adjustment apparatus can be applied to a laser light source of a multi-beam type.

It is not necessary for the configuration of the present invention to repeat the conventional process of reading the images of the beam spots and computing the spot diameters and the peak quantity of light of the beam spots for many times, and it is thus possible to compute the three-dimensional relative position shift amount by reading the images of the beam spots once, and then carrying out the computation processing.

Moreover, if the focus and the like are checked again for an assembled light source unit, fewer man-hours are required for the check. The man-hours for the assembly can thus be considerably reduced, resulting in a reduction in cost.

Second Embodiment

Figure 6:
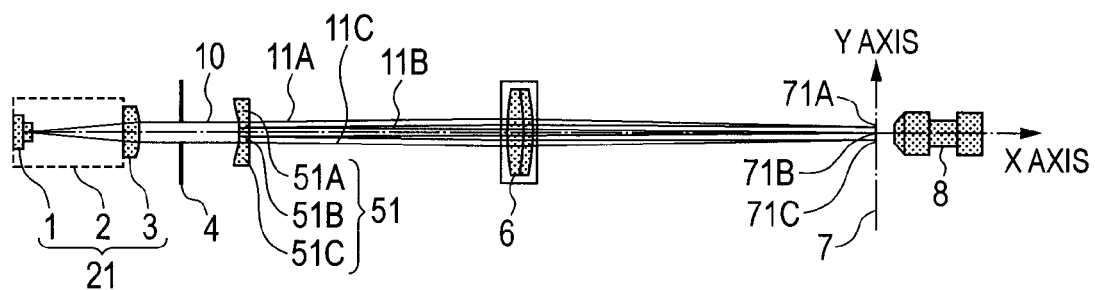
FIG. 6 is a cross sectional view illustrating an adjustment apparatus according to a second embodiment of the present invention.
Figure 7:
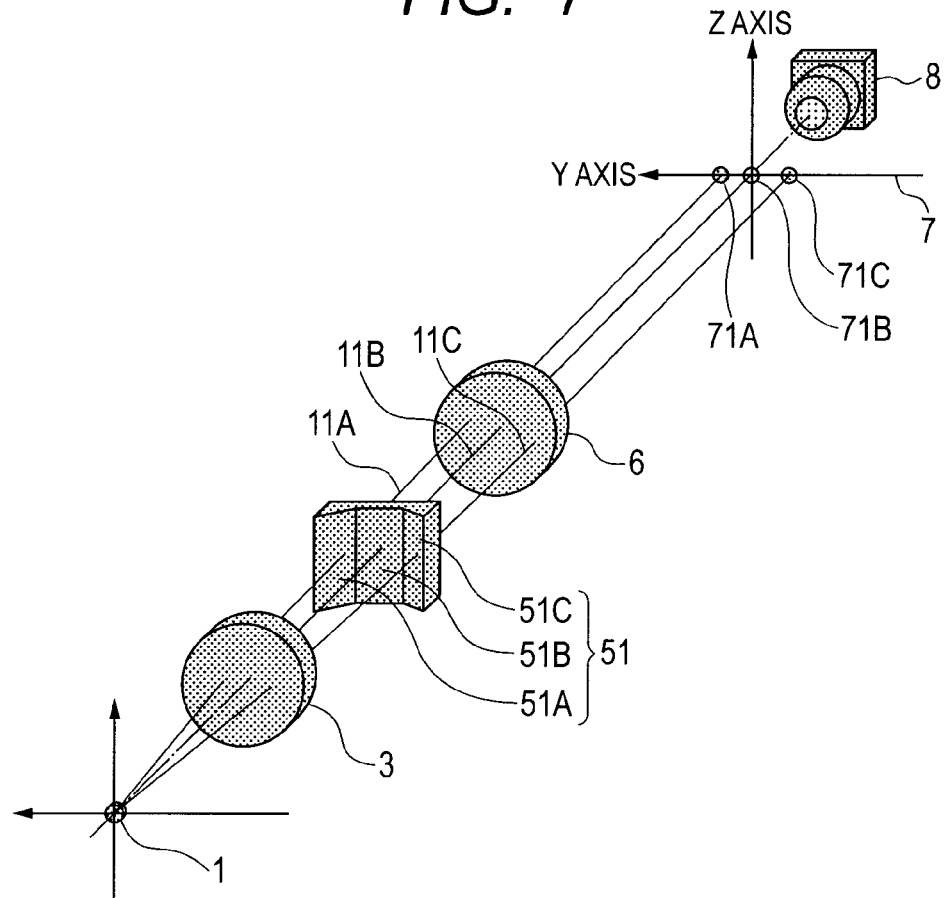
FIG. 7 is a perspective view illustrating the adjustment apparatus according to the second embodiment of the present invention.

FIG. 6 is a cross sectional view and FIG. 7 is a perspective view of an adjustment apparatus of a light source unit for a scanning optical system according to a second embodiment of the present invention.

Though the adjustment apparatus of this embodiment has the same configuration as that of the adjustment apparatus of the first embodiment, a pupil dividing element 51 is used in this embodiment in place of the pupil dividing element 5 of the adjustment apparatus of the first embodiment.

A description is now given of a configuration of the adjustment apparatus of this embodiment referring to FIGS. 6 and 7. The configuration of the adjustment apparatus of this embodiment is the same as that of the first embodiment except for the pupil dividing element 51, and a description of the same configuration is thus omitted.

The pupil dividing element (dividing element) 51 is constructed by arranging a prism 51A, a parallel flat plate portion 51B and a prism 51C in the Y direction. The prism 51A and the prism 51C have shapes symmetrical with each other with respect to the XZ plane. Incident surfaces of the prisms 51A and 51C are inclined with respect to the YZ plane, and exit surfaces are formed by one plane parallel with the YZ plane in FIGS. 6 and 7. Though the slopes of the incident surfaces of the prisms 51A and 51C are inclined so that the thickness decreases toward the optical axis in FIGS. 6 and 7, the slopes may be inclined so that the thickness conversely increases toward the optical axis.

The arrangement direction of the prism 51A, the parallel flat plate portion 51B and the prism 51C constructing the pupil dividing element 51 is the Y direction, and coincides with the maximum diameter direction of the light beam 10.

The tool lens 6 condenses incident beams onto the image plane 7, thereby forming beam spots 71A, 71B and 71C. The beam spots formed on the image plane 7 are read as an image by the CCD camera 8 serving as the light receiving sensor. The CCD camera 8 is constructed by the CCD sensor in which the objective lenses and the light receiving pixels are two-dimensionally arranged. The image processing system (not shown) computes where the center of gravity of each of the beam spots read as the image by the CCD camera 8 is present on the YZ coordinate system of the image plane 7. Driving and controlling of the tool hand (not shown) holding the laser light source 1 is carried out based on the computed YZ coordinates of the beam spots.

A description is now given of a more specific operation referring to FIGS. 6 and 7. Only marginal beams of the light beams are illustrated in FIG. 6, and only principal rays of the light beams are illustrated in FIG. 7 for the sake of simple description. The configuration of the adjustment apparatus of this embodiment is the same as that of the first embodiment except for the pupil dividing element 51, and thus a description of an optical path of the light beams which are emitted from the laser light source and enters the pupil dividing element 51 is omitted.

The light beam 10 which has passed through the stop 4 enters the prisms 51A, the parallel flat plate portion 51B and the prism 51C constructing the pupil dividing element 51. The light beam 10 is divided into three portions, that is, a light beam 11A on the pupil plus side, a light beam 11B in a pupil center portion and a light beam 11C on the pupil minus side, in the Y direction as can be seen from FIG. 6. The light beam 11A on the pupil plus side is deflected by the prism 51A to the plus side in the Y direction, and the light beam 11C on the pupil minus side is deflected by the prism 51C to the minus side in the Y direction. The light beam 11B in the center portion of the pupil passes through the parallel flat plate portion 51B as it is.

The light beams 11A, 11B and 11C that have entered the tool lens 6 undergo imaging effect of the tool lens 6, thereby respectively forming the beam spots 71A, 71B and 71C on the image plane 7 of the tool lens 6.

The beam spots 71A, 71B and 71C on the image plane 7 are read as an image by the CCD camera 8. The image processing system (not shown) computes where the center of gravity of each of the beam spots read as the image is present on the YZ coordinate system of the image plane 7.

If the laser light source 1 and the condensing lens 3 are arranged in an ideal state (at design positions), and the laser beam emitted from the condensing lens 3 is a parallel light beam having the desired parallelism, the beam spots 71A, 71B and 71C form images respectively at positions (+Yo,0), (0,0) and (−Yo,0) on the Y axis of the image plane 7 where a point on the image plane 7 on the optical axis is represented as the origin (0,0) on the YZ plane.

A description is now given of how the beam spots 71A, 71B and 71C are observed if the relative position between the laser light source 1 and the condensing lens 3 are shifted on this occasion.

First, if the distance in the X direction between the laser light source 1 and the condensing lens 3 is shorter by ΔX than that in the ideal state, the light beam emitted from the condensing lens 3 is a light beam tending to disperse. If the light beam 10 is a dispersed light beam, the light beam 11A divided by the pupil dividing element 5 departs further from the X axis, and is displaced toward the plus side in the Y direction as can be seen from FIG. 6. As a result, the light beam 11A that has entered the tool lens 6 departs further from the X axis, and is condensed while displaced toward the plus side in the Y direction, resulting in a displacement toward the plus side of the position of the beam spot 71A on the image plane 7. The beam spot 71A is observed as a beam spot at a position (+Yo+dY, 0) on the image plane 7 where dY is a displacement amount obtained in this case.

Similarly, if the light beam 10 is a dispersed light beam, the light beam 11C divided by the pupil dividing element 51 departs further from the X axis, and is displaced toward the minus side in the Y direction. As a result, the light beam 11C that has entered the tool lens 6 departs further from the X axis, and is condensed while displaced toward the minus side in the Y direction, resulting in a displacement toward the minus side of the position of the beam spot 71C on the image plane 7. The beam spot 71C is observed as a beam spot at a position (−Yo−dY, 0) on the image plane 7 where −dY is a displacement amount obtained in this case.

As a result, if the distance in the X direction between the laser light source 1 and the condensing lens 3 is shorter by ΔX than that in the ideal state, the interval between the beam spots 71A and 71C is observed as that increased by 2×dY.

On the other hand, if the light beam 10 is a dispersed light beam, the light beam 11B divided by the pupil dividing element 51 does not generate such a displacement as that of the light beams 11A and 11C, and is observed as a beam spot at the position (0,0).

Then, if the position of the laser light source 1 is moved in the Y direction by ΔY<0 from that in the ideal state with respect to the condensing lens 3 (moved toward the minus side in the Y axis direction), the light beam 10 emitted from the condensing lens 3 has an angle in the Y direction toward the plus side. If the light beam 10 has the angle in the Y direction toward the plus side, the light beam 11A divided by the pupil dividing element 51 also has an angle in the Y direction toward the plus side as can be seen from FIG. 6. As a result, the light beam 11A that has entered the tool lens 6 also proceeds at an angle in the Y direction toward the plus side, and the position of the beam spot 71A on the image plane 7 is thus displaced toward the plus side. The beam spot 71A is observed as a beam spot at a position (+Yo+dY, 0) where dY is a displacement amount obtained in this case.

Similarly, if the light beam 10 has an angle in the Y direction toward the plus side, the light beam 11B divided by the pupil dividing element 51 also has an angle in the Y direction toward the plus side. As a result, the light beam 11B that has entered the tool lens 6 also proceeds at an angle in the Y direction toward the plus side, and the position of the beam spot 71B on the image plane 7 is thus displaced toward the plus side. The beam spot 71B is observed as a beam spot at a position (+dY, 0) where dY is a displacement amount obtained in this case.

Similarly, if the light beam 10 has an angle in the Y direction toward the plus side, the light beam 11C divided by the pupil dividing element 51 also has an angle in the Y direction toward the plus side. As a result, the light beam 11C that has entered the tool lens 6 also proceeds at an angle in the Y direction toward the plus side, and the position of the beam spot 71C on the image plane 7 is thus displaced toward the plus side. The beam spot 71C is observed as a beam spot at a position (−Yo+dY, 0) where dY is a displacement amount obtained in this case.

As a result, if the position of the laser light source 1 is moved in the Y direction by ΔY<0 from that in the ideal state with respect to the condensing lens 3, the interval between the beam spots 71A, 71B and 71C does not change, and all the beam spots 71A, 71B and 71C are observed as those displaced in the Y direction by dY.

If the position of the laser light source 1 is moved in the Z direction by ΔZ<0 from that in the ideal state with respect to the condensing lens 3 (moved toward the minus side in the Z axis direction), the light beam 10 emitted from the condensing lens 3 has an angle in the Z direction toward the plus side. If the light beam 10 has the angle in the Z direction toward the plus side, the light beam 11A divided by the pupil dividing element 51 also has an angle in the Z direction toward the plus side as can be seen from FIG. 7. As a result, the light beam 11A that has entered the tool lens 6 also proceeds at an angle in the Z direction toward the plus side, and the position of the beam spot 71A on the image plane 7 is thus displaced toward the plus side. The beam spot 71A is observed as a beam spot at a position (+Yo, dZ) where dZ is a displacement amount obtained in this case.

Similarly, if the light beam 10 has an angle in the Z direction toward the plus side, the light beam 11B divided by the pupil dividing element 51 also has an angle in the Z direction toward the plus side. As a result, the light beam 11B that has entered the tool lens 6 also proceeds at an angle in the Z direction toward the plus side, and the position of the beam spot 71B on the image plane 7 is thus displaced toward the plus side. The beam spot 71B is observed as a beam spot at a position (0, dZ) where dZ is a displacement amount obtained in this case.

Similarly, if the light beam 10 has an angle in the Z direction toward the plus side, the light beam 11C divided by the pupil dividing element 51 also has an angle in the Z direction toward the plus side. As a result, the light beam 11C that has entered the tool lens 6 also proceeds at an angle in the Z direction toward the plus side, and the position of the beam spot 71C on the image plane 7 is thus displaced toward the plus side. The beam spot 71C is observed as a beam spot at a position (−Yo, dZ) where dZ is a displacement amount obtained in this case.

As a result, if the position of the laser light source 1 is moved in the Z direction by ΔZ<0 from that in the ideal state with respect to the condensing lens 3, the interval between the beam spots 71A, 71B and 71C does not change, and all the beam spots 71A, 71B and 71C are observed as those displaced in the Z direction by dZ.

The change amounts in the interval between the beam spots 71A, 71B and 71C (relative position between the images of the three beams) and in the positions thereof (position of each of the images of the three beams with respect to the optical axis) are proportional to the change amount in the relative position between the laser light source 1 and the condensing lens 3 as described in the following Numerical Examples. It is thus possible to compute how much the relative position between the laser light source 1 and the condensing lens 3 is shifted with respect to that in the ideal position by reading the coordinates of the beam spots 71A, 71B and 71C, and accurately measuring the change amounts of the interval and the positions.

The beam spots 71A, 71B and 71C on the image plane 7 are read as an image by the CCD camera 8 according to the present invention. The image processing system (not shown) computes where the center of gravity of each of the beam spots read as the image is present on the YZ coordinate system of the image plane 7. The method of computing the coordinates of the center of gravity of each of the spots on the two-dimensional CCD sensor may be a known method.

The computed coordinates of the beam spots 71A, 71B and 71C on the YZ plane are (YA, ZA), (YB, ZB) and (YC, ZC), respectively. Moreover, the coordinates in the ideal state are (+Yo, 0), (0, 0) and (−Yo, 0).

Moreover, the coordinate displacement sensitivities of the beam spots 71A, 71B and 71C (expressions (1), (2) and (3)) with respect to the relative position shift between the laser light source 1 and the condensing lens 3 may be computed by means of simulation or experimentally. Based on those coordinate displacement sensitivities, the amounts of relative position shifts in the X, Y and Z directions (ΔX, ΔY and ΔZ) between the laser light source 1 and the condensing lens 3 are respectively represented by the following expressions (18) to (20).

$$\Delta X = Ax \times ((YA - YC) - 2 \times Yo) \quad (18)$$

where ΔX is an amount of relative position shift in X direction between laser light source 1 and condensing lens 3.

$$\Delta Y = Ay \times (YA + YC)/2 = Ax \times YB \quad (19)$$

where ΔY is an amount of relative position shift in Y direction between laser light source 1 and condensing lens 3.

$$\Delta Z = AZ \times (ZA + ZC)/2 = Ax \times YB \quad (20)$$

where ΔZ is an amount of relative position shift in Z direction between laser light source 1 and condensing lens 3.

The amount ΔX of relative position shift in the X direction is computed by means of a difference in the distance between the beam spots 71A and 71C from the distance therebetween in the ideal state. The shift in the Y direction is computed by means of an average difference in the positions of the beam spots 71A and 71C in the Y direction from the positions thereof in the ideal state. Further, the average difference is equivalent to the amount of displacement of the beam spot 71B obtained when the beam spot 71B shifts in the Y direction from the position of the beam spot 71B in the ideal state. The shift in the Z direction is computed by means of an average difference of the positions of the beam spots 71A and 71C in the Z direction from the positions thereof in the ideal state. Further, the average difference is equivalent to the amount of displacement of the beam spot 71B obtained when the beam spot 71B shifts in the Z direction from the position of the beam spot 71B in the ideal state.

After the desired accuracy of the relative position between the laser light source 1 and the condensing lens 3 is achieved by, based on the computed ΔX, ΔY and ΔZ, three-dimensionally driving and controlling the tool hand (not shown), which holds the laser light source 1, the laser light source 1 is fixed to the laser holder 2. The method of fixing the laser light source 1 and the condensing lens 3 to the laser holder 2 is a known method such as screwing, fitting and adhering.

The coordinate displacement sensitivities Ay and Az are determined by the focal length of the condensing lens 3 and the focal length of the tool lens 6, and the focal length of the tool lens 6 thus needs to be optimized according to the condensing lens 3 of the light source unit to be adjusted in order to obtain desired sensitivities. It is only necessary to increase the focal length of the tool lens 6 in order to increase the sensitivities, thereby increasing a detection accuracy.

The coordinate displacement sensitivity Ax is determined by the focal length of the condensing lens 3, the focal length of the tool lens 6 and the light beam width of the light beam 10. The light beam is preferably wider for increasing the sensitivity, thereby increasing the detection accuracy, and the arrangement direction of the prisms 5A and 5C constructing the pupil dividing element 51 is preferably aligned with the maximum diameter direction of the light beam 10.

Though the condensing lens 3 is fixed first, and the laser light source 1 is then finely adjusted according to this embodiment, conversely, the laser light source 1 may be fixed first, and the position of the condensing lens 3 may then be finely adjusted.

Though the CCD camera constructed by the objective lens and the two-dimensional CCD sensor is described as the light receiving sensor, the light receiving sensor is not limited to the CCD camera. A known method may be employed as long as the method can compute the center of gravity coordinates of the received beam spots. Various variations such as a light receiving surface of a sensor disposed directly on the image plane 7, a CMOS sensor, or a one-dimensional line sensor may be employed as the light receiving sensor. Moreover, if the interval between the beam spots 71A, 71B and 71C increases according to the setting of the angles of the prisms of the pupil dividing element 51, and one sensor cannot receive the spots, a plurality of light receiving sensors may be used, or one light receiving sensor may be mounted on a moving stage and then the images of the beam spots 71A, 71B and 71C may be sequentially read. Moreover, though it is assumed that the light source unit providing the parallel light beam by means of the condensing lens 3 is used according to this embodiment, the present invention is not limited to this light source unit, and may be applied to a light source unit providing a converged light beam or a dispersed light beam. Moreover, the optical system of the present invention such as the pupil dividing element and the tool lens may be applied to a case where the laser light source unit is built into a scanning optical system.

The power of the tool lens 6 may be reduced or the tool lens 6 itself may be omitted by forming at least either the incident surface or exit surface of the prisms 51A and 51C, and the parallel flat plate portion 51B into, instead of a plane, a lens array in which curved surfaces having the same curvature are arranged.

Further, according to this embodiment, the pupil dividing element 51 is described as the prism-array having the incident surfaces that are inclined with respect to the YZ plane, and the exit surfaces that are constructed by the one plane parallel with the YZ plane, but the present invention is not limited to this configuration. Even a prism-array having exit surfaces that are inclined with respect to the YZ plane and incident surfaces that are constructed by one plane parallel with the YZ plane can enjoy the effect of the present invention. In other words, even a prism-array in which at least either its incident surface or exit surface is inclined with respect to the YZ plane and the other thereof is constructed by one plane parallel with the YZ plane can enjoy the effect of the present invention.

Numerical Example 2

A description is now given of a Numerical Example of the adjustment apparatus according to the second embodiment illustrated in FIGS. 6 and 7.

The optical system is arranged as illustrated in Table 2.

TABLE 2

| | Surface number | R | d | N |
|---|---|---|---|---|
| LD | 1 | 0.00 | 2.0 | 1.0000 |
| Cover glass | 2 | 0.00 | 0.3 | 1.5105 |
| | 3 | 0.00 | 21.1 | 1.0000 |
| Subject lens | 4 | 0.00 | 3.0 | 1.7617 |
| | 5 | −19.06 | 23.6 | 1.0000 |
| Stop | 6 | 0.00 | 5.0 | 1.0000 |
| Pupil dividing element | 7 | 0.00 | 2.0 | 1.5105 |
| | 8 | 0.00 | 293.0 | 1.0000 |
| Tool lens G1 | 9 | 170.59 | 13.2 | 1.5105 |
| Tool lens G2 | 10 | −154.44 | 5.7 | 1.7851 |
| | 11 | −369.90 | 292.4 | 1.0000 |
| Image plane | 13 | 0.00 | | |

Inclination angle of pupil dividing element: 0.1 degrees Stop: 5.00 (in Y direction)×2.50 (in Z direction)
Width in Y direction of parallel flat plate portion B of pupil dividing element 2.50

Hereinafter, FIGS. 8A to 8F illustrate how the coordinates of the beam spots 71A, 71B and 71C are displaced if a position shift of the laser light source 1 is generated with respect to the condensing lens 3 in Numerical Example 2.

Figure 8A:
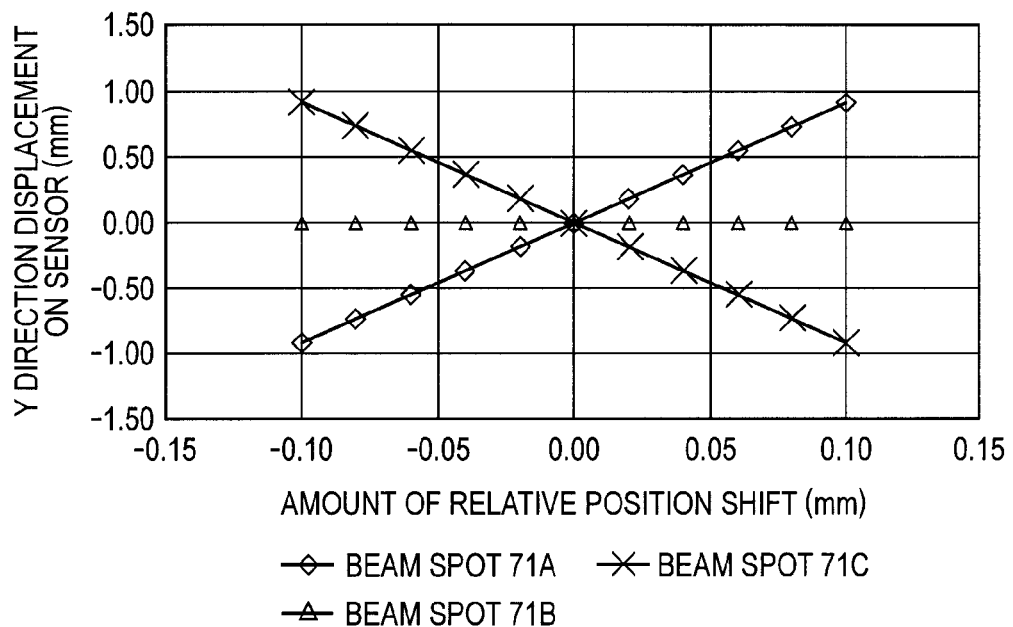
FIG. 8A is a chart illustrating displacement amounts of beam spots in the Y direction which are obtained if the laser light source is shifted in the X direction in Numerical Example 2 according to the second embodiment of the present invention.
Figure 8B:
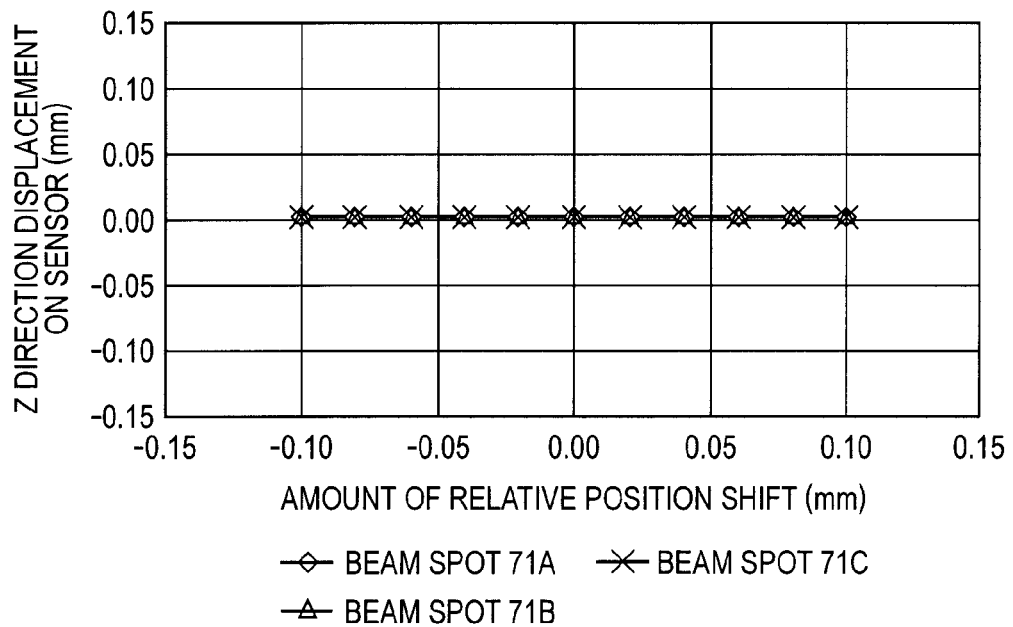
FIG. 8B is a chart illustrating displacement amounts of the beam spots in the Z direction which are obtained if the laser light source is shifted in the X direction in Numerical Example 2 according to the second embodiment of the present invention.

FIGS. 8A and 8B illustrate the displacement amounts of the Y coordinates and the Z coordinates of the beam spots 71A, 71B and 71C which are obtained if the laser light source 1 is shifted in the X direction with respect to the condensing lens 3. A negative relative position shift represents an increase in the interval between the condensing lens 3 and the laser light source 1. If the interval between the condensing lens 3 and the laser light source 1 changes, the beam spots 71A, and 71C are displaced toward the sides opposite to each other in the Y direction, and the beam spot 71B is not displaced, as can be seen from FIG. 8A. Moreover, the beam spots 71A, 71B and 71C are not displaced in the Z direction if the interval between the condensing lens 3 and the laser light source 1 changes as can be seen from FIG. 8B. Ax is equal to 0.1 mm/0.183 mm as can be seen from FIG. 8A.

Figure 8C:
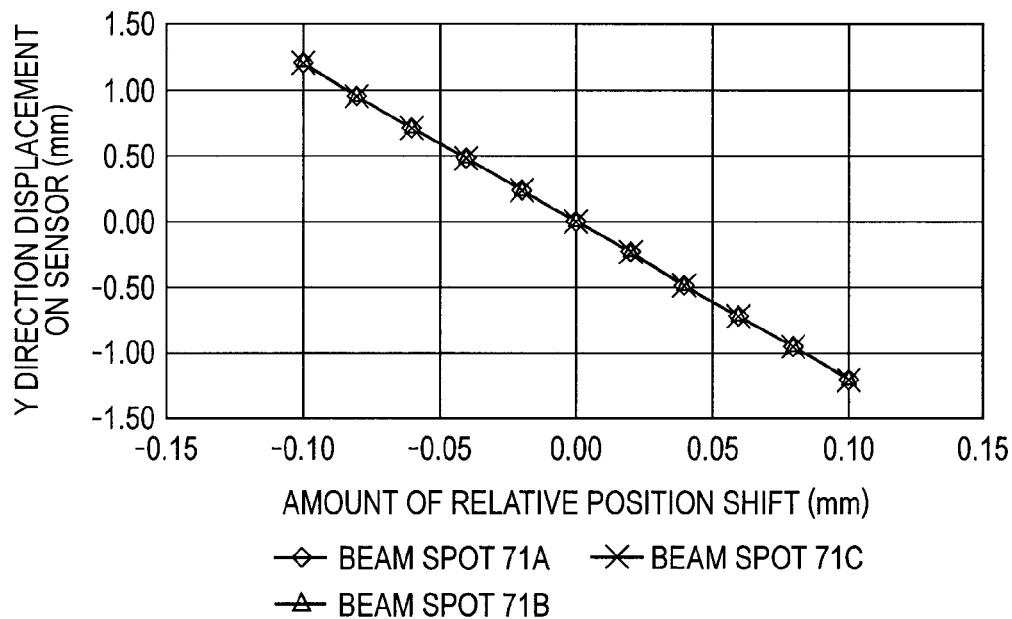
FIG. 8C is a chart illustrating displacement amounts of the beam spots in the Y direction which are obtained if the laser light source is shifted in the Y direction in Numerical Example 2 according to the second embodiment of the present invention.
Figure 8D:
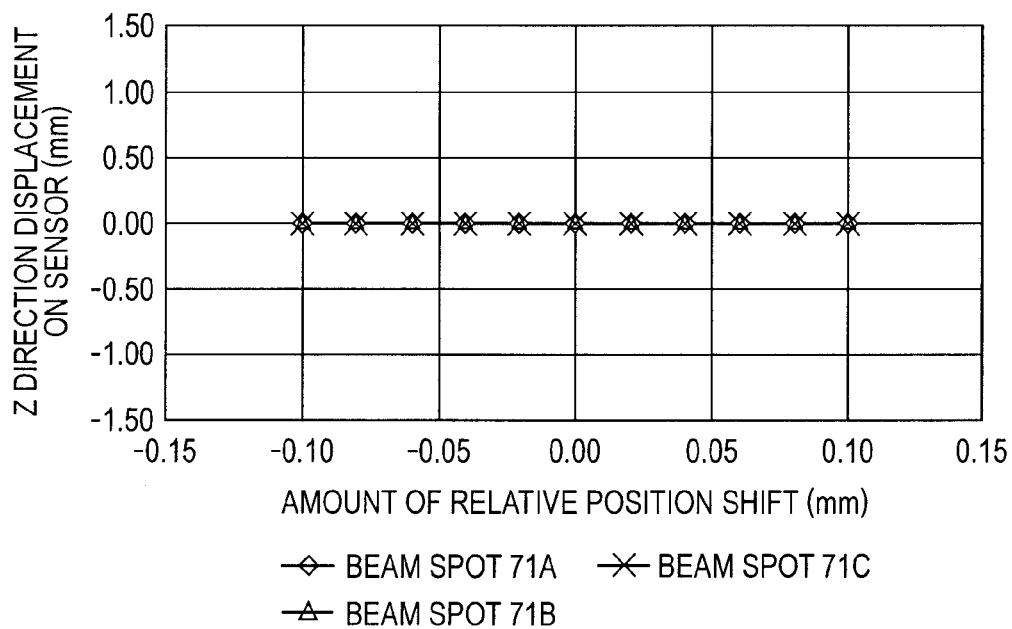
FIG. 8D is a chart illustrating displacement amounts of the beam spots in the Z direction which are obtained if the laser light source is shifted in the Y direction in Numerical Example 2 according to the second embodiment of the present invention.

FIGS. 8C and 8D illustrate the displacement amounts of the Y coordinates and the Z coordinates of the beam spots 71A, 71B and 71C which are obtained if the laser light source 1 is shifted in the Y direction with respect to the condensing lens 3. The beam spots 71A, 71B and 71C are displaced toward the same side in the Y direction if the condensing lens 3 and the laser light source 1 are shifted relatively in the Y direction as can be seen from FIG. 8C. Moreover, the beam spots 71A, 71B and 71C are not displaced in the Z direction if the condensing lens 3 and the laser light source 1 are shifted relatively in the Y direction as can be seen from FIG. 8D. Ay is equal to 0.1 mm/1.21 mm as can be seen from FIG. 8C.

Figure 8E:
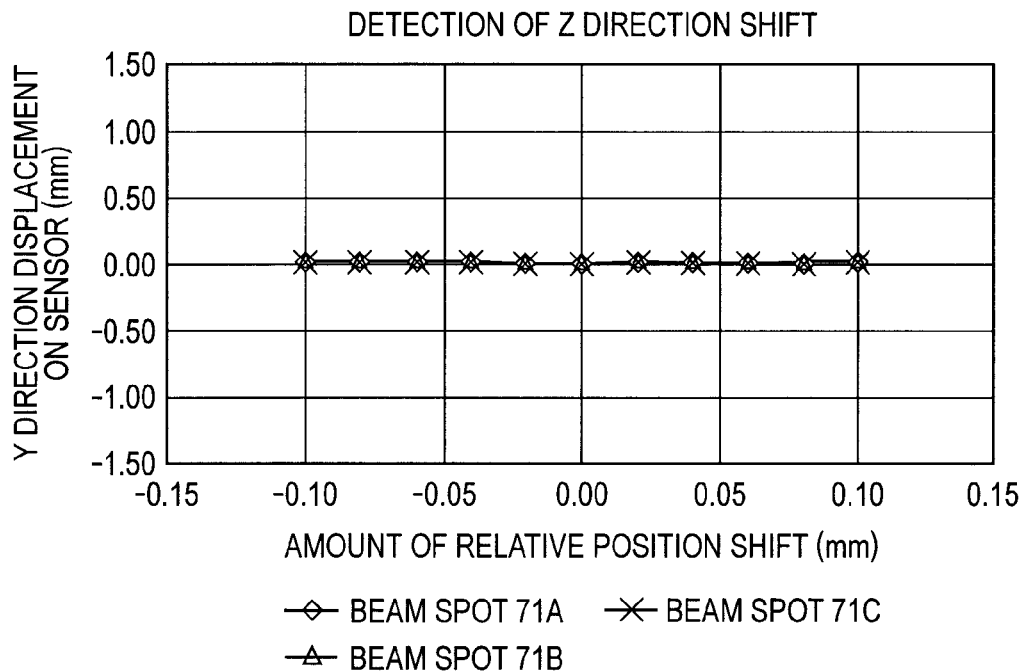
FIG. 8E is a chart illustrating displacement amounts of the beam spots in the Y direction which are obtained if the laser light source is shifted in the Z direction in Numerical Example 2 according to the second embodiment of the present invention.
Figure 8F:
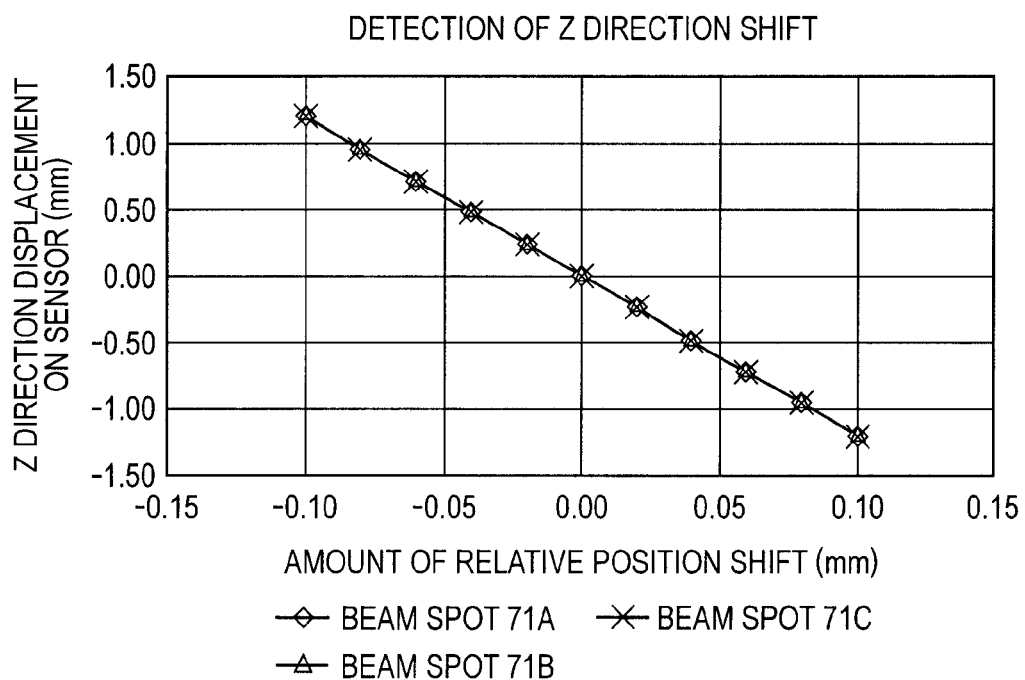
FIG. 8F is a chart illustrating displacement amounts of the beam spots in the Z direction which are obtained if the laser light source is shifted in the Z direction in Numerical Example 2 according to the second embodiment of the present invention.

FIGS. 8E and 8F illustrate the displacement amounts of the Y coordinates and the Z coordinates of the beam spots 71A, 71B and 71C which are obtained if the laser light source 1 is shifted in the Z direction with respect to the condensing lens 3. The beam spots 71A, 71B and 71C are not displaced in the Y direction if the condensing lens 3 and the laser light source 1 are shifted relatively in the Z direction as can be seen from FIG. 8E. Moreover, the beam spots 71A, 71B and 71C are displaced toward the same side in the Z direction if the condensing lens 3 and the laser light source 1 are shifted relatively in the Z direction as can be seen from FIG. 8F. Az is equal to 0.1 mm/1.21 mm as can be seen from FIG. 8F.

Figure 8G:
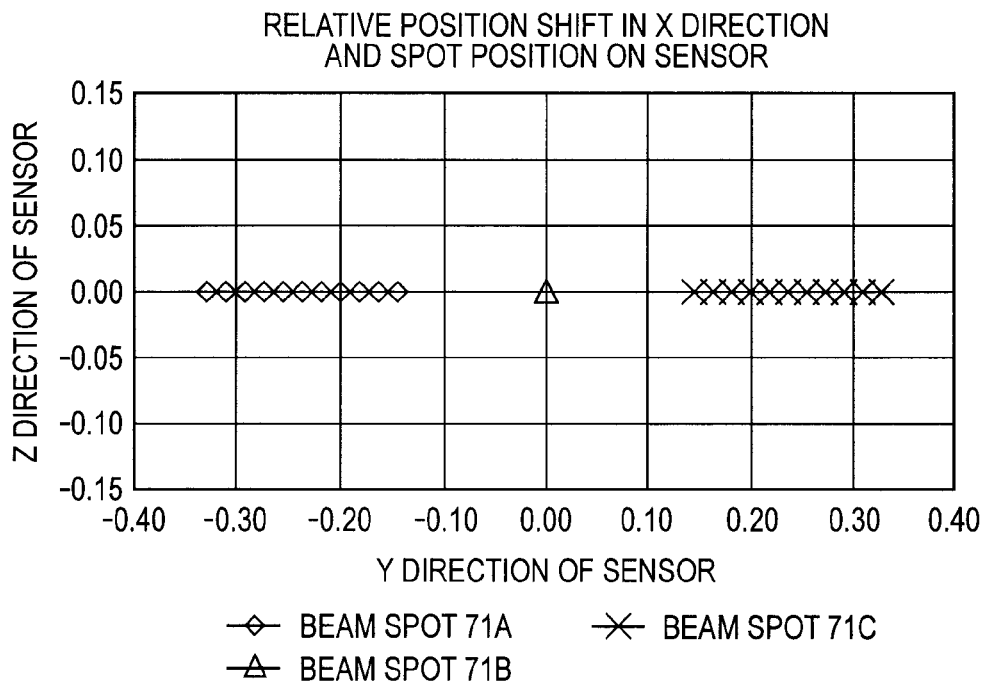
FIG. 8G is a chart illustrating movement locus of the beam spots on the YZ plane which are obtained if the laser light source is displaced in the X direction with the pitch of 0.02 mm by ±0.1 mm in Numerical Example 2 according to the second embodiment of the present invention.
Figure 8H:
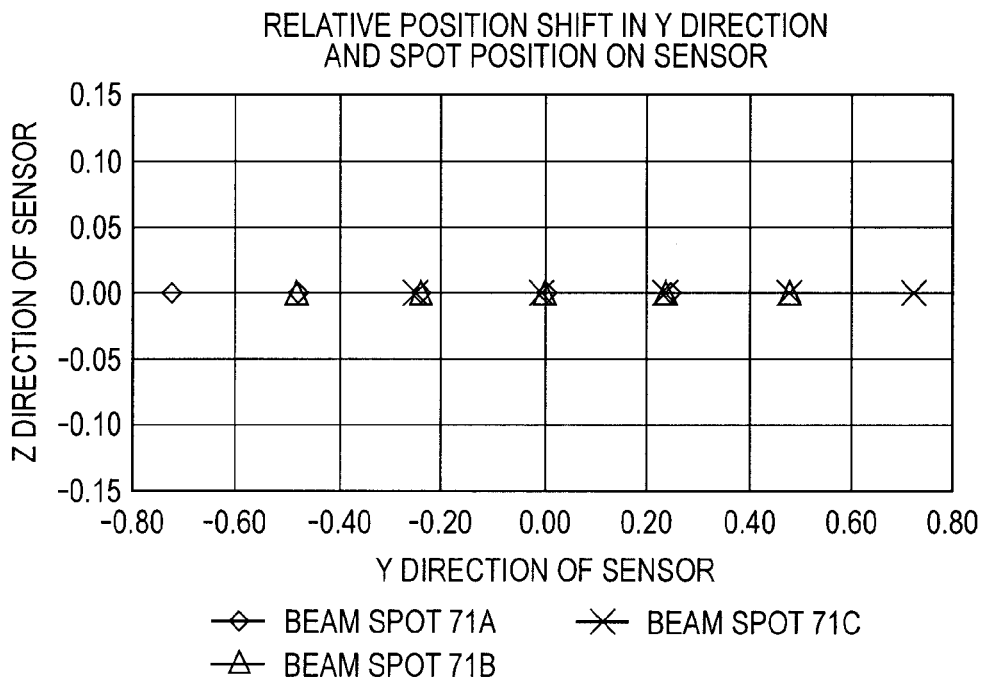
FIG. 8H is a chart illustrating movement locus of the beam spots on the YZ plane which are obtained if the laser light source is displaced in the Y direction with the pitch of 0.02 mm by ±0.05 mm in Numerical Example 2 according to the second embodiment of the present invention.
Figure 8I:
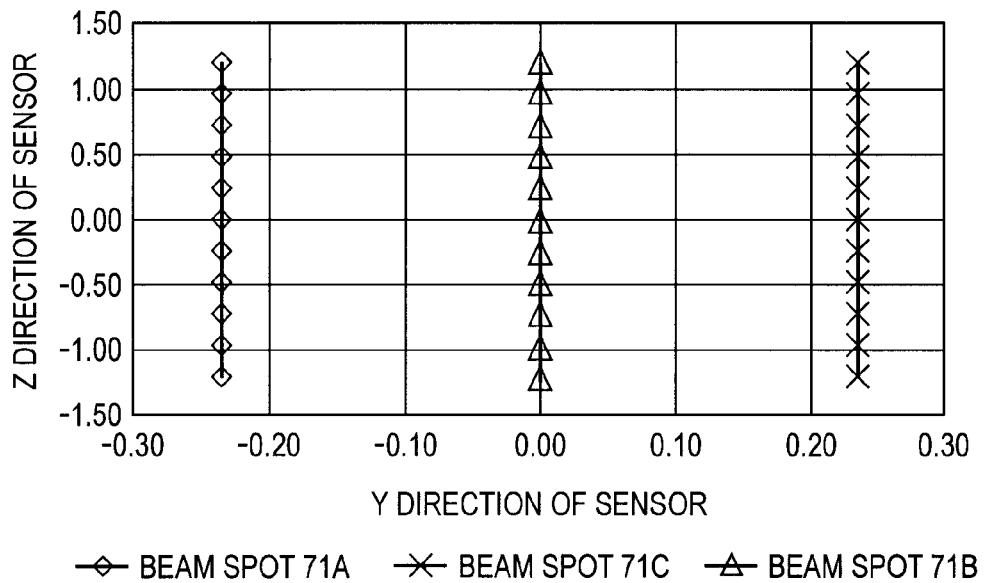
FIG. 8I is a chart illustrating movement locus of the beam spots on the YZ plane which are obtained if the laser light source is displaced in the Z direction with the pitch of 0.02 mm by ±0.1 mm in Numerical Example 2 according to the second embodiment of the present invention.

FIG. 8G to 8I plot loci of the beam spots 71A, 71B and 71C on the YZ plane of the image plane 7 according to the displacements illustrated in FIGS. 8A to 8F. FIG. 8G illustrates a locus of each of the spots on the YZ plane which is obtained if the laser light source 1 is shifted with respect to the condensing lens 3 in the X direction with a pitch of 0.02 mm by ±0.1 mm. The beam spots are displaced toward the sides opposite to each other in the Y direction on the YZ plane.

FIG. 8H illustrates loci of the spots on the YZ plane which are obtained if the laser light source 1 is shifted with respect to the condensing lens 3 in the Y direction with the pitch of 0.02 mm by ±0.05 mm. The beam spots are displaced toward the same side in the Y direction on the YZ plane.

FIG. 8I illustrates loci of the spots on the YZ plane which are obtained if the laser light source 1 is shifted with respect to the condensing lens 3 in the Z direction with the pitch of 0.02 mm by ±0.1 mm. The beam spots are displaced toward the same side in the Z direction on the YZ plane.

As described above, the change amounts in the interval and the position of the beam spots 71A, 71B and 71C are proportional to the change amount in the relative position between the laser light source 1 and the condensing lens 3. It is thus possible to compute how much the relative position between the laser light source 1 and the condensing lens 3 is shifted with respect to that in the ideal position by reading the coordinates of the beam spots 71A, 71B and 71C, and accurately measuring the change amounts of the interval and the positions thereof.

The shift in the focus direction may be computed by taking account of the beam spots 71A and 71C, and the shifts in the Y and Z directions may be computed by taking account of the beam spot 71B.

The desired accuracy of the relative position between the laser light source 1 and the condensing lens 3 is achieved by three-dimensionally driving and controlling the tool hand (not shown), which holds the laser light source 1, based on the respective computed amounts of relative position shift in the X, Y, and Z directions between the laser light source 1 and the condensing lens 3 ($\Delta X$, $\Delta Y$, and $\Delta Z$) which are computed according to the above-mentioned expressions (18) to (20). Then, the laser light source 1 is fixed. The method of fixing the laser light source 1 and the condensing lens 3 to the laser holder 2 is a known method such as screwing, fitting, and adhering. Needless to say, this adjustment apparatus can be applied to a laser light source of a multi-beam type.

It is not necessary for the configuration of the present invention to repeat the conventional process of reading the images of the beam spots and computing the spot diameters and the peak quantity of light of the beam spots for many times, and it is thus possible to compute the three-dimensional relative position shift amount by reading the images of the beam spots once, and then carrying out the computation processing.

Moreover, if the focus and the like are checked again for an assembled light source unit, fewer man-hours are required for the check. The man-hours for the assembly can thus be considerably reduced, resulting in a reduction in cost.

Third Embodiment

Figure 9:
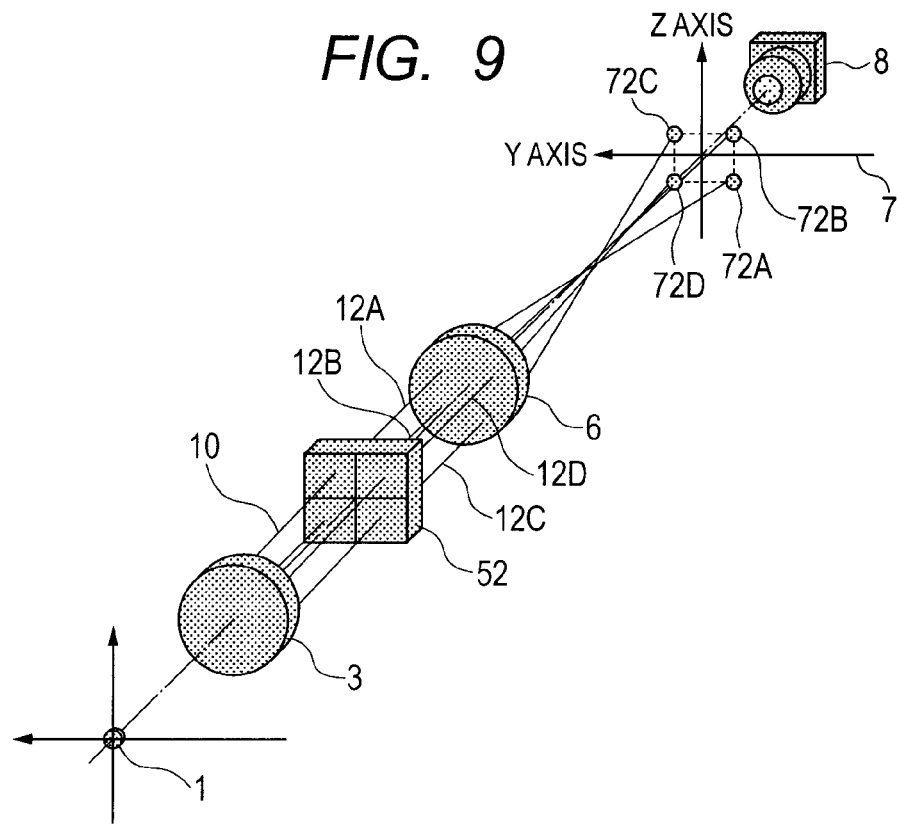
FIG. 9 is a perspective view illustrating a case (Numerical Example 3-1) where an adjustment apparatus according to a third embodiment of the present invention is used for adjusting the laser light source of a single beam.
Figure 10:
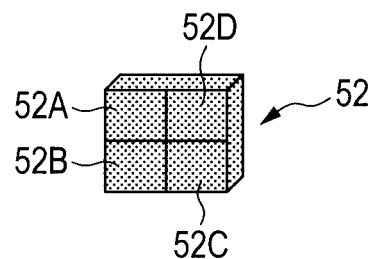
FIG. 10 is a partial detailed view illustrating a pupil dividing element of the adjustment apparatus according to the third embodiment of the present invention.

FIG. 9 is a perspective view of an adjustment apparatus of a light source unit for a scanning optical system according to a third embodiment of the present invention. The adjustment apparatus of this embodiment has a configuration approximately the same as that of the adjustment apparatuses of the first and second embodiments, and includes a pupil dividing element 52, which is different from the pupil dividing elements of the adjustment apparatuses of the first and second embodiments. FIG. 10 illustrates the pupil dividing element 52 of this embodiment.

A description is now given of a configuration of the adjustment apparatus of this embodiment referring to FIGS. 9 and 10. The configuration of the adjustment apparatus of this embodiment is the same as that of the first and second embodiments except for the pupil dividing element 52, and a description of the same configuration is thus omitted.

The stop 4 (not illustrated in FIG. 9) is disposed immediately after the condensing lens 3, and is a plate in which a rectangular hole having a major axis in the Y direction is bored as those illustrated in FIG. 1 (first embodiment) and FIG. 6 (second embodiment). The stop 4 having the rectangular opening causes the light beam 10 to have a rectangular shape.

The pupil dividing element (dividing element) 52 is constructed by arranging prisms 52A, 52B, 52C and 52D in the Y and Z directions. The pupil dividing element 52 constructed by the prisms 52A, 52B, 52C and 52D has a shape symmetrical about the XY plane containing the optical axis and the XZ plane containing the optical axis. Incident surfaces of the prisms 52A, 52B, 52C and 52D are inclined with respect to the YZ plane, and exit surfaces are formed by one plane parallel with the YZ plane in FIGS. 9 and 10. The slopes of the incident surfaces of the prisms 52A, 52B, 52C and 52D are inclined such that the thickness increases toward the optical axis side, and decreases toward the four corners on the outer periphery of the pupil dividing element 52.

The tool lens 6 condenses incident beams onto the image plane 7 (on the light receiving sensor or the light receiving element), thereby forming beam spots 72A, 72B, 72C and 72D. The beam spots formed on the image plane 7 are read as an image by the CCD camera 8 serving as the light receiving sensor. The CCD camera 8 is constructed by a CCD sensor in which objective lenses and light receiving pixels are two-dimensionally arranged. The image processing system (not shown) computes where the center of gravity of each of the beam spots read as the image by the CCD camera 8 is present on the YZ coordinate system of the image plane 7. Driving and controlling of the tool hand (not shown) holding the laser light source 1 is carried out based on the computed YZ coordinates of the beam spots.

A description is now given of a more specific operation referring to FIGS. 9 and 10. Only principal rays of the light beams are illustrated in FIG. 9 for the sake of simple description. The configuration of the adjustment apparatus of this embodiment is the same as those of the first and second embodiments except for the pupil dividing element 52, and a description of an optical path of the light beam emitted from the laser light source and entering the pupil dividing element 52 is omitted.

The light beam 10 which has passed through the stop 4 enters the prisms 52A, 52B, 52C and 52D constructing the pupil dividing element 52. The light beam 10 is divided into four portions, that is, a pupil A light beam 12A, a pupil B light beam 12B, a pupil C light beam 12C and a pupil D light beam 12D, in the Y and Z directions as can be seen from FIG. 9. The pupil A light beam 12A, the pupil B light beam 12B, the pupil C light beam 12C and the pupil D light beam 12D are respectively deflected by the prisms 52A, 52B, 52C and 52D toward the optical axis (X axis) side.

This embodiment has a configuration in which the one light beam 10 is divided into the four portions in the two-dimensional directions on the image plane 7 (on the light receiving sensor or the light receiving element) by the pupil dividing element 52, resulting in the pupil A light beam 12A, the pupil B light beam 12B, the pupil C light beam 12C and the pupil D light beam 12D.

The four divisions in the two-dimensional directions enables individual detection of the focus position in the main scanning direction and the focus position in the sub-scanning direction even if there is a difference between the focus position in the main scanning direction and the focus position in the sub-scanning direction (so-called astigmatism).

For example, if a semiconductor laser of the edge emitting type is employed for the laser light source 1 according to the present invention, a light emitting point of the semiconductor laser in a main scanning cross section and a light emitting point of the semiconductor laser in a sub-scanning cross section are shifted in the optical axis direction for a reason of the element structure. Even in this case, the one light beam 10 is divided by the pupil dividing element 52 into four portions in the two dimensional directions on the image plane 7 (on the light receiving sensor or the light receiving element), and the defocus amounts in the main scanning direction and the sub-scanning direction are respectively measured, resulting in better defocus correction, compared with the case where the light beam is divided in the one dimensional direction according to the first embodiment (FIG. 2).

The defocus amounts can be corrected as described in the first embodiment even in an optical system which divides the one beam 10 into two portions in the one dimensional direction (main scanning direction) by the pupil dividing element 5 on the image plane 7 (light receiving sensor or light receiving element) as in the first embodiment (FIG. 2).

The interval in the main scanning direction of the beam spots 7A and 7B divided into two portions in the one dimensional direction (main scanning direction) is measured, and a defocus amount in the main scanning direction is then computed.

Moreover, the shift amounts in the optical axis direction of the light emitting points in the semiconductor laser in the main scanning cross section and the sub-scanning cross section are measured in advance as table values.

Amounts for correcting the defocus amounts in the main scanning direction and the sub-scanning direction in a well-balanced manner may then be computed using the defocus amount in the main scanning direction and the table values.

In other words, correction values considering the difference in the defocus amount between the main scanning direction and the sub-scanning direction may be computed considering the astigmatism on the image plane 7.

The light beams 12A, 12B, 12C and 12D that have entered the tool lens 6 undergo imaging effect of the tool lens 6, thereby respectively forming the beam spots 72A, 72B, 72C and 72D on the image plane 7 of the tool lens 6.

The beam spots 72A, 72B, 72C and 72D on the image plane 7 are read as an image by the CCD camera 8. The image processing system (not shown) computes where the center of gravity of each of the beam spots read as the image is present on the YZ coordinate system of the image plane 7.

If the laser light source 1 and the condensing lens 3 are arranged in an ideal state (at design positions), and the laser beam emitted from the condensing lens 3 is a parallel light beam having the desired parallelism, the beam spots 72A, 72B, 72C and 72D form images respectively at positions (−Yo,−Zo), (−Yo,Zo), (Yo,Zo) and (Yo,−Zo) on the image plane 7 where the point on the image plane 7 on the optical axis is represented as the origin (0,0) on the YZ plane.

A description is now given of how the beam spots 72A, 72B, 72C and 72D are observed if the relative position between the laser light source 1 and the condensing lens 3 are shifted.

First, if the distance in the X direction between the laser light source 1 and the condensing lens 3 is shorter by ΔX than that in the ideal state, the light beam emitted from the condensing lens 3 is a light beam tending to disperse. If the light beam 10 is a dispersed light beam, the light beams 12A, 12B, 12C and 12D divided by the pupil dividing element 52 are displaced in directions approaching the X axis as can be seen from FIG. 9. Conversely, if the distance between the laser light source 1 and the condensing lens 3 is longer by ΔX in the X direction than that in the ideal state, the light beam 10 emitted from the condensing lens 3 tends to converge, and the light beams 12A, 12B, 12C and 12D that have entered the tool lens 6 are displaced in directions departing from the X axis. As a result, the beam spots 72A, 72B, 72C and 72D are observed as radial movements on the image plane 7.

If the position of the laser light source 1 is moved by ΔY<0 from that in the ideal state in the Y direction with respect to the condensing lens 3 (moved toward the minus side in the Y axis direction), the light beam 10 emitted from the condensing lens 3 has an angle in the Y direction toward the plus side. If the light beam 10 has the angle in the Y direction toward the plus side, the light beams 12A, 12B, 12C and 12D divided by the pupil dividing element 52 respectively have angles in the Y direction toward the plus side as can be seen from FIG. 9. As a result, the light beams 12A, 12B, 12C and 12D that have entered the tool lens 6 also proceed at angles in the Y direction toward the plus side, and the positions of the beam spots 72A, 72B, 72C and 72D on the image plane 7 are thus observed as those displaced in the Y direction toward the plus side.

If the position of the laser light source 1 is moved by ΔZ<0 from that in the ideal state in the Z direction with respect to the condensing lens 3 (moved toward the minus side in the Z axis direction), the light beam 10 emitted from the condensing lens 3 has an angle in the Z direction toward the plus side. If the light beam 10 has the angle in the Z direction toward the plus side, the light beams 12A, 12B, 12C and 12D divided by the pupil dividing element 52 respectively have angles in the Z direction toward the plus side as can be seen from FIG. 9. As a result, the light beams 12A, 12B, 12C and 12D that have entered the tool lens 6 also proceed at angles in the Z direction toward the plus side, and the positions of the beam spots 72A, 72B, 72C and 72D on the image plane 7 are thus observed as those displaced in the Z direction toward the plus side.

The change amounts in the interval between the beam spots 72A, 72B, 72C and 72D (relative position between the images of the four beams) and in the positions thereof (position of each of the images of the four beams with respect to the optical axis) are proportional to the change amount in the relative position between the laser light source 1 and the condensing lens 3 as described in the following Numerical Examples. It is thus possible to compute how much the relative position between the laser light source 1 and the condensing lens 3 is shifted with respect to that in the ideal position by reading the coordinates of the beam spots 72A, 72B, 72C and 72D, and accurately measuring the change amounts of the interval and the positions.

The beam spots 72A, 72B, 72C and 72D on the image plane 7 are read as an image by the CCD camera 8 according to the present invention. The image processing system (not shown) computes where the center of gravity of each of the beam spots read as the image is present on the YZ coordinate system of the image plane 7. The method of computing the coordinate of the center of gravity of each of the spots on the two-dimensional CCD sensor may be a known method.

The computed coordinates of the beam spots 72A, 72B, 72C and 72D on the YZ plane are (YA, ZA), (YB, ZB), (YC, ZC) and (YD, ZD), respectively. Moreover, the coordinates in the ideal state are respectively represented as (−Yo, −Zo), (−Yo, Zo), (Yo, Zo) and (Yo, −Zo).

Moreover, the coordinate displacement sensitivities of the beam spots 72A, 72B, 72C and 72D (expressions (1), (2), and (3)) with respect to the relative position shift between the laser light source 1 and the condensing lens 3 may be computed by means of simulation or experimentally. Based on the coordinate displacement sensitivities, the amounts of relative position shifts in the X, Y and Z directions ($\Delta X$, $\Delta Y$ and $\Delta Z$) between the laser light source 1 and the condensing lens 3 are respectively represented by the following expressions (21) to (23).

$$\Delta X = \frac{Ax}{2} \times \left( \sqrt{(YA-YC)^2 + (ZA-ZC)^2} - 2 \times \sqrt{Yo^2 + Zo^2} + \sqrt{(YB-YD)^2 + (ZB-ZD)^2} - 2 \times \sqrt{Yo^2 + Zo^2} \right) \quad (21)$$

where $\Delta X$ is an amount of relative position shift in X direction between laser light source 1 and condensing lens 3.

$$\Delta Y = Ay \times (YA+YB+YC+YD)/4 \quad (22)$$

where $\Delta Y$ is an amount of relative position shift in Y direction between laser light source 1 and condensing lens 3.

$$\Delta Z = Az \times (ZA+ZB+ZC+ZD)/4 \quad (23)$$

where $\Delta Z$ is an amount of relative position shift in Z direction between laser light source 1 and condensing lens 3.

The amount $\Delta X$ of relative position shift in the X direction is computed by averaging differences in the distance between the beam spots 72A and 72C and the distance between the beam spots 72B and 72D from the distances in the ideal state. The shift in the Y direction is computed by averaging differences in displacements of the beam spots 72A, 72B, 72C and 72D in the Y direction from those in the ideal state. The shift in the Z direction is computed by averaging differences in displacements of the beam spots 72A, 72B, 72C and 72D in the Z direction from those in the ideal state.

After the desired accuracy of the relative position between the laser light source 1 and the condensing lens 3 is achieved by, based on the computed $\Delta X$, $\Delta Y$ and $\Delta Z$, three-dimensionally driving and controlling the tool hand (not shown), which holds the laser light source 1, the laser light source 1 is fixed to the laser holder 2. The method of fixing the laser light source 1 and the condensing lens 3 to the laser holder 2 is a known method such as screwing, fitting and adhering.

Though the condensing lens 3 is fixed first, and the laser light source 1 is then finely adjusted according to this embodiment, conversely, the laser light source 1 may be fixed first, and the position of the condensing lens 3 may then be finely adjusted.

Though the CCD camera constructed by the objective lens and the two-dimensional CCD sensor is described as the light receiving sensor, the light receiving sensor is not limited to the CCD camera. A known method may be employed as long as the method can compute the center of gravity coordinates of the received beam spots. Various variations such as a light receiving surface of a sensor disposed directly on the image plane 7, a CMOS sensor, or a one-dimensional line sensor may be employed as the light receiving sensor. Moreover, if the interval between the beam spots 72A, 72B, 72C and 72D increases according to the setting of the angles of the prisms of the pupil dividing element 52 and one sensor cannot receive the spots, a plurality of light receiving sensors may be used, or one light receiving sensor may be mounted on a moving stage, and the images of the beam spots 72A, 72B, 72C and 72D may be sequentially read. Moreover, though it is assumed that the light source unit providing the parallel light beam by means of the condensing lens 3 is used according to this embodiment, the present invention is not limited to this light source unit, and may be applied to a light source unit providing a converged light beam or a dispersed light beam. Moreover, the optical system of the present invention such as the pupil dividing element and the tool lens may be applied to a case where the laser light source unit is built into a scanning optical system.

The power of the tool lens 6 may be reduced or the tool lens 6 itself may be omitted by forming at least either the incident surface or exit surface of the prisms 52A, 52B, 52C and 52D into, instead of a plane, a lens array in which curved surfaces having the same curvature are arranged.

Further, according to this embodiment, the pupil dividing element 52 is described as the prism-array having the incident surfaces that are inclined with respect to the YZ plane, and the exit surfaces that are constructed by the one plane parallel with the YZ plane, but the present invention is not limited to this configuration. Even a prism-array having exit surfaces that are inclined with respect to the YZ plane and incident surfaces that are constructed by one plane parallel with the YZ plane can enjoy the effect of the present invention. In other words, even a prism-array in which either its incident surface or exit surface is inclined with respect to the YZ plane and the other thereof is constructed by one plane parallel with the YZ plane can enjoy the effect of the present invention.

Numerical Example 3-1

A description is now given of a Numerical Example of the adjustment apparatus according to the third embodiment illustrated in FIGS. 9 and 10. The optical system is arranged as shown in Table 3.

TABLE 3

|  | Surface number | R | d | N |
| --- | --- | --- | --- | --- |
| LD | 1 | 0.00 | 2.0 | 1.0000 |
| Cover glass | 2 | 0.00 | 0.3 | 1.5105 |
|  | 3 | 0.00 | 21.1 | 1.0000 |
| Subject lens | 4 | 0.00 | 3.0 | 1.7617 |
|  | 5 | −19.06 | 23.6 | 1.0000 |
| Stop | 6 | 0.00 | 5.0 | 1.0000 |
| Pupil dividing element | 7 | 0.00 | 2.0 | 1.5105 |
|  | 8 | 0.00 | 293.0 | 1.0000 |
| Tool lens G1 | 9 | 170.59 | 13.2 | 1.5105 |
| Tool lens G2 | 10 | −154.44 | 5.7 | 1.7851 |
|  | 11 | −369.90 | 292.4 | 1.0000 |
| Image plane | 13 | 0.00 |  |  |

Inclination angle of pupil dividing element: 0.1 degrees Stop: 6.00 (in Y direction)×4.00 (in Z direction).

FIGS. 11A to 11J illustrate how the coordinates of the beam spots 72A, 72B, 72C and 72D, which are images formed respectively by the pupil A light beam 12A, the pupil B light beam 12B, the pupil C light beam 12C and the pupil D light beam 12D, are displaced if a position shift of the laser light source 1 is generated with respect to the condensing lens 3.

Figure 11A:
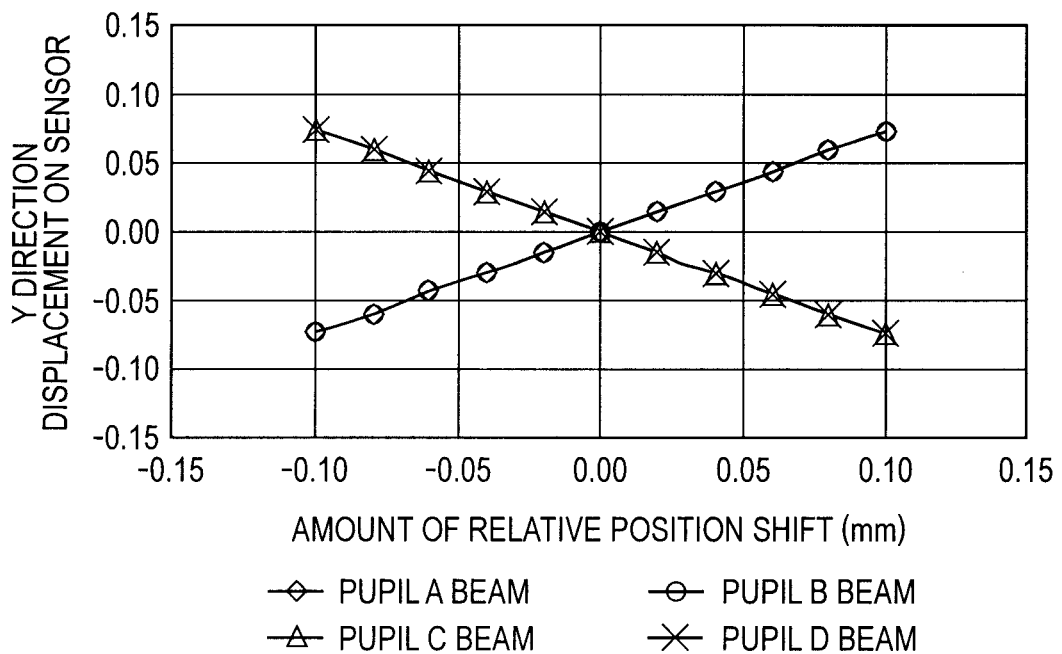
FIG. 11A is a chart illustrating displacement amounts of beam spots in the Y direction which are obtained if the laser light source is shifted in the X direction in Numerical Example 3-1 according to the third embodiment of the present invention.

FIGS. 11A and 11B illustrate the displacement amounts of the Y coordinates and the Z coordinates of the beam spots 72A, 72B, 72C and 72D which are obtained if the laser light source 1 is shifted in the X direction with respect to the condensing lens 3. A negative relative position shift represents an increase in the interval between the condensing lens 3 and the laser light source 1. The beam spots 72B and 72C are displaced toward the sides opposite to each other in the Y direction with respect to the beam spots 72A and 72D if the interval between the condensing lens 3 and the laser light source 1 changes as can be seen from FIG. 11A. Moreover, the beam spots 72C and 72D are displaced toward the sides opposite to each other in the Z direction with respect to the beam spots 72A and 72B if the interval between the condensing lens 3 and the laser light source 1 changes as can be seen from FIG. 11B.

Figure 11D:
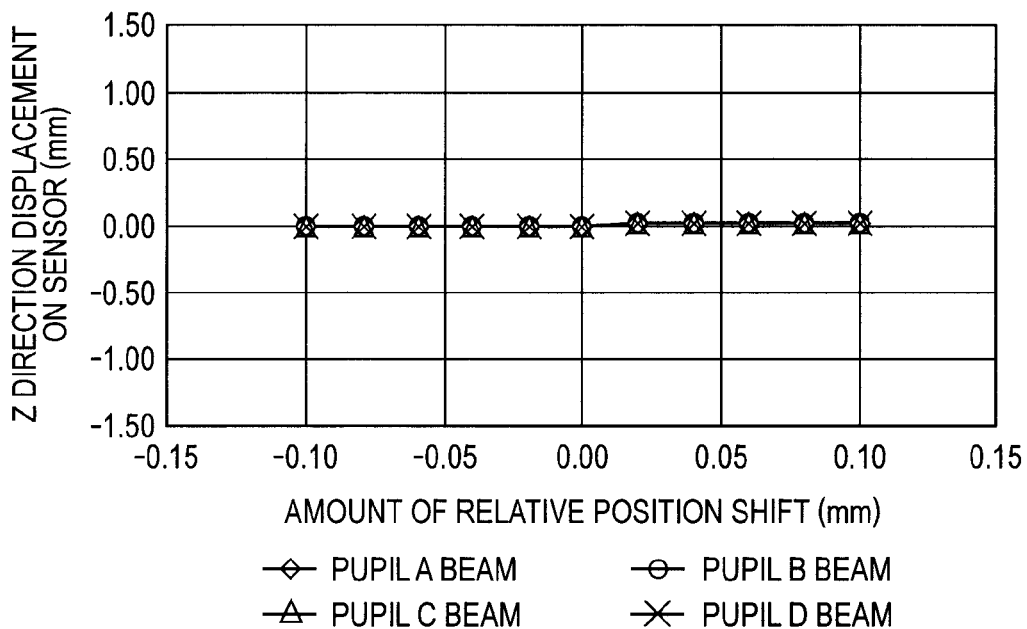
FIG. 11D is a chart illustrating displacement amounts of the beam spots in the Z direction which are obtained if the laser light source is shifted in the Y direction in Numerical Example 3-1 according to the third embodiment of the present invention.

FIGS. 11C and 11D illustrate the displacement amounts of the Y coordinates and the Z coordinates of the beam spots 72A, 72B, 72C and 72D which are obtained if the laser light source 1 is shifted in the Y direction with respect to the condensing lens 3. The beam spots 72A, 72B, 72C and 72D are displaced toward the same side in the Y direction if the condensing lens 3 and the laser light source 1 are shifted relatively in the Y direction as can be seen from FIG. 11C. Moreover, the beam spots 72A, 72B, 72C, and 72D are not displaced in the Z direction if the condensing lens 3 and the laser light source 1 are shifted relatively in the Y direction as can be seen from FIG. 11D.

Figure 11E:
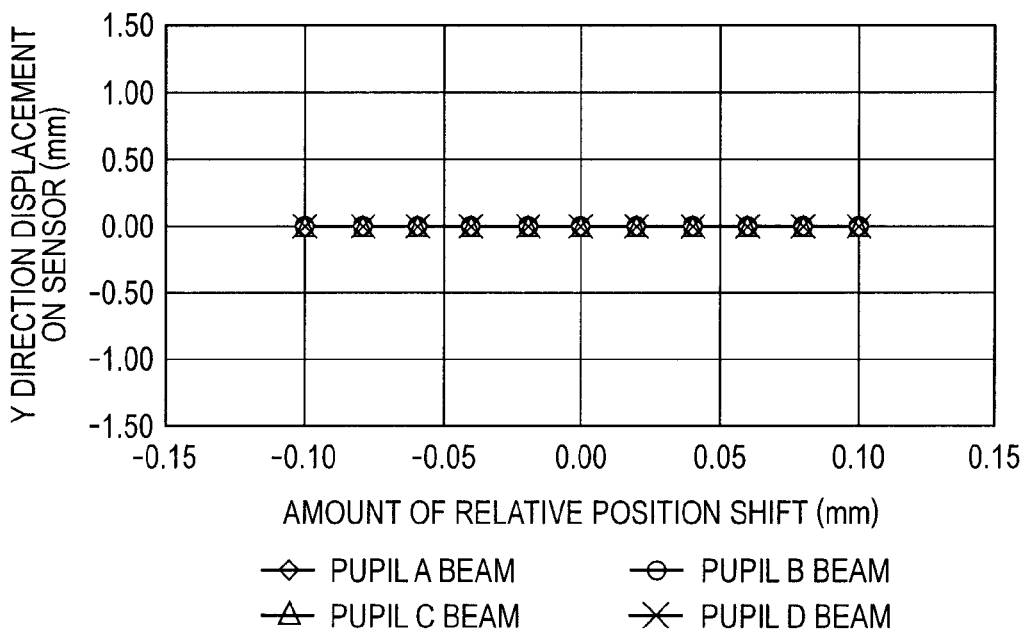
FIG. 11E is a chart illustrating displacement amounts of the beam spots in the Y direction which are obtained if the laser light source is shifted in the Z direction in Numerical Example 3-1 according to the third embodiment of the present invention.
Figure 11F:
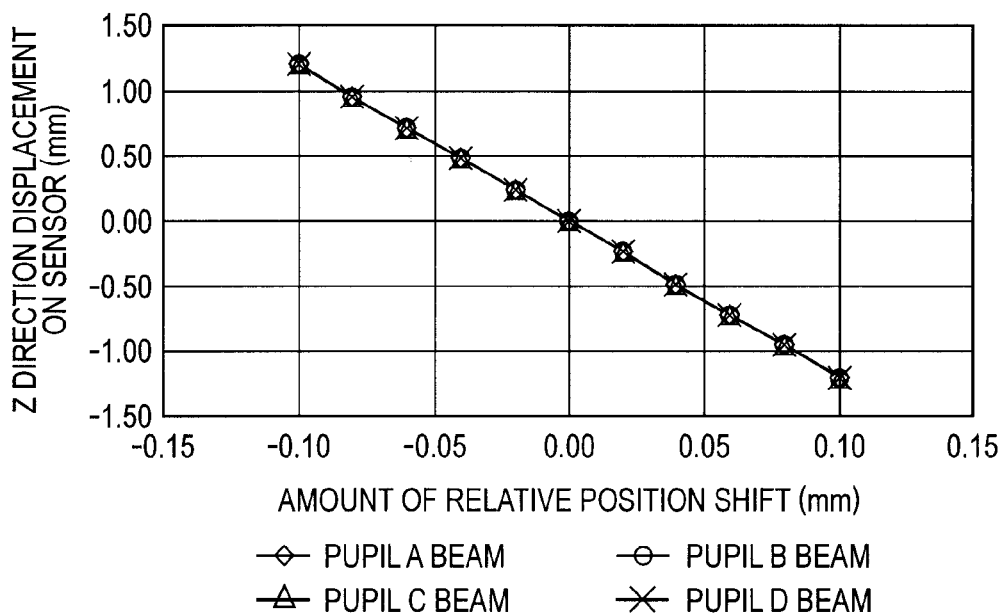
FIG. 11F is a chart illustrating displacement amounts of the beam spots in the Z direction which are obtained if the laser light source is shifted in the Z direction in Numerical Example 3-1 according to the third embodiment of the present invention.

FIGS. 11E and 11F illustrate the displacement amounts of the Y coordinates and the Z coordinates of the beam spots 72A, 72B, 72C and 72D which are obtained if the laser light source 1 is shifted in the Z direction with respect to the condensing lens 3. The beam spots 72A, 72B, 72C and 72D are not displaced in the Y direction if the condensing lens 3 and the laser light source 1 are shifted relatively in the Z direction as can be seen from FIG. 11E. Moreover, the beam spots 72A, 72B, 72C and 72D are displaced toward the same side in the Z direction if the condensing lens 3 and the laser light source 1 are shifted relatively in the Z direction as can be seen from FIG. 11F.

Figure 11G:
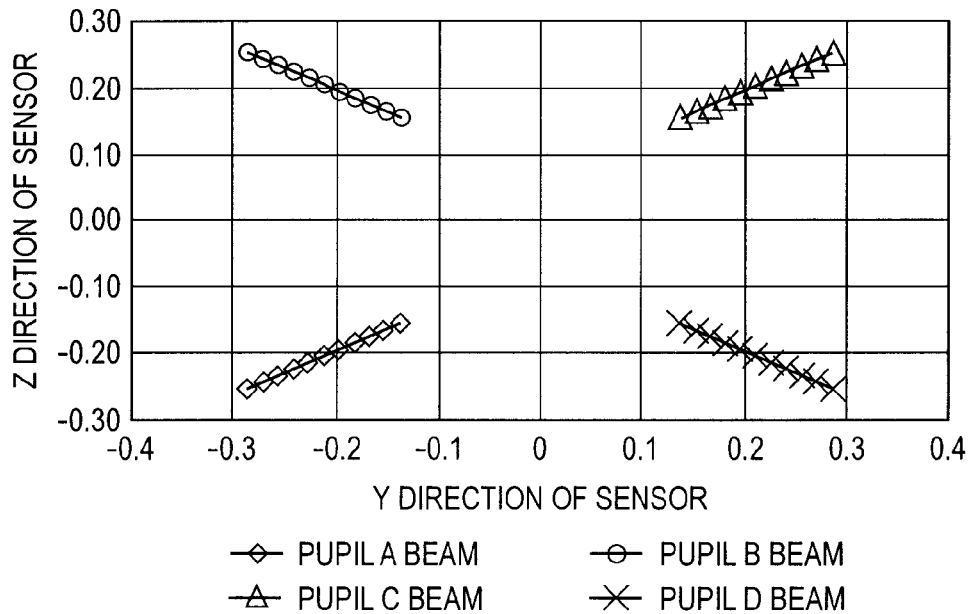
FIG. 11G is a chart illustrating movement locus of the beam spots on the YZ plane which are obtained if the laser light source is displaced in the X direction with the pitch of 0.02 mm by ±0.1 mm in Numerical Example 3-1 according to the third embodiment of the present invention.

FIG. 11G to 11I plot loci of the beam spots 72A, 72B, 72C and 72D on the YZ plane of the image plane 7 according to the displacements illustrated in FIGS. 11A to 11F.

FIG. 11G illustrates a locus of each of the spots on the YZ plane which is obtained if the laser light source 1 is shifted with respect to the condensing lens 3 in the X direction with a pitch of 0.02 mm by ±0.1 mm. The beam spots are displaced radially.

FIG. 11H illustrates loci of the spots on the YZ plane which are obtained if the laser light source 1 is shifted with respect to the condensing lens 3 in the Y direction with the pitch of 0.02 mm by ±0.1 mm. The beam spots are displaced toward the same side in the Y direction.

FIG. 11I illustrates loci of the spots on the YZ plane which are obtained if the laser light source 1 is shifted with respect to the condensing lens 3 in the Z direction with the pitch of 0.02 mm by ±0.1 mm. The beam spots are displaced toward the same side in the Z direction.

Figure 11J:
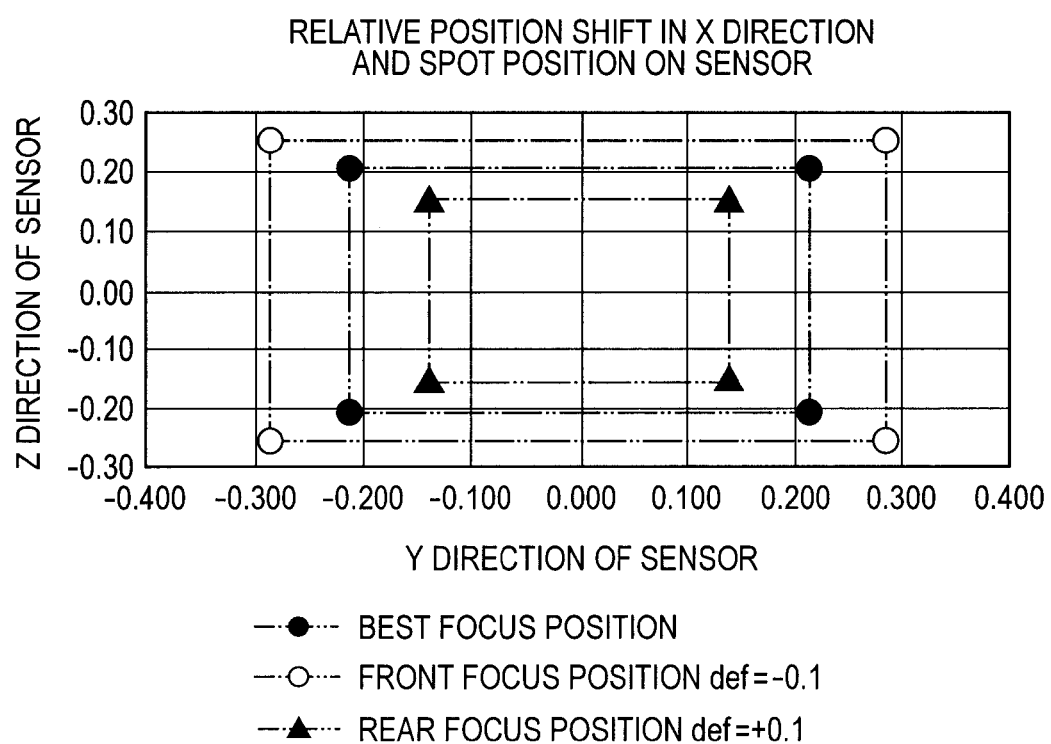
FIG. 11J is a chart illustrating a displacement of the beam spot on the YZ plane which is obtained if the laser light source is displaced in the X direction by ±0.1 mm in Numerical Example 3-1 according to the third embodiment of the present invention.

Further, FIG. 11J plots loci of the beam spots 72A, 72B, 72C and 72D on the YZ plane on the image plane 7 which are obtained if the laser light source 1 is shifted in the optical axis (X) direction by ±0.1 mm. A case where the interval between the laser light source 1 and the condensing lens 3 increases by 0.1 mm with respect to that in the ideal state (def=−0.1), and a case where the interval decreases by 0.1 mm with respect to that in the ideal state (def=+0.1) are described on this occasion. The four beam spots form a rectangle, and a change in the size of the rectangle is observed as the laser light source 1 is shifted in the optical axis (X) direction.

As described above, the change amounts in the interval and the position of the beam spots 72A, 72B, 72C and 72D are proportional to the change amount in the relative position between the laser light source 1 and the condensing lens 3. It is thus possible to compute how much the relative position between the laser light source 1 and the condensing lens 3 is shifted with respect to that in the ideal position by reading the coordinates of the beam spots 72A, 72B, 72C and 72D, and accurately measuring the change amounts of the interval and the positions thereof.

After the desired accuracy of the relative position between the laser light source 1 and the condensing lens 3 is achieved by three-dimensionally driving and controlling the tool hand (not shown), which holds the laser light source 1, based on the respective computed amounts of relative position shift in the X, Y and Z directions between the laser light source 1 and the condensing lens 3 ($\Delta X$, $\Delta Y$ and $\Delta Z$) according to the above-mentioned expressions (21) to (23), the laser light source 1 is fixed. The method of fixing the laser light source 1 and the condensing lens 3 to the laser holder 2 is a known method such as screwing, fitting and adhering.

It is not necessary for the configuration of the present invention to repeat the conventional process of reading the images of the beam spots and computing the spot diameters and the quantity of light of the beam spots for many times, and it is thus possible to compute the three-dimensional relative position shift amount by reading the images of the beam spots once, and then carrying out the computation processing.

Moreover, if the focus and the like are checked again for an assembled light source unit, fewer man-hours are required for the check. The man-hours for the assembly can thus be considerably reduced, resulting in a reduction in cost.

Numerical Example 3-2

Figure 12:
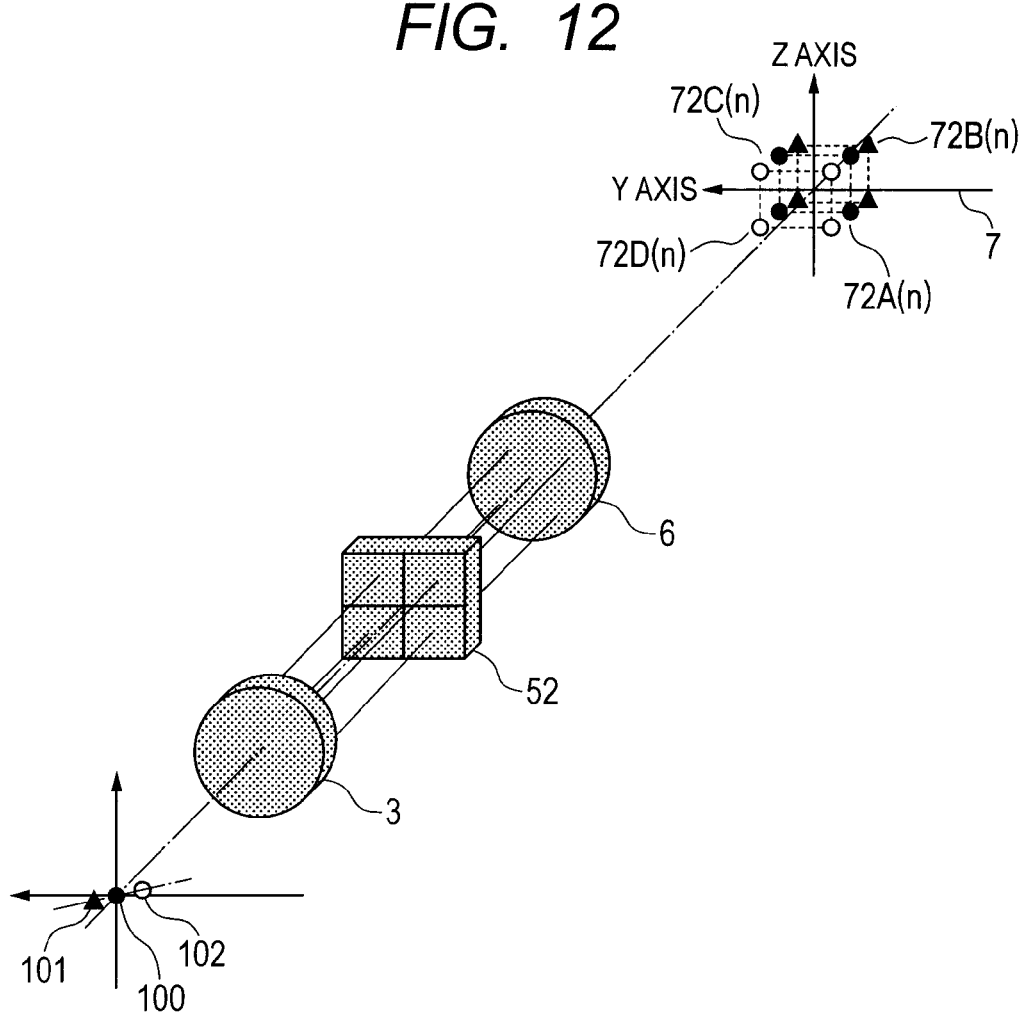
FIG. 12 is a perspective view illustrating a case (Numerical Example 3-2) where the adjustment apparatus according to the third embodiment of the present invention is used for adjusting the laser light source of a multi beam.

Another Numerical Example to which the adjustment apparatus according to the third embodiment is applied is illustrated in FIG. 12. This Numerical Example is an example of an application to an adjustment of a multi-beam laser light source which has a plurality of light emitting points as the laser light source 1. The laser light source of the light source unit to be adjusted includes light emitting points 100, 101 and 102. The light emitting point 100 at the center corresponds to the laser light source 1 of FIG. 9.

The arrangement of the optical system in the adjustment apparatus is equivalent to that of Numerical Example 3-1 (Table 3).

The intervals between the light emitting points of the laser light source to be adjusted are 0.05 mm. The light emitting points 100, 101, and 102 are aligned on a straight line, and are arranged to have an inclination angle $\theta$ with respect to the XY plane as illustrated in FIG. 12. The inclination angle $\theta$ is 4.5 degrees.

The laser light source 1 and the condensing lens 3 are held by the laser holder 2 serving as the holding member, and form the light source unit 21 for the scanning optical system. The light source unit 21 is detachable from the adjustment apparatus of this embodiment by means of the mounting unit (not shown). The condensing lens 3 is fixed to the laser holder 2, and the laser holder 2 is then mounted on the adjustment apparatus. The laser light source 1 is held by the tool hand (not shown), thereby providing a configuration three-dimensionally displaceable with respect to the laser holder 2. After a position of the laser light source 1 is finely adjusted by means of an adjustment method of the present invention to be described later, thereby achieving a desired accuracy of the relative position of the laser light source 1 with respect to the condensing lens 3 for the position of the light emitting point 100 at the center in the X, Y and Z directions and the rotation angle of the arrangement direction of the three light emitting points 100, 101 and 102 about the X axis and the Z axis, the laser light source 1 is fixed. A method of fixing the laser light source 1 and the condensing lens 3 to the laser holder 2 is a known method such as screwing, fitting and adhering.

The stop 4 is disposed immediately after the condensing lens 3 similarly to that of the Numerical Example illustrated in FIG. 9. The stop 4 is a plate in which a rectangular hole having a major axis in the Y direction is bored. The stop 4 having the rectangular opening causes the light beam 10 to have a rectangular shape.

The pupil dividing element 52 is constructed by arranging the prisms 52A, 52B, 52C and 52D in the Y and Z directions. The prisms 52A, 52B, 52C and 52D form a shape symmetrical about the XY and XZ planes. Incident surfaces of the prisms 52A, 52B, 52C and 52D are inclined with respect to the YZ plane, and exit surfaces are parallel with the YZ plane in FIGS. 9 and 10. The slopes of the incident surfaces of the prisms 52A, 52B, 52C and 52D are inclined such that the thickness increases toward the optical axis side, and decreases toward the four corners on the outer periphery of the pupil dividing element 52.

The tool lens 6 condenses incident beams onto the image plane 7 (on the light receiving sensor or the light receiving element), thereby forming beam spots 72A (n), 72B (n), 72C (n), and 72D (n) (n=100, 101, or 102). The beam spots formed on the image plane 7 are read as an image by the CCD camera 8 serving as the light receiving sensor. The CCD camera 8 is constructed by a CCD sensor in which objective lenses and light receiving pixels are two-dimensionally arranged. The image processing system (not shown) computes where the center of gravity of each of the beam spots read as the image by the CCD camera 8 is present on the YZ coordinate system of the image plane 7. Driving and controlling of the tool hand (not shown) holding the laser light source 1 is carried out based on the computed YZ coordinates of the beam spots.

The optical arrangement of the adjustment apparatus of Numerical Example 3-2 is equivalent to the optical arrangement (Table 2) of the adjustment apparatus of Numerical Example 3-1, and the displacements of the beam spots with respect to the shift amount of the relative position between the laser light source 1 and the condensing lens 3 are equivalent to those of Numerical Example 3-1. In other words, the displacements of the light beam spots are the same as those illustrated in FIGS. 11A to 11F.

Total of twelve beam spots are observed on the image plane 7. A light beam from the light emitting point 100 is divided into four portions, and beam spots 72A (100), 72b (100), 72C (100) and 72D (100) are thus formed. A light beam from the light emitting point 101 is divided into four portions, and beam spots 72A (101), 72b (101), 72C (101) and 72D (101) are thus formed. A light beam from the light emitting point 102 is divided into four portions, and beam spots 72A (102), 72B (102), 72C (102) and 72D (102) are thus formed.

Figure 13A:
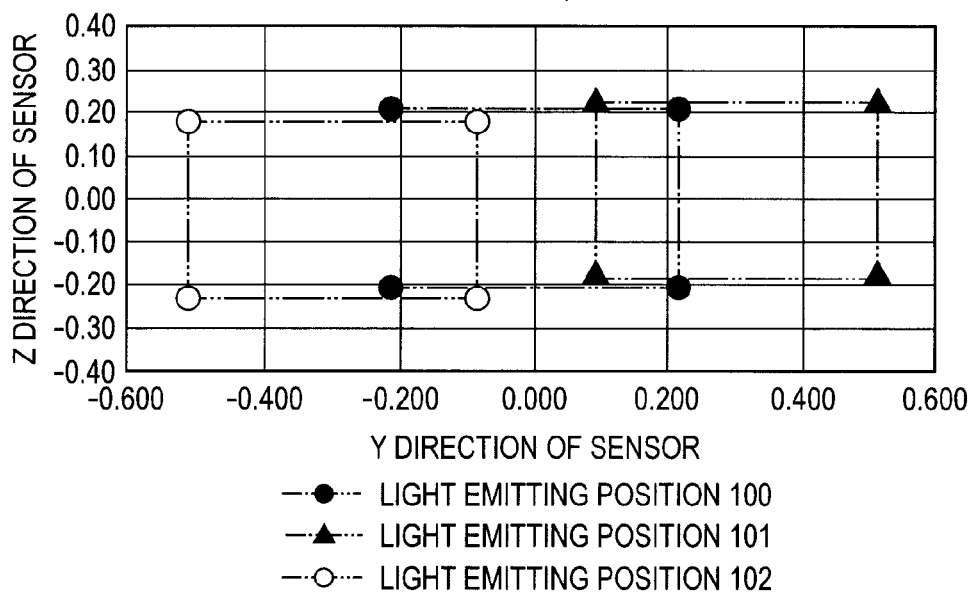
FIG. 13A is a chart illustrating an arrangement of twelve beam spots on an image plane which is obtained if the laser light source is disposed at an ideal position in Numerical Example 3-2 according to the third embodiment of the present invention.

FIG. 13A illustrates how the twelve beam spots are observed on the image plane 7 if the relative position between the laser light source 1 and the condensing lens 3 is ideal. The four beam spots formed by the center light emitting point 100 illustrated in FIG. 13A is in the same state as the best focus state illustrated in FIG. 11J described in Numerical Example 3-1.

The relative position shifts between the condensing lens 3 and each of the three light emitting points in the Y and Z directions can be computed by the method described above based on each group of the four beam spots on the image plane 7 corresponding to each of the three light emitting points as illustrated in FIG. 13A. Moreover, it is possible to compute the arrangement direction of the light emitting points and an inclination angle thereof with respect to the Y axis from the relative position shifts in the Y and Z directions.

If the arrangement is ideal, the inclination angle is observed as 4.5 degrees. If the three light emitting points are rotated about the optical axis, the observed angle is different from 4.5 degrees. In this case, the laser light source may be rotated by the tool hand (not shown) about the X axis for the adjustment so as to attain an angle difference equal to or less than a desired angle difference.

Figure 13B:
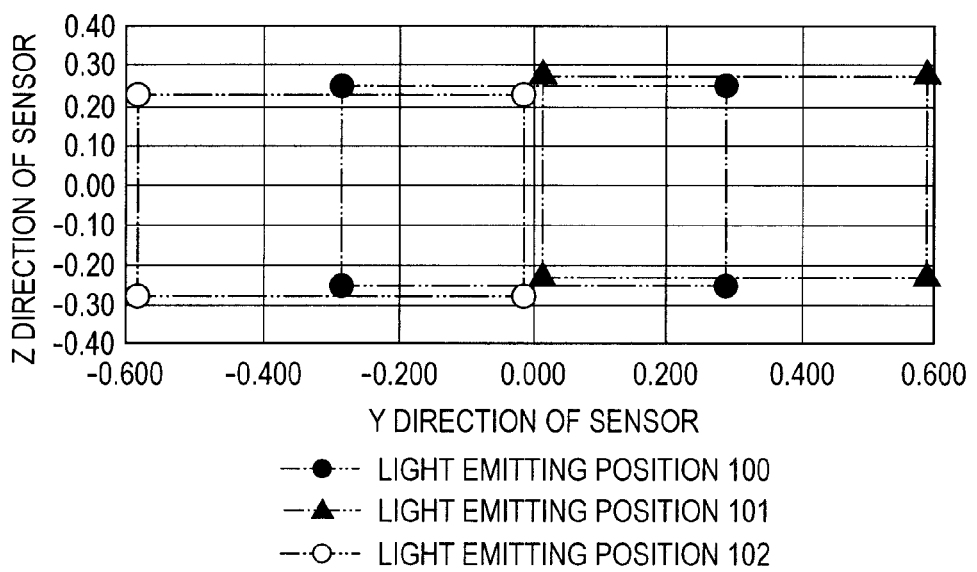
FIG. 13B is a chart illustrating an arrangement of the twelve beam spots on the image plane which is obtained if the laser light source is displaced in the X direction (interval to a condensing lens is increased by 0.1 mm) in Numerical Example 3-2 according to the third embodiment of the present invention.

FIG. 13B illustrates how the twelve beam spots are observed on the image plane 7 if the relative interval between the laser light source 1 and the condensing lens 3 is widen in the focus (X axis) direction by 0.1 mm from that in the ideal state. The four beam spots formed by the center light emitting point 100 illustrated in FIG. 13B is in the same state as the state of def=−0.1 illustrated in FIG. 11J described in Numerical Example 3-1.

Figure 13C:
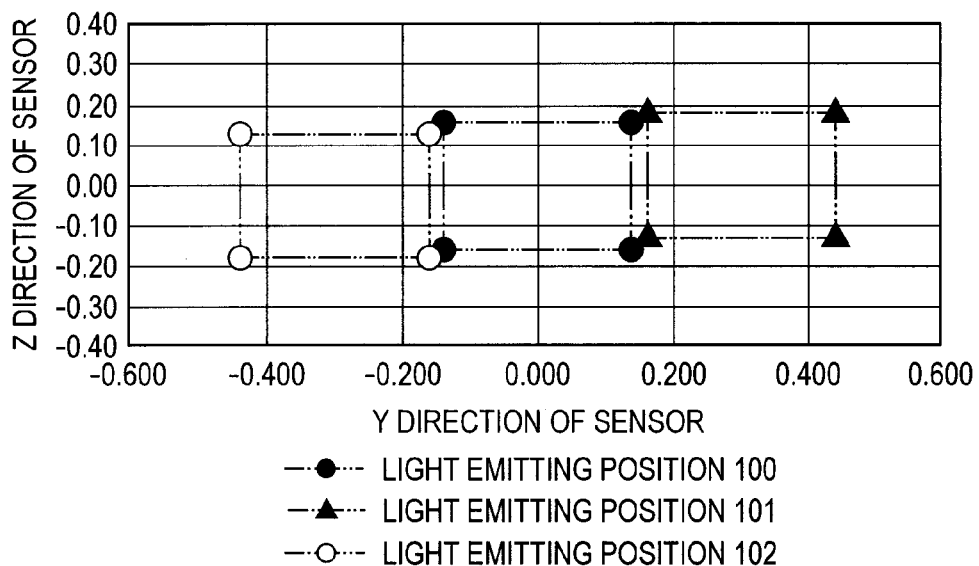
FIG. 13C is a chart illustrating an arrangement of the twelve beam spots on the image plane which is obtained if the laser light source is displaced in the X direction (interval to a condensing lens is decreased by 0.1 mm) in Numerical Example 3-2 according to the third embodiment of the present invention.

FIG. 13C illustrates how the twelve beam spots are observed on the image plane 7 if the relative interval between the laser light source 1 and the condensing lens 3 is reduced in the focus direction (X direction) by 0.1 mm from that in the ideal state. The four beam spots formed by the center light emitting point 100 illustrated in FIG. 13C is in the same state as the state of def=+0.1 illustrated in FIG. 11J described in Numerical Example 3-1.

The rectangle formed by the beam spots 72A (n), 72B (n), 72C (n), and 72D (n) is observed similarly as that shrunk or widen independently of the light emitting points 100, 101, and 102 if the relative position between the laser light source 1 and the condensing lens 3 is displaced from that in the ideal state in the focus (X axis) direction as can be seen from comparison between FIGS. 13A to 13C. It is possible to compute the defocus amount for each of the light beams by measuring the coordinates of the beam spots corresponding to each of the light emitting points 100, 101 and 102 as described in Numerical Example 3-1. The defocus amounts are the same, and the displacements of the beam spots are thus the same in FIGS. 13A to 13C.

Figure 13D:
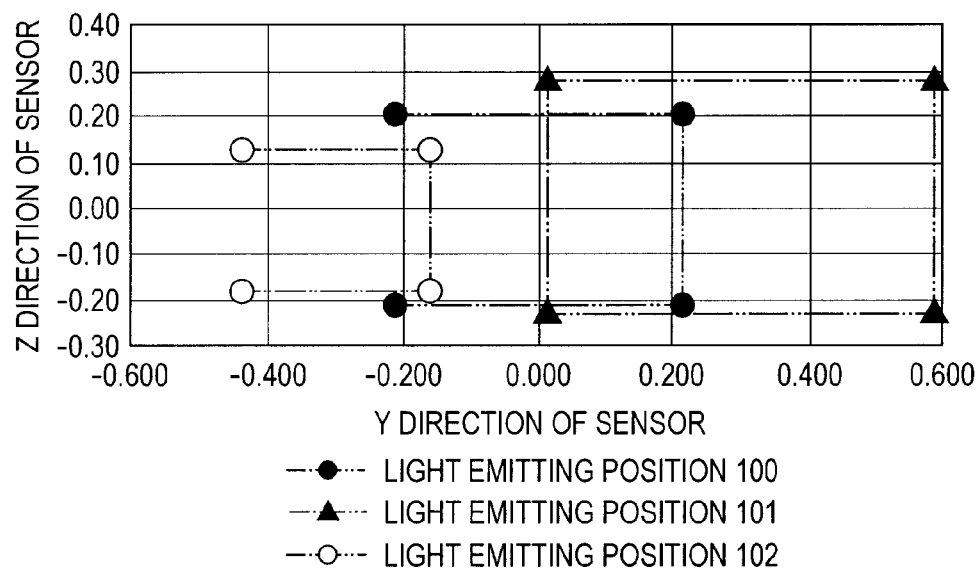
FIG. 13D is a chart illustrating an arrangement of the twelve beam spots on the image plane which is obtained if the lager light source is rotated about the Z axis in Numerical Example 3-2 according to the third embodiment of the present invention.

FIG. 13D illustrates beam spots observed if the laser light source is rotated about the Z axis, resulting in a so-called asymmetric blur. A case where the laser light source is rotated about the Z axis, and the center light emitting point 100 is at the best focus position, the light emitting point 101 is in the state of DEF=−0.1, and the light emitting point 102 is in the state of DEF=+0.1 is illustrated. The rectangles each of which is formed by the group of four beam spots corresponding to each of the three light emitting points are differently observed on the image plane 7. The defocus amount is computed for each of the groups of four beam spots, and an asymmetric blur amount is obtained by computing differences therebetween.

The rotated amount about the Z axis is identified from the asymmetric blur amount and the pitch of the light emitting points, and the rotation of the laser light source about the Z axis may be adjusted by the tool hand (not shown) so as to attain a desired focus difference or less.

Fourth Embodiment

Figure 14:
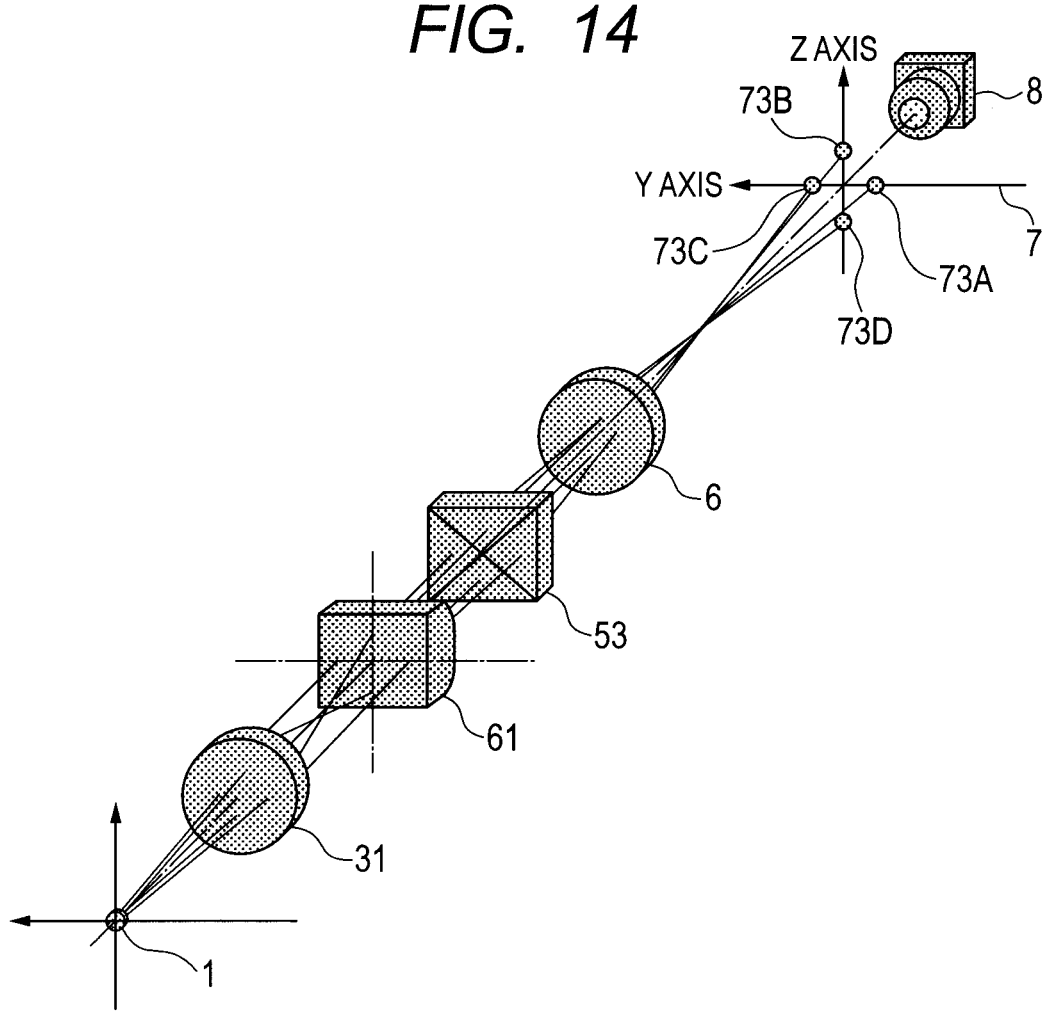
FIG. 14 is a perspective view illustrating an adjustment apparatus according to a fourth embodiment of the present invention.
Figure 15:
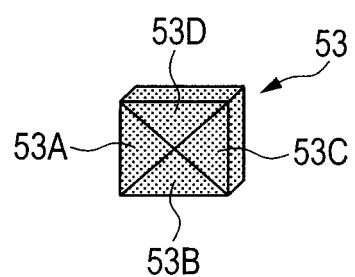
FIG. 15 is a partial detailed view illustrating a pupil dividing element of the adjustment apparatus according to the fourth embodiment of the present invention.
Figure 16:
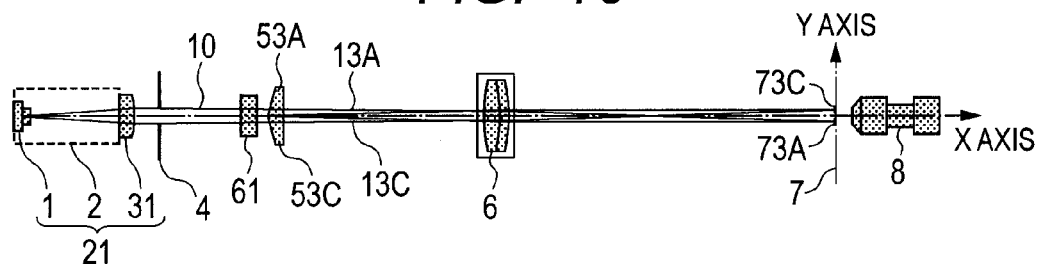
FIG. 16 is a cross sectional view on an XY plane illustrating the adjustment apparatus according to the fourth embodiment of the present invention.
Figure 17:
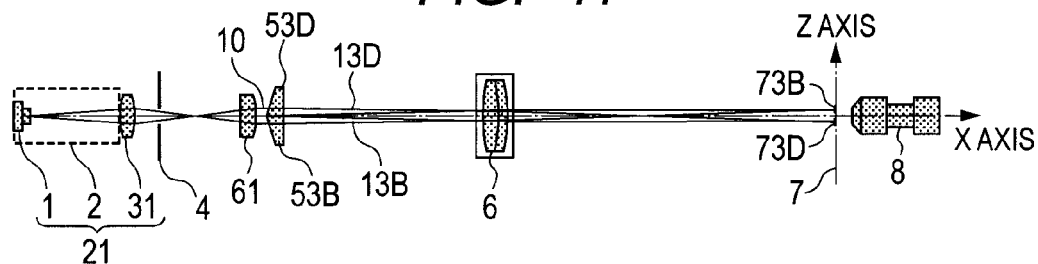
FIG. 17 is a cross sectional view on an XZ plane illustrating the adjustment apparatus according to the fourth embodiment of the present invention.

FIG. 14 is a perspective view, FIG. 16 is an XY cross sectional view, and FIG. 17 is a XZ cross sectional view of an adjustment apparatus of a light source unit for a scanning optical system according to a fourth embodiment of the present invention. The adjustment apparatus according to this embodiment is an adjustment apparatus for adjusting a relationship in relative position between a laser light source of a light source unit to be installed on an optical scanning apparatus including a deflector and a condensing anamorphic-lens serving as the condensing optical element, and includes the mounting unit (not shown) for fixing the light source unit 21 including the laser light source 1 to be adjusted and a condensing anamorphic-lens 31, the stop 4 (not shown), a tool anamorphic-lens 61, a pupil dividing element 53, the tool lens 6, and the two-dimensional CCD camera 8 serving as the light receiving sensor as illustrated in FIG. 14. A coordinate system is configured such that the optical axis is assigned to the X axis, and the Y axis and the Z axis are provided on the plane orthogonal to the X axis. A component different from the adjustment apparatus according to each of the first to third embodiments is the pupil dividing element 53, and includes the tool anamorphic-lens 61, which is also different therefrom. FIG. 15 illustrates the pupil dividing element 53 of this embodiment.

A description is now given of a configuration of the adjustment apparatus of this embodiment referring to FIGS. 14 to 17.

The laser light source 1 and the condensing anamorphic-lens 31 are held by the laser holder 2 serving as a holding member, and form the light source unit 21 for the scanning optical system. The light source unit 21 is detachable from the adjustment apparatus of this embodiment by means of the mounting unit (not shown). The condensing anamorphic-lens 31 is fixed to the laser holder 2, and the laser holder 2 is then mounted on the adjustment apparatus. The laser light source 1 is held by a tool hand (not shown), thereby providing a configuration three-dimensionally displaceable with respect to the laser holder 2. After a position of the laser light source 1 is finely adjusted by means of an adjustment method of the present invention, which is described later, thereby achieving a desired three-dimensional accuracy of the relative position of the laser light source 1 with respect to the condensing anamorphic-lens 31, the laser light source 1 is fixed. A method of fixing the laser light source 1 and the condensing anamorphic-lens 31 to the laser holder 2 is a known method such as screwing, fitting and adhering.

The condensing anamorphic-lens 31 of the optical unit is a condensing lens the power of which is different in the XY plane and the ZX plane from each other. The condensing anamorphic-lens 31 may be a single lens or a compound lens.

The stop 4 is a plate in which a rectangular hole having a major axis in the Y direction is bored. The stop 4 having the rectangular opening causes the light beam 10 to have a rectangular shape.

The pupil dividing element 53 illustrated in FIG. 15 is constructed by arranging prisms 53A, 53B, 53C and 53D in the Y and Z directions. This is an arrangement in which the prisms are rotated by 45 degrees about the optical axis from the pupil dividing element 52 of the adjustment apparatus according to the third embodiment illustrated in FIG. 10. The pupil dividing element 53 constructed by the prisms 53A, 53B, 53C and 53D has a shape symmetrical about the XY plane containing the optical axis and the XZ plane containing the optical axis. Incident surfaces of the prisms 53A, 53B, 53C and 53D are inclined with respect to the YZ plane, and exit surfaces are formed by one plane parallel with the YZ plane in FIGS. 14 and 15. The slopes of the incident surfaces of the prisms 53A, 53B, 53C and 53D are inclined such that the thickness increases toward the optical axis side, and decreases toward the four sides on the outer periphery of the pupil dividing element 53.

The tool lens 6 condenses incident beams onto the image plane 7 (on the light receiving sensor or the light receiving element), thereby forming beam spots 73A, 73B, 73C and 73D. The beam spots formed on the image plane 7 are read as an image by the CCD camera 8 serving as the light receiving sensor. The CCD camera 8 is constructed by the CCD sensor in which the objective lenses and the light receiving pixels are two-dimensionally arranged. The image processing system (not shown) computes where the center of gravity of each of the beam spots read as the image by the CCD camera 8 is present on the YZ coordinate system of the image plane 7. Driving and controlling of the tool hand (not shown) holding the laser light source 1 is carried out based on the computed YZ coordinates of the beam spots.

A description is now given of a more specific operation referring to FIGS. 14 to 17. Note that, only the principal rays are illustrated in FIG. 14, and only marginal light beams are illustrated in the XY cross sectional view of FIG. 16 and the XZ cross sectional view of FIG. 17 for the sake of simple description.

If the light source unit 21 is attached to the adjustment apparatus according to the present invention by means of the mounting unit (not shown) and the laser light source 1 is turned on, the laser beam emitted from the laser light source 1 is condensed by the condensing anamorphic-lens 31. The laser beam is converted into a parallel light beam in the XY plane and into a converged light beam in the ZX plane by making the front focus position of the condensing anamorphic-lens 31 coincide with the laser light source 1. It is necessary for attaining desired parallelism of the parallel light beam that a tolerance of the position shift between the front focus position of the condensing anamorphic-lens 31 and the laser light source 1 in the optical axis (X) direction be ±0.050 mm, more preferably ±0.020 mm or less. Similarly, if the laser light source 1 is largely shifted in the vertical direction (Y direction or Z direction) with respect to the optical axis of the condensing anamorphic-lens 31, the shift has influence on the accuracy of a print position of the optical scanning apparatus. It is thus necessary that the tolerance of the position shift in the Y direction and the Z direction be ±0.100 mm, more preferably ±0.030 mm or less.

However, when the light source unit 21 is assembled at the time of manufacture, it is generally difficult to provide an arrangement at such a desired accuracy in the optical axis (X) direction, the Y direction and the Z direction, and it is thus necessary to make fine adjustment after the assembly.

The light beam emitted from the condensing anamorphic-lens 31 is shaped as the light beam 10 in rectangular in the cross section orthogonal to the optical axis by the stop 4 having the rectangular opening. The distance in the optical axis direction from the condensing anamorphic-lens 31 of the light source unit 21 to the stop 4 in the adjustment apparatus preferably coincides with the distance in the optical axis direction from the condensing anamorphic-lens 31 to a stop in the optical scanning apparatus. Alternatively, the condensing anamorphic-lens 31 and the stop 4 may be arranged at positions optically equivalent thereto.

The light beam which has passed through the stop 4 is once condensed on the ZX plane, and then becomes a parallel light beam by the tool anamorphic-lens 61. A rear side light condensing point of the condensing anamorphic-lens 31 and the front side focal point of the tool anamorphic-lens 61 are made coincident with each other on the ZX plane.

The light beam 10 which has passed through the tool anamorphic-lens 61 enters the prisms 53A, 53B, 53C and 53D constructing the pupil dividing element 53. The light beam 10 is divided into four portions, that is, a pupil A light beam 13A, a pupil B light beam 13B, a pupil C light beam 13C and a pupil D light beam 13D at 45 degrees in the Y and Z directions as can be seen from FIG. 14. The pupil A light beam 13A, the pupil B light beam 13B, the pupil C light beam 13C and the pupil D light beam 13D are respectively deflected by the prisms 53A, 53B, 53C and 53D toward the optical axis (X axis) side.

The light beams 13A, 13B, 13C and 13D that have entered the tool anamorphic lens 61 undergo imaging effect of the tool anamorphic lens 61, thereby respectively forming beam spots 73A, 73B, 73C and 73D on the image plane 7 of the adjustment apparatus.

The beam spots 73A, 73B, 73C and 73D on the image plane 7 are read as an image by the CCD camera 8. The image processing system (not shown) computes where the center of gravity of each of the beam spots read as the image is present on the YZ coordinate system of the image plane 7.

If the laser light source 1 and the condensing anamorphic-lens 31 are arranged in an ideal state, and the laser beam emitted from the condensing anamorphic-lens 31 is a parallel light beam having the desired parallelism, the beam spots 73A, 73B, 73C and 73D form images respectively at positions (0,−Z0), (−Yo,0), (0,Z0) and (Yo,0) on the image plane 7.

A description is now be given of how the beam spots 73A, 73B, 73C, and 73D are observed if the relative position between the laser light source 1 and the condensing lens 3 is shifted.

First, if the distance in the X direction between the laser light source 1 and the condensing anamorphic-lens 31 is shorter by ΔX than that in the ideal state, the light beam 10 emitted from the anamorphic-lens 31 is a light beam tending to disperse. If the light beam 10 is a dispersed light beam, the light beam 13A, 13B, 13C and 13D are displaced toward directions approaching the X axis immediately after the condensing anamorphic-lens 31 as can be seen from FIGS. 14 to 17. After these light beams are condensed once in the ZX plane, the light beams 13A and 13C are displaced toward directions approaching the X axis, and the light beams 13B and 13D are displaced toward directions departing from the X axis when these light beams enter the tool anamorphic-lens 61.

As a result, though the beam spots 73A, 73B, 73C and 73D radially move on the image plane 7, the light beams 13B and 13D are observed as displacements toward sides opposite to those of the light beams 13A and 13C.

Then, if the position of the laser light source 1 is moved in the Y direction by ΔY<0 from that in the ideal state with respect to the condensing anamorphic-lens 31 (moved toward the minus side in the Y axis direction), the light beam 10 emitted from the condensing anamorphic-lens 31 has an angle in the Y direction toward the plus side. If the light beam 10 has the angle in the Y direction toward the plus side, the light beams 13A, 13B, 13C and 13D divided by the pupil dividing element 53 also each have an angle in the Y direction toward the plus side as can be seen from FIGS. 14 to 17. As a result, the light beams 13A, 13B, 13C, and 13D that have entered the tool lens 6 also proceed at an angle in the Y direction toward the plus side, and the positions of the beam spots 73A, 73B, 73C and 73D on the image plane 7 are thus observed as those displaced toward the plus side.

If the position of the laser light source 1 is moved by ΔZ<0 from that in the ideal state in the Z direction with respect to the condensing anamorphic-lens 31 (moved toward the minus side in the Z axis direction), the light beam 10 emitted from the condensing anamorphic-lens 31 has an angle in the Z direction toward the plus side. On the other hand, after the light beam is condensed once in the ZX plane, the light beam enters the tool anamorphic-lens 61, and thus the light beam after having passed through the tool anamorphic-lens 61 has an angle toward the minus side in the Z direction. The beam spots 73A, 73B, 73C and 73D on the image plane 7 are thus observed as those displaced in the Z direction toward the minus side.

The change amounts in the interval between the beam spots 73A, 73B, 73C and 73D (relative position between the images of the four beams) and in the positions thereof (position of each of the images of the four beams with respect to the optical axis) are proportional to the change amount in the relative position between the laser light source 1 and the condensing anamorphic-lens 31 as described in the following Numerical Examples. It is thus possible to compute how much the relative position between the laser light source 1 and the condensing anamorphic-lens 31 is shifted with respect to that in the ideal position by reading the coordinates of the beam spots 73A, 73B, 73C and 73D, and accurately measuring the change amounts of the interval and the positions.

The beam spots 73A, 73B, 73C and 73D on the image plane 7 are read as an image by the CCD camera 8 according to the present invention. The image processing system (not shown) computes where the center of gravity of each of the beam spots read as the image is present on the YZ coordinate system of the image plane 7. The method of computing the coordinate of the center of gravity of each of the spots on the two-dimensional CCD sensor may be a known method.

The computed coordinates of the beam spots 73A, 73B, 73C and 73D are (YA, ZA), (YB, ZB), (YC, ZC) and (YD, ZD), respectively. Moreover, the coordinates in the ideal state (design positions) are respectively (−Yo, 0), (0, Zo), (Yo, 0) and (0, −Zo).

Moreover, coordinate displacement sensitivities of the beam spots 73A, 73B, 73C and 73D with respect to a relative position shift between the laser light source 1 and the condensing anamorphic-lens 31 are represented by the following expressions (24) to (27).

$$Ax1 = (\text{defocus}(X \text{ direction}))/(\text{beam spot shift amount in } Y \text{ direction}) \quad (24)$$

$$Ax2 = (\text{defocus}(X \text{ direction}))/(\text{beam spot shift amount in } Z \text{ direction}) \quad (25)$$

$$Ay = (\text{shift in } Y \text{ direction})/(\text{beam spot shift amount in } Y \text{ direction}) \quad (26)$$

$$Az = (\text{shift in } Z \text{ direction})/(\text{beam spot shift amount in } Z \text{ direction}) \quad (27)$$

Those sensitivities may be computed by means of simulation or experimentally. Based on the coordinate displacement sensitivities, the amounts of relative position shift in the X, Y and Z directions (ΔX, ΔY and ΔZ) between the laser light source 1 and the condensing anamorphic-lens 31 are respectively represented by the following expressions (28) to (30).

$$\Delta X = \frac{1}{2}\{Ax1 \times ((YA - YC) - 2 \times Yo) + Ax2 \times ((ZB - ZD) - 2 \times Zo)\} \quad (28)$$

where ΔX is an amount of relative position shift in X direction between laser light source 1 and condensing anamorphic-lens 31.

$$\Delta Y = Ay \times (YA + YB + YC + YD)/4 \quad (29)$$

where ΔY is an amount of relative position shift in Y direction between laser light source 1 and condensing anamorphic-lens 31.

$$\Delta Z = Az \times (ZA + ZB + ZC + ZD)/4 \quad (30)$$

Where ΔZ is an amount of relative position shift in Z direction between laser light source 1 and condensing anamorphic-lens 31.

The amount ΔX of relative position shift in the X direction is computed by means of an average difference in the distance between the beam spots 73A and 73C, and the distance between the beam spots 73B and 73D from the distances therebetween in the ideal state. The shift in the Y direction is computed by means of an average difference in the positions of the beam spots 73A, 73B, 73C and 73D in the Y direction from the positions thereof in the ideal state. The shift in the Z direction is computed by means of an average difference in the positions of the beam spots 73A, 73B, 73C and 73D in the Z direction from the positions thereof in the ideal state.

After the desired accuracy of the relative position between the laser light source 1 and the condensing anamorphic-lens 31 is achieved by, based on the computed ΔX, ΔY and ΔZ, three-dimensionally driving and controlling the tool hand (not shown), which holds the laser light source 1, the laser light source 1 is fixed. The method of fixing the laser light source 1 and the condensing anamorphic-lens 31 to the laser holder 2 is a known method such as screwing, fitting and adhering.

Though the condensing anamorphic-lens 31 is fixed first, and the laser light source 1 is then finely adjusted according to this embodiment, conversely, the laser light source 1 may be fixed first, and the position of the condensing anamorphic-lens 31 may then be finely adjusted.

Though the CCD camera constructed by the objective lens and the two-dimensional CCD sensor is described as the light receiving sensor, the light receiving sensor is not limited to the CCD camera. A known method may be employed as long as the method can compute the center of gravity coordinates of the received beam spots. Various variations such as a light receiving surface of a sensor disposed directly on the image plane 7, a CMOS sensor, or a one-dimensional line sensor may be employed as the light receiving sensor. Moreover, if the interval between the beam spots 73A, 73B, 73C, and 73D increases according to the setting of the angles of the prisms of the pupil dividing element 53 and one sensor cannot receive the spots, a plurality of light receiving sensors may be used, or one light receiving sensor may be mounted on a moving stage, and the images of the beam spots 73A, 73B, 73C and 73D may sequentially read. Moreover, though it is assumed that the light source unit providing the parallel light beam by means of the condensing anamorphic-lens 31 is used according to this embodiment, the present invention is not limited to this light source unit, and may be applied to a light source unit providing a converged light beam or a dispersed light beam. Moreover, the optical system of the present invention such as the pupil dividing element and the tool lens may be applied to a case where the laser light source unit is built into a scanning optical system.

The power of the tool lens 6 may be reduced or the tool lens 6 itself may be omitted by forming at least either the incident surface or exit surface of the prisms 53A, 53B, 53C and 53D into, instead of a plane, a lens array in which curved surfaces having the same curvature are arranged.

Further, according to this embodiment, the pupil dividing element 53 is described as the prism-array having the incident surfaces that are inclined with respect to the YZ plane, and the exit surfaces that are constructed by the one plane parallel with the YZ plane, but the present invention is not limited to this configuration. Even a prism-array having exit surfaces that are inclined with respect to the YZ plane and incident surfaces that are constructed by one plane parallel with the YZ plane can enjoy the effect of the present invention. In other words, even a prism-array in which either its incident surface or exit surface is inclined with respect to the YZ plane and the other thereof is constructed by one plane parallel with the YZ plane can enjoy the effect of the present invention.

Numerical Example 4

A description is now given of a Numerical Example of the adjustment apparatus according to the fourth embodiment illustrated in FIGS. 14 and 17.

The optical system is arranged as shown in Table 4. In Table 4, Ry denotes a curvature radius of a surface in the Y direction; Rz, a curvature radius of a surface in the Z direction; d, interval between an n-th surface and an (n+1)th surface; and N, a refractive index.

TABLE 4

|  | Surface number | Ry | Rz | d | N |
|---|---|---|---|---|---|
|  | 1 | 0.00 | 0.00 | 2.0 | 1.0000 |
| Cover glass | 2 | 0.00 | 0.00 | 0.3 | 1.5105 |
|  | 3 | 0.00 | 0.00 | 21.1 | 1.0000 |
| Subject lens | 4 | 0.00 | 57.17 | 3.0 | 1.7617 |
|  | 5 | −19.06 | −19.06 | 23.6 | 1.0000 |
| Stop | 6 | 0.00 | 0.00 | 121.3 | 1.0000 |
| Tool lens CL | 7 | 0.00 | 0.00 | 5.0 | 1.5105 |
|  | 8 | 0.00 | −38.72 | 5.0 | 1.0000 |
| Pupil dividing element | 9 | 0.00 | 0.00 | 2.0 | 1.5105 |
|  | 10 | 0.00 | 0.00 | 293.0 | 1.0000 |
| Tool lens G1 | 11 | 170.59 | 17059 | 13.2 | 1.5105 |
| Tool lens G2 | 13 | −154.44 | −154.44 | 5.7 | 1.7851 |
|  | 14 | −369.90 | −369.90 | 292.4 | 1.0000 |
|  | 15 | 0.00 |  |  |  |

Inclination angle of pupil dividing element: 0.1 degrees Stop: 5.00 (in Y direction)×5.00 (in Z direction)

FIGS. 18A to 18J illustrate how the coordinates of the beam spots 73A, 73B, 73C and 73D, which are images formed respectively by the pupil A light beam 13A, the pupil B light beam 13B, the pupil C light beam 13C and the pupil D light beam 13D, are displaced if a position shift of the laser light source 1 is generated with respect to the condensing anamorphic-lens 31.

Figure 18A:
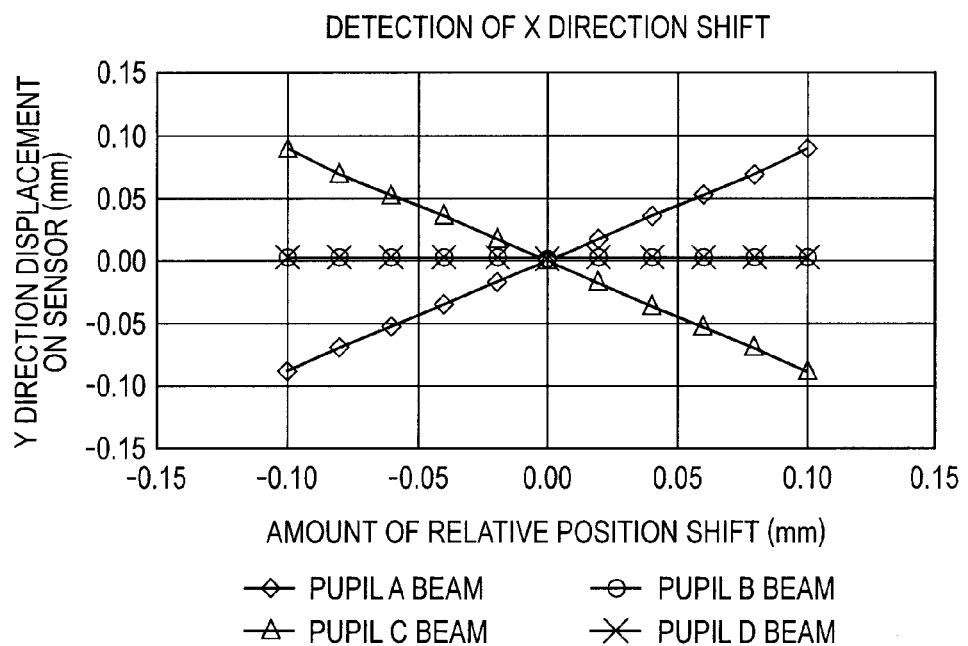
FIG. 18A is a chart illustrating displacement amounts of beam spots in the Y direction which are obtained if the laser light source is shifted in the X direction in Numerical Example 4 according to the fourth embodiment of the present invention.
Figure 18B:
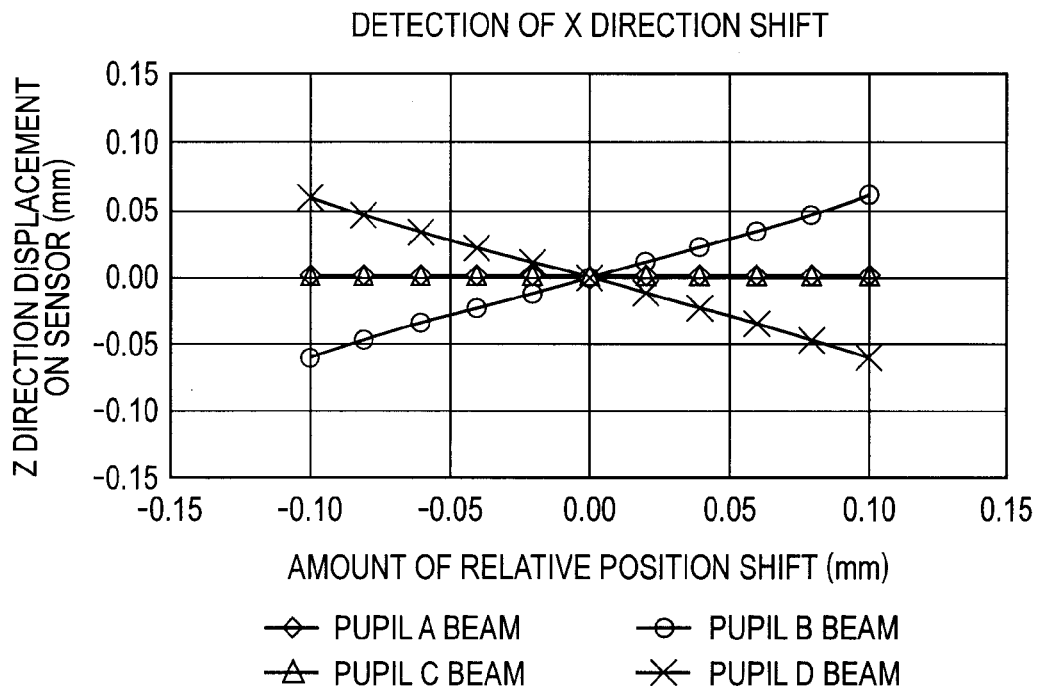
FIG. 18B is a chart illustrating displacement amounts of the beam spots in the Z direction which are obtained if the laser light source is shifted in the X direction in Numerical Example 4 according to the fourth embodiment of the present invention.

FIGS. 18A and 18B illustrate the displacement amounts of the Y coordinates and the Z coordinates of the beam spots 73A, 73B, 73C and 73D which are obtained if the laser light source 1 is shifted in the X direction with respect to the condensing anamorphic-lens 31. A negative relative position shift represents an increase in the interval between the condensing anamorphic-lens 31 and the laser light source 1. The beam spots 73A and 73C are displaced in the Y direction if the interval between the condensing anamorphic-lens 31 and the laser light source 1 changes, and the beam spots 73B and 73D are displaced in the Z direction if the interval between the condensing anamorphic-lens 31 and the laser light source 1 changes as can be seen from FIG. 18A.

Figure 18C:
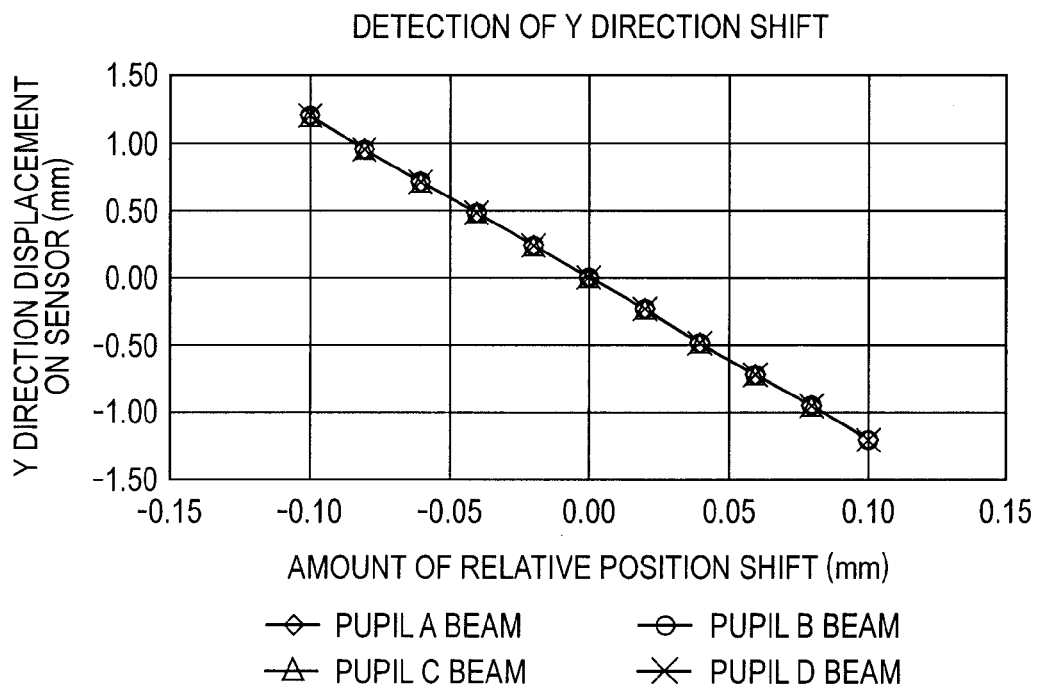
FIG. 18C is a chart illustrating displacement amounts of the beam spots in the Y direction which are obtained if the laser light source is shifted in the Y direction in Numerical Example 4 according to the fourth embodiment of the present invention.

FIGS. 18C and 18D illustrate the displacement amounts of the Y coordinates and the Z coordinates of the beam spots 73A, 73B, 73C and 73D which are obtained if the laser light source 1 is shifted in the Y direction with respect to the condensing anamorphic-lens 31. The beam spots 73A, 73B, 73C and 73D are displaced toward the same side in the Y direction if the condensing anamorphic-lens 31 and the laser light source 1 are shifted relatively in the Y direction as can be seen from FIG. 18C. Moreover, the beam spots 73A, 73B, 73C and 73D are not displaced in the Z direction if the condensing anamorphic-lens 31 and the laser light source 1 are shifted relatively in the Y direction as can be seen from FIG. 18D.

Figure 18F:
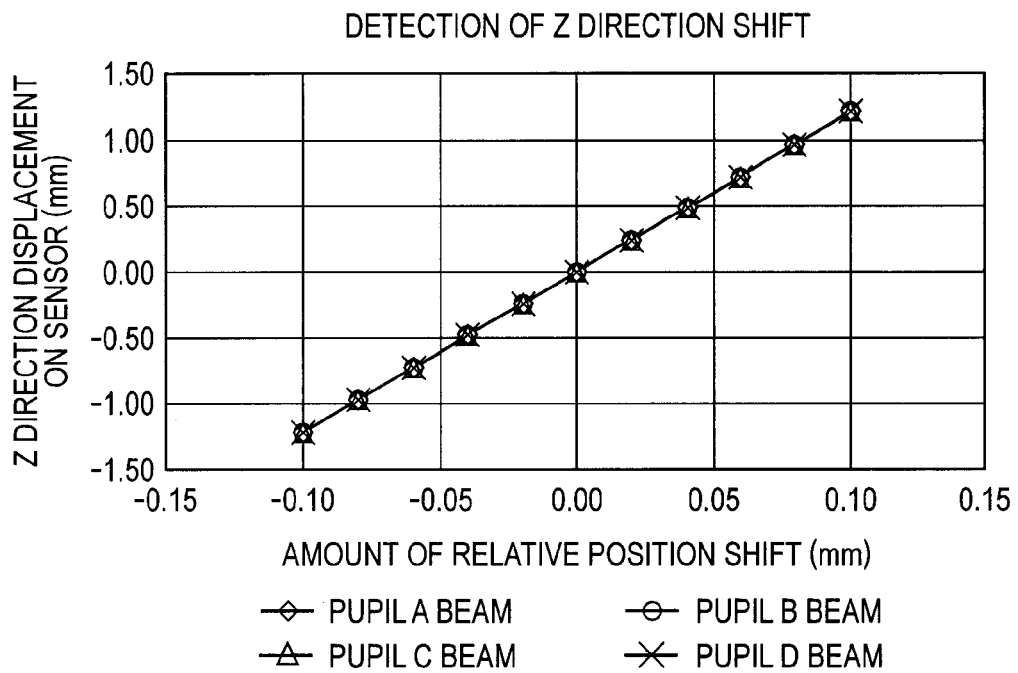
FIG. 18F is a chart illustrating displacement amounts of the beam spots in the Z direction which are obtained if the laser light source is shifted in the Z direction in Numerical Example 4 according to the fourth embodiment of the present invention.

FIGS. 18E and 18F illustrate the displacement amounts of the Y coordinates and the Z coordinates of the beam spots 73A, 73B, 73C and 73D which are obtained if the laser light source 1 is shifted in the Z direction with respect to the condensing anamorphic-lens 31. The beam spots 73A, 73B, 73C and 73D are not displaced in the Y direction if the condensing anamorphic-lens 31 and the laser light source 1 are shifted relatively in the Z direction as can be seen from FIG. 18E. Moreover, the beam spots 73A, 73B, 73C and 73D are displaced toward the same side in the Z direction if the condensing anamorphic-lens 31 and the laser light source 1 are shifted relatively in the Z direction as can be seen from FIG. 18F.

Figure 18G:
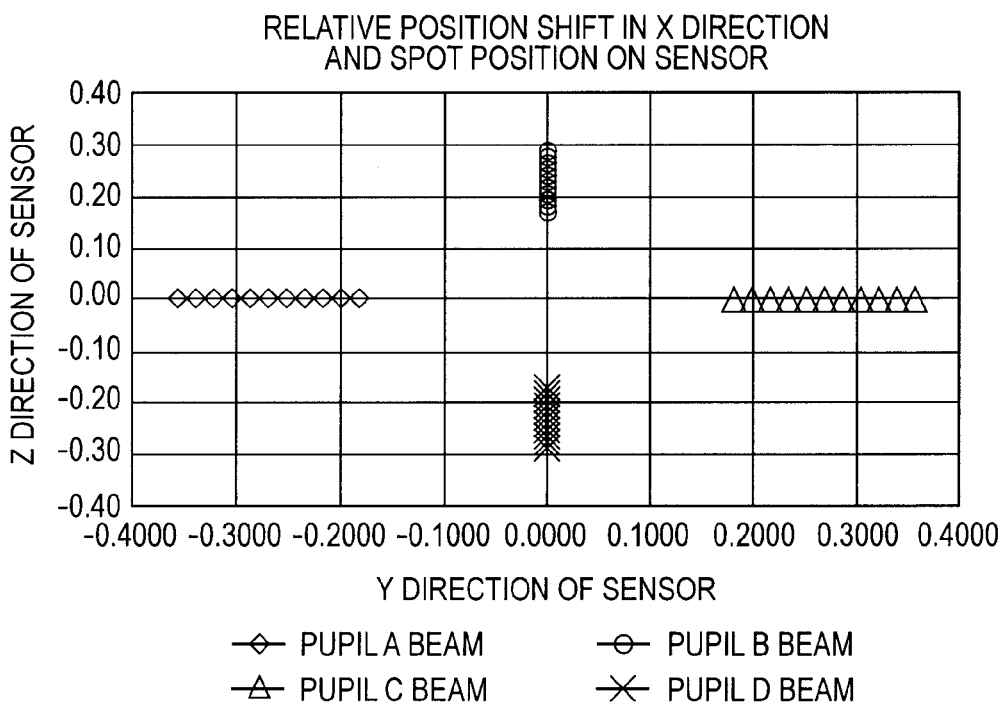
FIG. 18G is a chart illustrating movement locus of the beam spots on the YZ plane which are obtained if the laser light source is shifted in the X direction with the pitch of 0.02 mm by ±0.1 mm in Numerical Example 4 according to the fourth embodiment of the present invention.
Figure 18H:
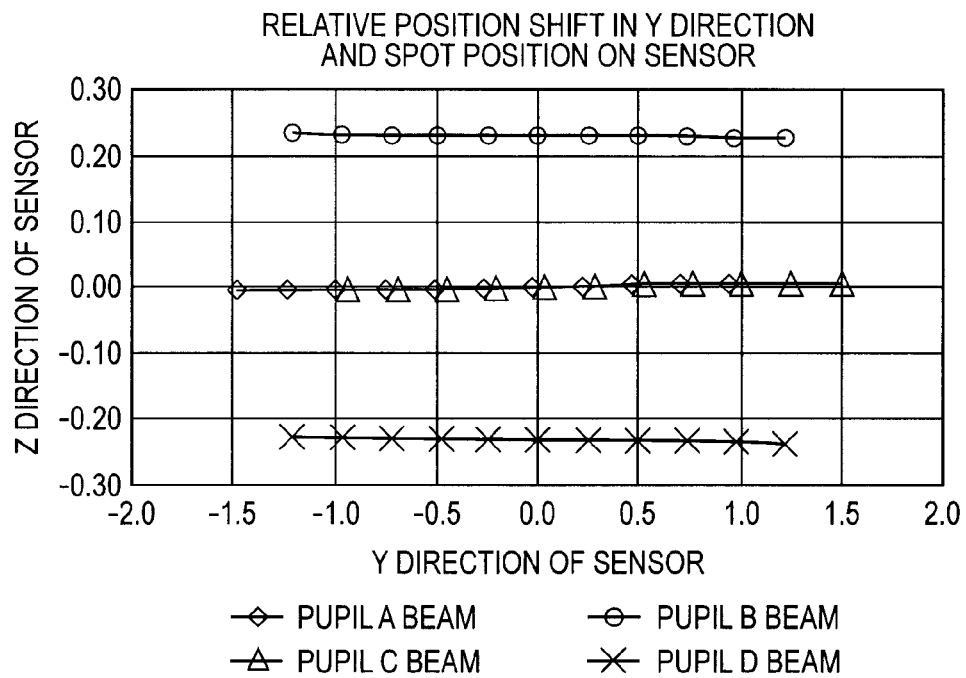
FIG. 18H is a chart illustrating movement locus of the beam spots on the YZ plane which are obtained if the laser light source is shifted in the Y direction with the pitch of 0.02 mm by ±0.1 mm in Numerical Example 4 according to the fourth embodiment of the present invention.
Figure 18I:
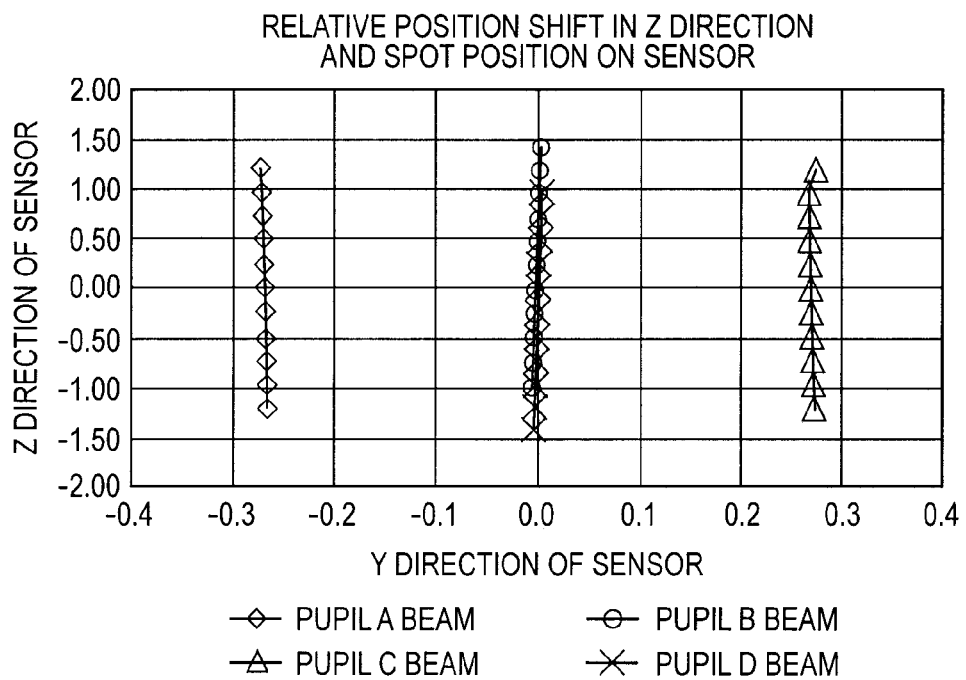
FIG. 18I is a chart illustrating movement locus of the beam spots on the YZ plane which are obtained if the laser light source is shifted in the Z direction with the pitch of 0.02 mm by ±0.1 mm in Numerical Example 4 according to the fourth embodiment of the present invention.

FIGS. 18G to 18I plot loci of the beam spots 73A, 73B, 73C and 73D on the YZ plane of the image plane 7 according to the displacements illustrated in FIGS. 18A to 18F.

FIG. 18G illustrates a locus of each of the spots on the YZ plane which is obtained if the laser light source 1 is shifted with respect to the condensing anamorphic-lens 31 in the X direction with a pitch of 0.02 mm by ±0.1 mm. The beam spots are displaced radially.

FIG. 18H illustrates loci of the spots on the YZ plane which are obtained if the laser light source 1 is shifted with respect to the condensing anamorphic-lens 31 in the Y direction with the pitch of 0.02 mm by ±0.1 mm. The beam spots are displaced toward the same side in the Y direction.

FIG. 18I illustrates loci of the spots on the YZ plane which are obtained if the laser light source 1 is shifted with respect to the condensing anamorphic-lens 31 in the Z direction with the pitch of 0.02 mm by ±0.1 mm. The beam spots are displaced toward the same side in the Z direction.

Figure 18J:
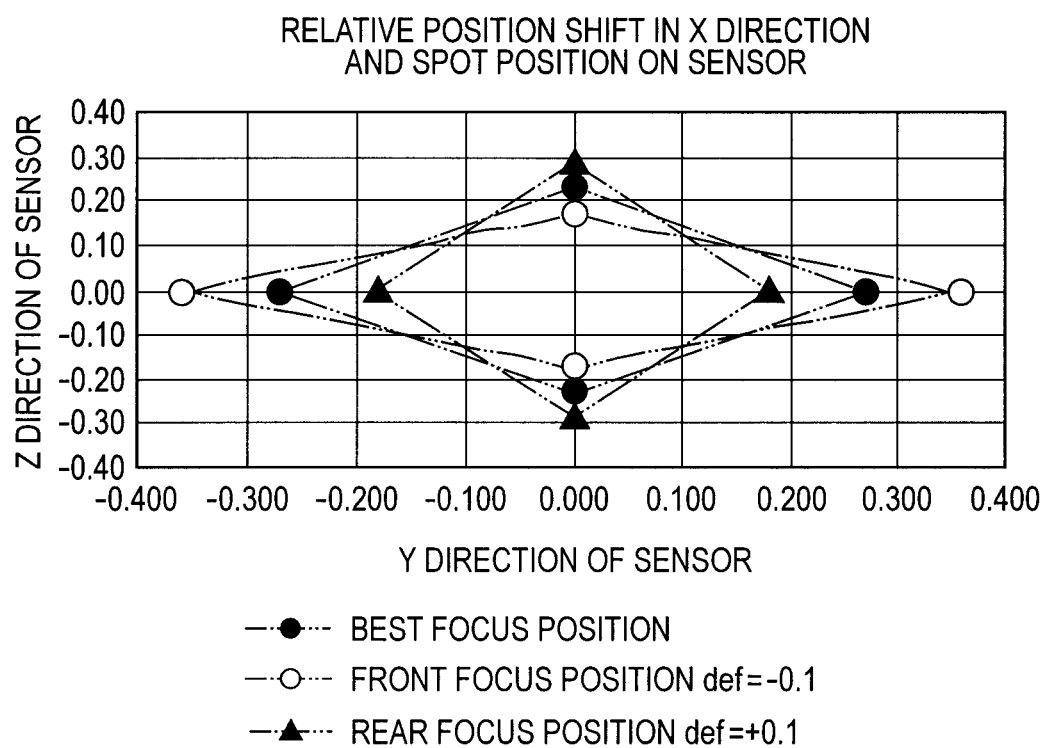
FIG. 18J is a chart illustrating a change in a rectangle formed by four beam spots on the YZ plane which is obtained if the laser light source is shifted in the X direction by ±0.1 mm in Numerical Example 4 according to the fourth embodiment of the present invention.

Further, FIG. 18J plots loci of the beam spots 73A, 73B, 73C and 73D on the YZ plane on the image plane 7 which are obtained if the laser light source 1 is shifted in the optical axis (X) direction by ±0.1 mm. The four beam spots form a rectangle, and a change in the size of the rectangle is observed as the laser light source 1 is shifted in the optical axis (X) direction.

As described above, the changes in the interval and the position of the beam spots 73A, 73B, 73C and 73D are proportional to the change amount in the relative position between the laser light source 1 and the condensing anamorphic-lens 31. It is thus possible to compute how much the relative position between the laser light source 1 and the condensing anamorphic-lens 31 is shifted with respect to that in the ideal position by reading the coordinates of the beam spots 73A, 73B, 73C and 73D, and accurately measuring the change amounts of the interval and the positions thereof.

After the desired accuracy of the relative position between the laser light source 1 and the condensing anamorphic-lens 31 is achieved by, based on the computed ΔX, ΔY and ΔZ, three-dimensionally driving and controlling the tool hand (not shown), which is holding the laser light source 1, the laser light source 1 is fixed. The method of fixing the laser light source 1 and the condensing anamorphic-lens 31 to the laser holder 2 is a known method such as screwing, fitting and adhering.

It is not necessary for the configuration of the present invention to repeat the conventional process of reading the images of the beam spots and computing the spot diameters and the peak quantity of light of the beam spots for many times, and it is thus possible to compute the three-dimensional relative position shift amount by reading the images of the beam spots once, and then carrying out the computation processing.

Moreover, if the focus and the like are checked again for an assembled light source unit, fewer man-hours are required for the check. The man-hours for the assembly can thus be considerably reduced, resulting in a reduction in cost.

The configurations do not have a stop in the light source unit 21 to be adjusted in the above-mentioned first to fourth embodiments, and the case where the stop 4 is provided at the position in the adjustment apparatus optically equivalent to a position of a stop for the laser light source in the optical scanning apparatus on which the light source unit is to be installed is exemplified. However, the present invention is not limited to this configuration. Note that, if the light source unit 21 includes a stop, that is, if a light source unit in which a stop is provided on the optical path between the laser light source 1 and the condensing lens 3 is to be adjusted, it is not necessary for the adjustment apparatus according to the present invention to have a stop, and the advantages of the present invention can be enjoyed and the light source unit can thus be adjusted by fixing the light source unit including the stop to the mounting unit of the adjustment apparatus according to the present invention.

Moreover, though the pupil dividing element is configured such that the exit surfaces are constructed by the same flat surface, and the incident surfaces are constructed by a plurality of flat surfaces which are not parallel with each other in the first to fourth embodiments, the present invention is not limited to this configuration. The pupil dividing element may be configured such that the incident surfaces are constructed by the same flat surface, and the exit surfaces are constructed by a plurality of flat surfaces which are not parallel with each other.

Further, note that, according to the first to fourth embodiment (Numerical Examples), the tool lens serving as an imaging optical element is exemplified as a cemented lens constructed by cementing two lenses for achromatism, but the present invention is not limited to this configuration.

Fifth Embodiment

Figure 19:
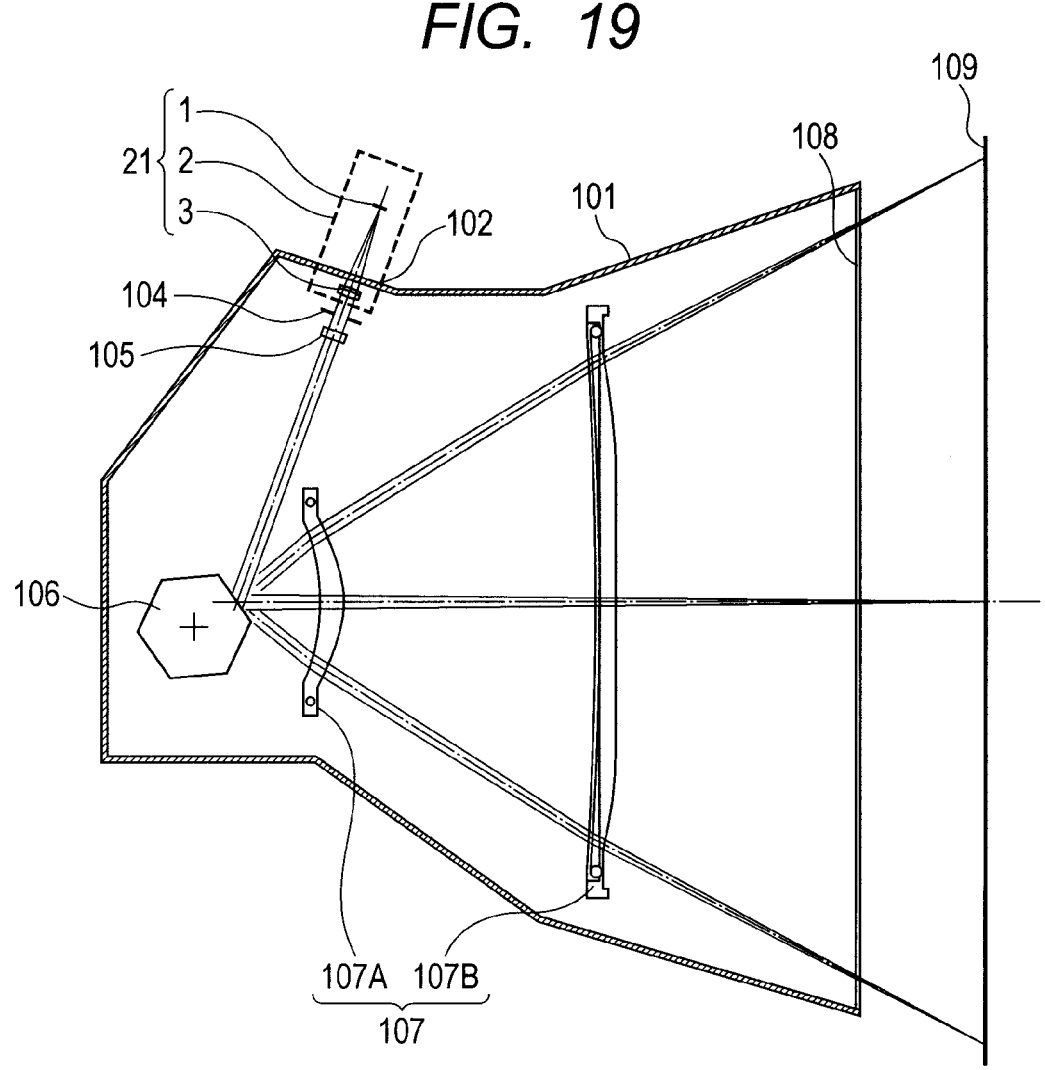
FIG. 19 is a schematic diagram of an optical scanning apparatus according to a fifth embodiment of the present invention.

FIG. 19 is a schematic diagram of an optical scanning apparatus of a fifth embodiment of the present invention, which is an arrangement diagram taken along the main scanning cross section. The optical scanning apparatus includes the laser light source 1, the laser holder 2, the condensing lens 3, a stop 104, a cylinder lens 105, a polygon mirror 106 serving as a deflector, a scanning lens system 107 constructed by a first scanning lens 107A and a second scanning lens 107B, a cover glass 108, and a surface to be scanned (photosensitive member) 109. Moreover, a laser scanner box 101 stores the condensing lens 3, the stop 104, the cylinder lens 105, the polygon mirror 106 and the scanning lens system 107. The light beam which has passed through the scanning lens system 107 is emitted via the cover glass 108 from the laser scanner box 101, and thereby scanning the surface to be scanned 109 with the light beam.

The first scanning lens 107A and the second scanning lens 107B are imaging lenses made of a resin.

The dispersed light beam emitted from the laser light source 1 is converted into parallel light by the condensing lens 3. The parallel light is converted by the stop 104 into a light beam having a desired beam width, is then converted by the cylinder lens 105 into a beam which converges in the sub-scanning direction, and converges in the vicinity of a deflection/reflection surface of the deflector 106. The light beam thus forms a line image in the vicinity of the deflection/reflection surface.

The deflector 106 constructed by a plurality of deflection/reflection surfaces is driven for rotation about a rotation shaft perpendicular to the drawing sheet of the FIG. 19 by a drive system (not shown). The deflector 106 deflects the light beam on an arbitrary deflection/reflection surface driven for rotation, thereby leading the light beam to the scanning lens system (Fθ lens) 107.

A description is now given of an operation of the scanning lens system 107. The scanning optical system (Fθ lens) is constructed by the two imaging lenses including the first imaging lens made of the resin and the second imaging lens made of the resin. The scanning lens system forms an image of the light beam reflected and deflected by the deflector 106, thereby forming a beam spot on the surface to be scanned 109, while scanning the surface to be scanned 109 at a constant speed. Scanning optical system made of a resin is manufactured by means of a known forming technology for filling a mold with the resin, and taking out the formed resin after cooling. This enables less expensive manufacturing compared with that for a conventional scanning lens using a glass lens.

A lens surface shape of the first scanning lens 107A having a power mainly in the main scanning direction is an aspherical shape represented by a known function. The first scanning lens 107A has a convex meniscus shape which is larger in power in the main scanning cross section than in the sub-scanning cross section, has a non-arc main scanning cross section, and has a concave surface facing the deflector 106 side. The shape in the main scanning cross section is symmetrical with respect to the optical axis. Though the first scanning lens 107A has the same curvature on the incident surface and the exit surface in the sub-scanning direction, and thus has almost no power in the sub-scanning direction, the first scanning lens 107A may have a cylindrical shape in which the both surfaces are flat in the sub-scanning direction, for example. The first scanning lens 107A is responsible for imaging the incident light beam mainly in the main scanning direction.

On the other hand, the second scanning lens 107B is an anamorphic-lens having a power mainly in the sub-scanning direction. The lens surface shape is an aspherical shape represented by a known function. The second scanning lens 107B is larger in power in the sub-scanning cross section than in the main scanning cross section, has an arc incident surface on the main scanning cross section, and has a non-arc shape on the other surface. An imaging relationship in the sub-scanning direction by the scanning lens system 107 constructed by the first and second scanning lenses 107A and 107B forms a so-called tangle error correction system in which the deflection/reflection surface and the surface to be scanned 109 are in almost a conjugate relationship.

The cover glass 108 is inclined so as to have a certain angle with respect to the incident light beam in the sub-scanning cross section perpendicular to the drawing sheet. This prevents the light reflected on the surface of the cover glass 108 from returning to the light source. Further, if the light reflected on the surface returns to the light source, the laser oscillation in the light source may become unstable, resulting in a change in the quantity of light.

The laser light source 1 and the condensing lens 3 of the light source unit 21 are held by the laser holder 2. The light source unit 21 can adjust relative positions between the laser light source 1 and the condensing lens 3 in the optical axis direction and the direction orthogonal to the optical axis, and the relative positions are adjusted at a desired accuracy by the adjustment apparatus described in the first to fourth embodiments.

The light source unit 21, the stop 104, the cylinder lens 105, the polygon mirror 106 serving as the deflector, the first scanning lens 107A, the second scanning lens 107B and the cover glass 108 are attached to the laser scanner box 101. A fitting hole (not shown) is formed on a seat surface 102 of the laser scanner box 101 for attachment of the light source unit, and the assembled and adjusted light source unit 21 is attached to the fitting hole.

An accurate adjustment is enabled by providing the adjustment apparatus with a configuration similar to the seat surface 102 for attachment of the light source unit and the fitting hole (not shown) for attaching the light source unit 21 to the adjustment apparatus described in the first to fourth embodiments.

The stop 104 is provided between the condensing lens 3 and the cylinder lens 105 according to this embodiment. It is preferred that the stop 4 be also provided at a position optically equivalent to the stop 104 in the adjustment apparatus of the light source unit 21. Specifically, the stop 104 for the optical scanning apparatus and the stop 4 for the adjustment apparatus described in the first to fourth embodiments are provided so that distances in the optical axis direction from the light source 1 and the condensing lens 3 are the same. Moreover, the stop 104 and the stop 4 have an opening having the same shape.

The position of the stop is not necessarily between the condensing lens 3 and the cylinder lens 104 as illustrated in FIG. 19. For example, a stop may be provided at a position between the laser light source 1 and the condensing lens 3, or at a position between the cylinder lens 105 and the deflector 106, or stops may be provided at both of the positions.

If the stop 104 is provided between the laser light source 1 and the condensing lens 3, a cost can be reduced by building the stop into the laser holder 2. The stop 4 is no longer necessary for an adjustment apparatus used for adjusting the positions of the laser light source 1 and the condensing lens 3 of the light source unit 21 in which the stop 104 is constructed in the laser holder 2. It is preferred for an adjustment apparatus for adjusting the positions of the laser light source 1 and the condensing lens 3 of the light source unit 21 to be used for an optical scanning apparatus including the stop 104 between the cylinder lens 105 and the deflector 106 to provide the stop 4 at a position in the adjustment apparatus optically equivalent to the stop 104 with respect to the laser light source 1 in the optical scanning apparatus. Specifically, the stop 104 for the optical scanning apparatus and the stop 4 for the adjustment apparatus described in the first to fourth embodiments are provided so that distances in the optical axis direction from the laser light source 1 and the condensing lens 3 are the same. Moreover, the stop 104 and the stop 4 have an opening having the same shape.

The laser light source 1 may be the single beam type, the monolithic multi-beam type, or the VCSEL (surface emitting laser).

Though the adjustment apparatus for adjusting the relative position between the laser light source and the condensing optical element according to the present invention is described assuming that the light source unit constructed by the laser light source and the condensing optical element is installed and used on the optical scanning apparatus, the adjustment apparatus according to the present invention is not limited to this adjustment apparatus. Even if the adjustment apparatus is used for adjusting the relative position between the laser light source and the condensing optical element of the light source unit other than that of the optical scanning apparatus, the effects of the present invention can be enjoyed.

Though the description is given of the exemplary embodiments of the present invention, the present invention is not limited to those embodiments, and may be modified and changed in various ways within the gist thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-234667, filed Oct. 19, 2010, and No. 2011-202920, filed Sep. 16, 2011, which are hereby incorporated by reference herein in their entirety.

What is claimed is:

1. An adjustment apparatus for a light source unit to be installed on an optical scanning apparatus including a deflector, the light source unit including a laser light source and a condensing optical element for condensing a light beam emitted from the laser light source, and leading the condensed light beam to the deflector, the adjustment apparatus comprising:
a dividing element for dividing the light beam emitted from the light source unit into a plurality of light beams in at least one of a main scanning direction and a sub-scanning direction;
an imaging optical element for forming a plurality of images corresponding to the plurality of light beams divided by the dividing element on a light receiving element; and
an adjustment mechanism for adjusting, based on a relative position between the plurality of images and positions of the plurality of images with respect to the optical axis, a relative position between the condensing optical element and the laser light source along a direction of an optical axis of the condensing optical element, and two relative positions between the condensing optical element and the laser light source along the respective directions orthogonal to each other and orthogonal to the optical axis of the condensing optical element.

2. An adjustment apparatus according to claim 1, wherein the dividing element divides the light beam, which has passed through a first stop disposed at a position optically equivalent to a second stop provided between the laser light source and the deflector in the optical scanning apparatus, into a plurality of light beams both in the main scanning direction and the sub-scanning direction.

3. An adjustment apparatus according to claim 2, wherein the adjustment apparatus can adjust the relative position between the condensing optical element and the laser light source in the direction of the optical axis of the condensing optical element, a relative position between the condensing optical element and the laser light source in the main scanning direction, and a relative position between the condensing optical element and the laser light source in the sub-scanning direction.

4. An adjustment apparatus according to claim 1, wherein the dividing element comprises a prism-array in which prisms are arranged so that either an incident surface or an exit surface is one flat surface, and the other of the incident surface and the exit surface is constructed by a plurality of flat surfaces which are not parallel with each other, and are not parallel with the one flat surface.

5. An adjustment apparatus according to claim 4, wherein an arrangement direction of the prisms of the prism-array coincides with a direction of a maximum diameter of a pupil of the light beam which enters the prism-array.

6. An adjustment apparatus according to claim 5, wherein the following expression is satisfied:

$$P \times Fj + Sp > 2 \times Fj \times X\mathrm{max} \times H/(4 \times F^2),$$

where P (rad) is a relative angle between two light beams emitted from the exit surface of the prism-array which are obtained in case where the light beam emitted from the light source unit having a designed configuration and is divided into two light beams in a direction of the maximum diameter of the pupil by the prism-array and then the two light beams are emitted from the exit surface of the prism-array, H is a width in the direction of the maximum diameter of the pupil of the light beam, F is a focal length of the condensing optical element, Fj is a focal length of the imaging optical element, Sp is a spot diameter of the light beam on the light receiving element, and Xmax is an absolute value of a maximum shift amount in the direction of the optical axis between the laser light source and the condensing optical element.

7. An adjustment apparatus according to claim 1, wherein the dividing element comprises a lens array in which at least either an incident surface or an exit surface is constructed by arranging a plurality of curved surfaces having the same curvature.

8. An adjustment apparatus according to claim 7, wherein an arrangement direction of the curved surfaces of the lens array coincides at least with a direction of a maximum diameter of a pupil of the light beam which enters the lens array.

9. An adjustment method for a light source unit to be installed on an optical scanning apparatus including a deflector, the light source unit including a laser light source and a condensing optical element for condensing a light beam emitted from the laser light source, and leading the condensed light beam to the deflector, the adjustment method comprising:
dividing the light beam emitted from the light source unit into a plurality of light beams in at least one of a main scanning direction and a sub-scanning direction;
forming a plurality of images corresponding to the divided light beams on a light receiving element; and
adjusting, based on a relative position between the plurality of images and positions of the plurality of images with respect to the optical axis, a relative position between the condensing optical element and the laser light source along a direction of an optical axis of the condensing optical element, and two relative positions between the condensing optical element and the laser light source along the respective directions orthogonal to each other and orthogonal to the optical axis of the condensing optical element.

10. A manufacturing method for a light source unit to be installed on an optical scanning apparatus including a deflector, the light source unit including a laser light source and a condensing optical element for condensing a light beam emitted from the laser light source, and leading the condensed light beam to the deflector, the manufacturing method comprising:
dividing the light beam emitted from the light source unit into a plurality of light beams in at least one of a main scanning direction and a sub-scanning direction;
forming a plurality of images corresponding to the divided a plurality of light beams on a light receiving element;
adjusting, based on a relative position between the plurality of and positions of the plurality of images with respect to the optical axis, a relative position between the condensing optical element and the laser light source along a direction of an optical axis of the condensing optical element, and two relative positions between the condensing optical element and the laser light source along the respective directions orthogonal to each other and orthogonal to the optical axis of the condensing optical element; and then determining at least one of a position of the condensing optical element and a position of the laser light source.

* * * * *